US010107537B2

(12) United States Patent
Ishimura et al.

(10) Patent No.: US 10,107,537 B2
(45) Date of Patent: Oct. 23, 2018

(54) AIR-CONDITIONING APPARATUS

(71) Applicants: Katsuhiro Ishimura, Tokyo (JP); Koji Yamashita, Tokyo (JP); Shinichi Wakamoto, Tokyo (JP); Naofumi Takenaka, Tokyo (JP)

(72) Inventors: Katsuhiro Ishimura, Tokyo (JP); Koji Yamashita, Tokyo (JP); Shinichi Wakamoto, Tokyo (JP); Naofumi Takenaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 635 days.

(21) Appl. No.: 14/432,620

(22) PCT Filed: Nov. 21, 2012

(86) PCT No.: PCT/JP2012/080135
§ 371 (c)(1),
(2) Date: Mar. 31, 2015

(87) PCT Pub. No.: WO2014/080463
PCT Pub. Date: May 30, 2014

(65) Prior Publication Data

US 2015/0247661 A1 Sep. 3, 2015

(51) Int. Cl.
*F25B 49/02* (2006.01)
*F25B 13/00* (2006.01)
(Continued)

(52) U.S. Cl.
CPC .............. *F25B 49/02* (2013.01); *F25B 13/00* (2013.01); *F25B 25/005* (2013.01);
(Continued)

(58) Field of Classification Search
CPC ............ F25B 41/062; F25B 2600/2513; F25B 2600/2501; F25B 2400/0409;
(Continued)

(56) References Cited

U.S. PATENT DOCUMENTS

2004/0144120 A1* 7/2004 Nakatani .................. F25B 1/10 62/324.1
2006/0080989 A1 4/2006 Aoki et al.
(Continued)

FOREIGN PATENT DOCUMENTS

EP 2407735 A1 * 1/2012 ............. F25B 13/00
JP 7-260262 A 10/1995
(Continued)

OTHER PUBLICATIONS

Next Generation Refrigerants, Pham, 2010.*
(Continued)

*Primary Examiner* — David Teitelbaum
*Assistant Examiner* — Schyler S Sanks
(74) *Attorney, Agent, or Firm* — Posz Law Group, PLC

(57) ABSTRACT

A controller performs medium pressure control that controls the opening degree of a second expansion device based on a deviation between a target value of medium pressure, and a detection result of a medium pressure detector or a predicted value. The controller controls the opening degree of a third expansion device based on a target value of a discharge refrigerant temperature of a compressor or a target value related to the discharge refrigerant temperature, and a detection result of a discharge refrigerant temperature detector or a value related to the discharge refrigerant temperature computed using a detected detection result, and regulates a flow rate of refrigerant to supply to a suction side of the compressor via an injection pipe.

14 Claims, 21 Drawing Sheets

(51) Int. Cl.
*F25B 25/00* (2006.01)
*F25B 41/06* (2006.01)
*F25B 31/00* (2006.01)

(52) U.S. Cl.
CPC .......... *F25B 31/006* (2013.01); *F25B 41/062* (2013.01); *F24F 2221/54* (2013.01); *F25B 2313/0233* (2013.01); *F25B 2313/0291* (2013.01); *F25B 2313/02743* (2013.01); *F25B 2600/2513* (2013.01); *F25B 2600/2515* (2013.01); *F25B 2700/1931* (2013.01); *F25B 2700/1933* (2013.01); *F25B 2700/21151* (2013.01); *F25B 2700/21152* (2013.01); *F25B 2700/21161* (2013.01); *F25B 2700/21171* (2013.01)

(58) Field of Classification Search
CPC .... F25B 2313/0311; F25B 2700/21152; F25B 2700/1931
See application file for complete search history.

(56) References Cited

U.S. PATENT DOCUMENTS

2008/0028779 A1* 2/2008 Song .................... F25B 41/062 62/190
2008/0236184 A1* 10/2008 Morozumi .......... F04C 18/3442 62/324.6
2009/0013700 A1* 1/2009 Unezaki ................. F25B 9/008 62/77
2009/0241569 A1* 10/2009 Okada .................... F25B 13/00 62/196.1
2012/0006050 A1* 1/2012 Takayama .............. F24F 3/065 62/513
2013/0233008 A1* 9/2013 Yamashita ............... F25B 1/10 62/196.1

FOREIGN PATENT DOCUMENTS

JP 8-210709 A 8/1996
JP H11094370 A * 4/1999
JP 2005-147437 A 6/2005
JP 2005147437 A * 6/2005
JP 2010-139205 A 6/2010
JP WO 2010113296 A1 * 10/2010 .............. F24F 3/065
JP 2010-271011 A 12/2010
JP WO 2012104890 A1 * 8/2012 ................ F25B 1/10
WO WO 2011135630 A1 * 11/2011 .............. F25B 13/00
WO 2012/104890 A1 8/2012

OTHER PUBLICATIONS

English translation of JP2005147437A.*
English translation of JPH11094370A.*
International Search Report of the International Searching Authority dated Jan. 8, 2013 for the corresponding international application No. PCT/JP2012/080135 (and English translation).
Office Action dated Jan. 5, 2016 in the corresponding JP application No. 2014-548362 (with English translation).
Extended European Search Report dated Jul. 27, 2016 issued in corresponding EP patent application No. 12888739.5.
Office Action dated Feb. 2, 2016 in the corresponding CN application No. 201280077204.4 (with English translation).

* cited by examiner

F I G. 2
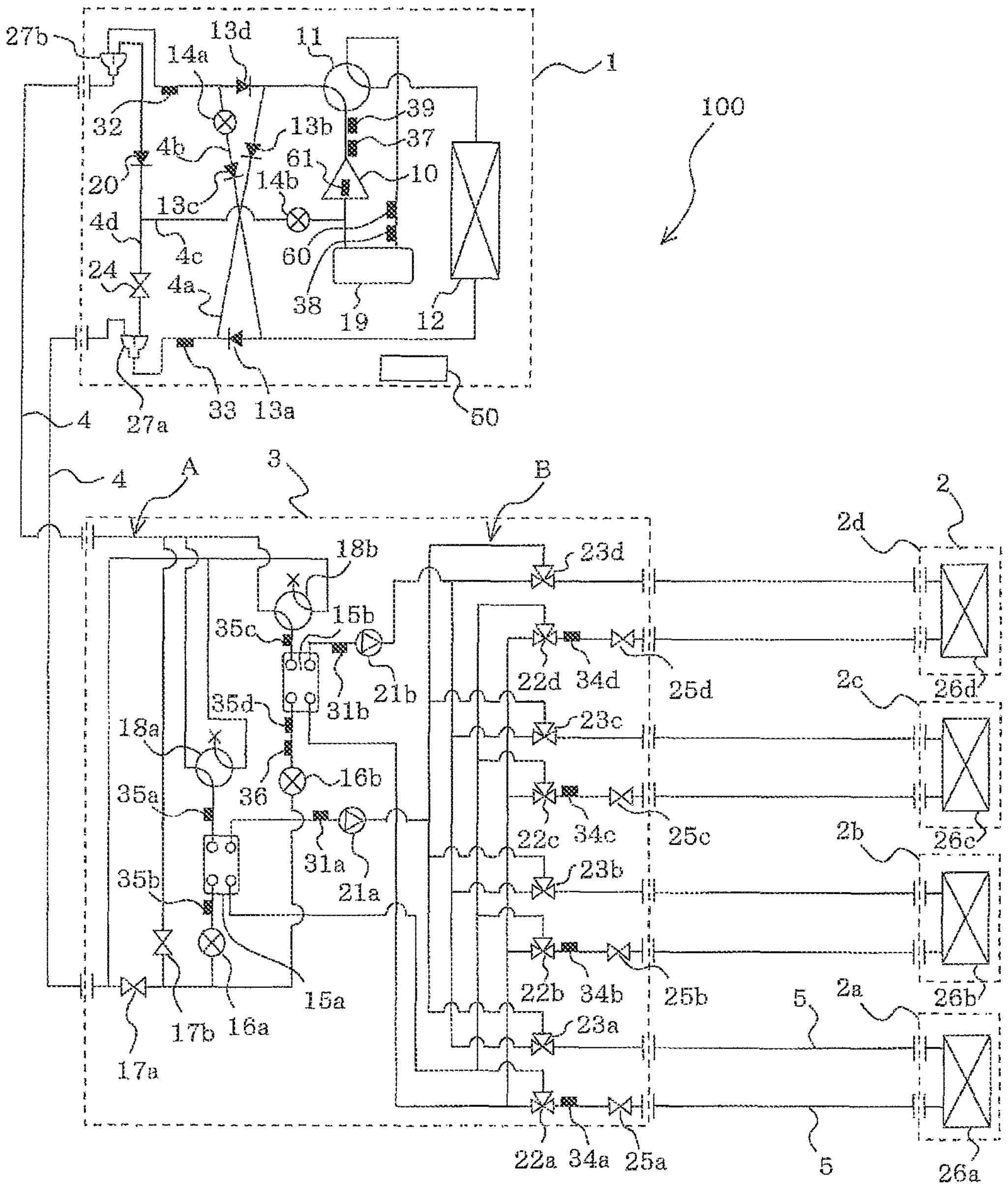

F I G. 3
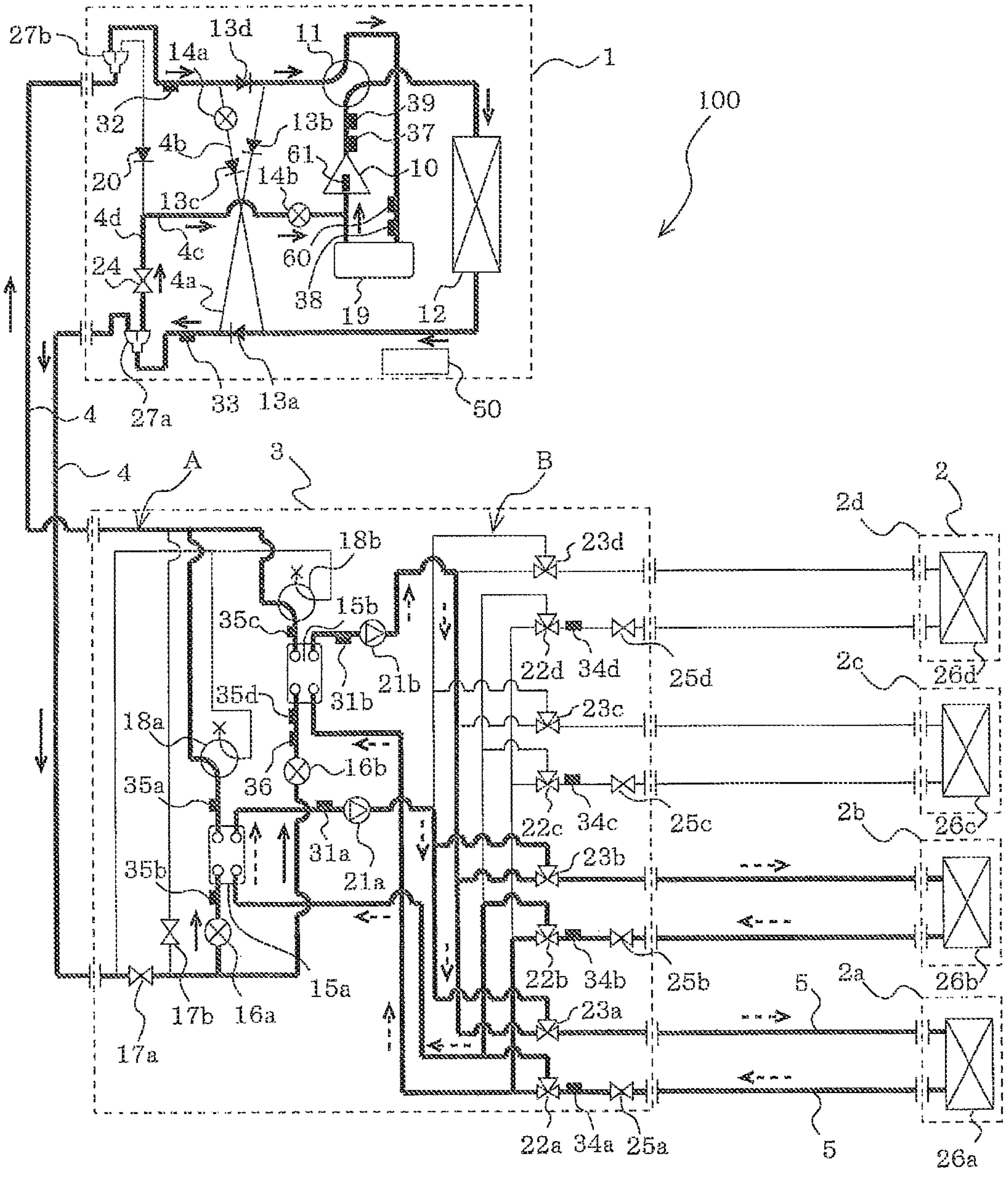

F I G. 5
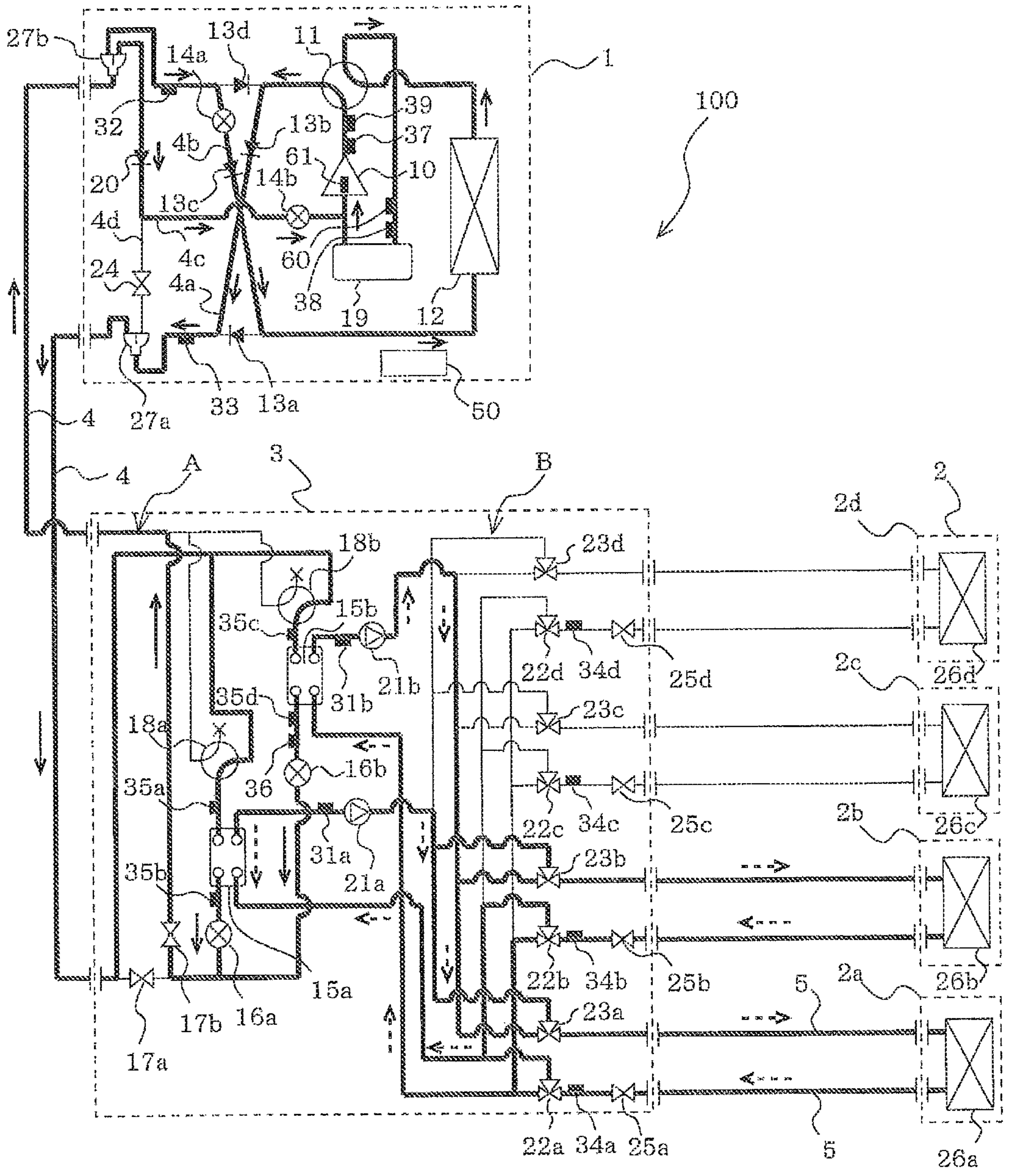

F I G. 6
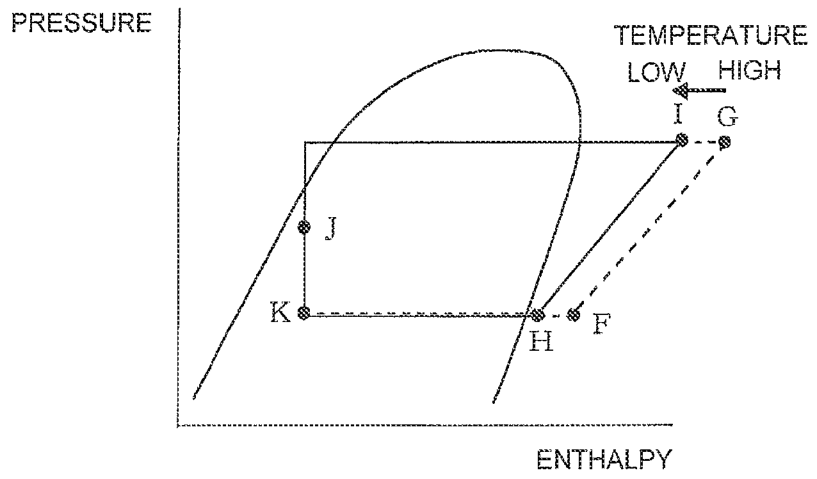

F I G. 7
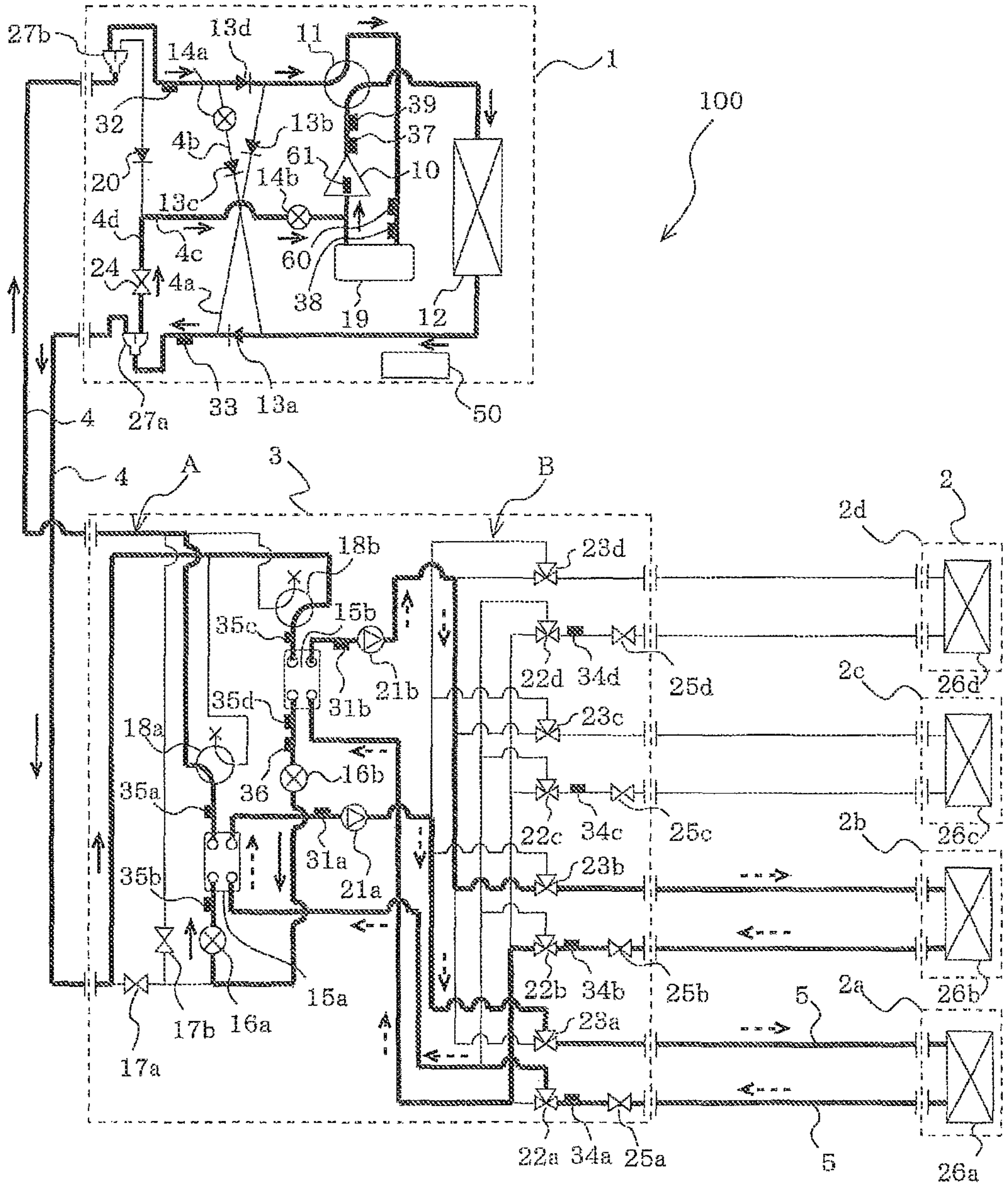

F I G. 9
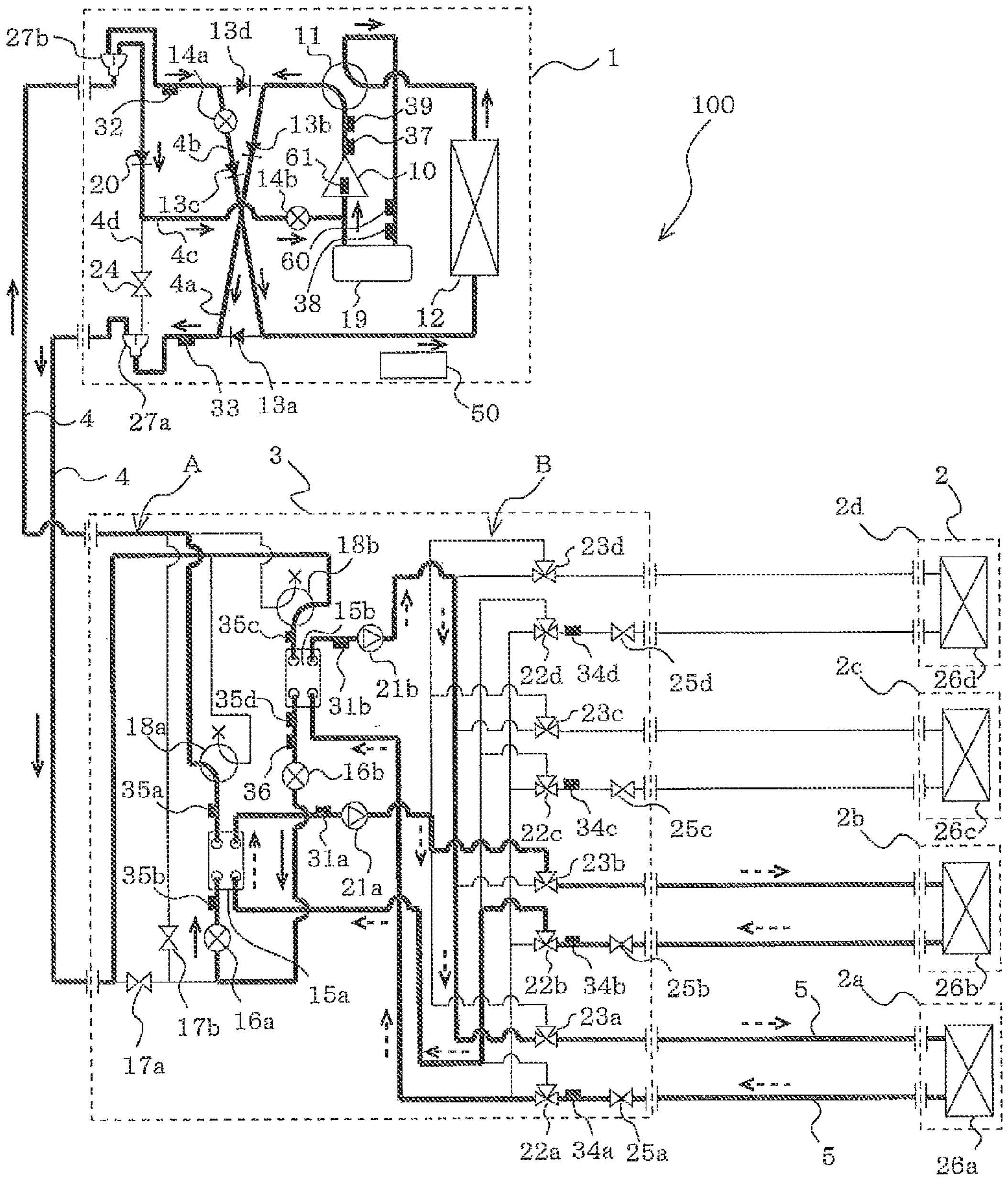

F I G. 1 4
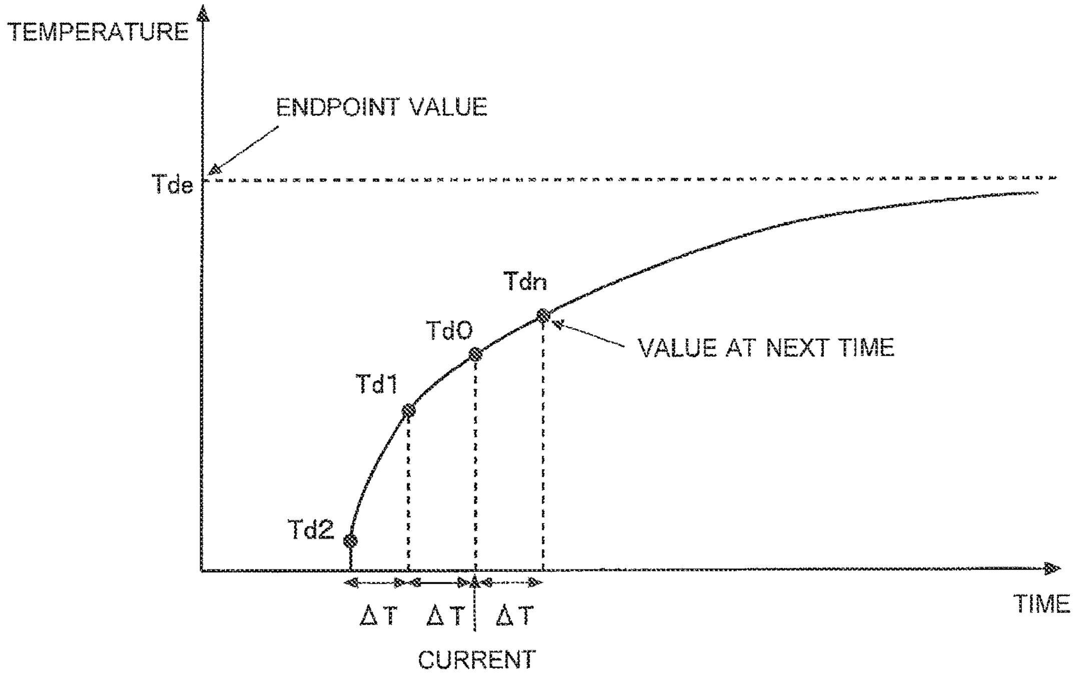

AIR-CONDITIONING APPARATUS

CROSS REFERENCE TO RELATED APPLICATIONS

This application is a U.S. national stage application of International Application No. PCT/JP2012/080135, filed on Nov. 21, 2012, the contents of which are incorporated herein by reference.

TECHNICAL FIELD

The present invention relates to an air-conditioning apparatus applied to a multi-air conditioning system for a building, for example.

BACKGROUND

A refrigeration device has been proposed in which a liquid receiver is connected to the downstream side of a condenser, and liquid refrigerant collected by the liquid receiver is supplied to a compressor via a liquid injection circuit to lower the temperature of discharge refrigerant from the compressor (for example, see Patent Literature 1).

The technique described in Patent Literature 1 detects the temperature of discharge refrigerant from the compressor, and varies the opening degree of a flow control valve according to the detected temperature to control the injection flow rate.

In addition, heat pump air conditioners equipped with a four-way valve that switch between cooling and heating by reversing the flow of refrigerant have been variously proposed (for example, see Patent Literature 2).

In the technique described in Patent Literature 2, an injection pipe is connected between a compressor and a pipe connecting an indoor heat exchanger to an outdoor heat exchanger, thereby enabling liquid refrigerant flowing through the pipe to be supplied to the compressor.

Furthermore, an air-conditioning apparatus equipped with a plurality of solenoid valves and able to perform a cooling and heating mixed operation in addition to cooling and heating has been proposed (for example, see Patent Literature 3).

In the technique described in Patent Literature 3, for injection during heating, an expansion device is provided on an injection circuit to inject refrigerant at an intermediate pressure (hereinafter designated intermediate pressure refrigerant) into a compressor.

In this way, the technologies described in Patent Literature 1 to 3 inject liquid refrigerant into a compressor and lower the temperature of discharge refrigerant from the compressor in order to minimize damage to the compressor.

PATENT LITERATURE

Patent Literature 1: Japanese Unexamined Patent Application Publication No. 7-260262 (for example, see FIG. 1)

Patent Literature 2: Japanese Unexamined Patent Application Publication No. 8-210709 (for example, see FIG. 1)

Patent Literature 3: Japanese Unexamined Patent Application Publication No. 2010-139205 (for example, see FIG. 1)

The refrigeration device in Patent Literature 1 performs injection when the flow direction of refrigerant is flowing in a first direction, and is not assumed injection when the flow direction of refrigerant is reversed, for example. Also, for the air-conditioning apparatus described in Patent Literature 2, although injection may still be performed even when the flow direction of refrigerant is reversed, injecting while performing the cooling and heating mixed operation is not assumed.

In other words, the technologies described in Patent Literature 1 and 2 are problematic in that the operation modes when conducting injection are limited, and to that extent, there is a possibility of convenience being impaired.

The technique described in Patent Literature 3 is able to inject during cooling, heating, as well as the cooling and heating mixed operation, but since the opening degree of the expansion device on the injection circuit is not specified, the pressure of the intermediate pressure refrigerant is not varied according to the situation.

In other words, the technique described in Patent Literature 3 is problematic in that the pressure of the intermediate pressure refrigerant is not controlled according to the operation mode, and thus damage to the compressor is more likely to occur, while the stability and reliability of the operation of the air-conditioning apparatus is lowered.

SUMMARY

The present invention solves the above problems, and takes as an objective to provide a highly reliable air-conditioning apparatus that improves operating stability by lowering the temperature of discharge refrigerant from a compressor, irrespective of operation mode.

An air-conditioning apparatus according to the present invention includes a compressor, a refrigerant flow switching device, a first heat exchanger, a first expansion device, and a second heat exchanger connected via refrigerant pipes, and constitutes a refrigerant circuit, the air-conditioning apparatus being provided with: a second expansion device provided on an upstream side of the first heat exchanger during the heating operation; an accumulator for accumulating excess refrigerant provided on an upstream side of the compressor; a suction injection pipe, having one end connected on an upstream side of the second expansion device during the heating operation, and another end connected to a flow channel between a suction side of the compressor and the accumulator; a third expansion device provided to the suction injection pipe; a medium pressure detector that detects a refrigerant pressure or a refrigerant saturation temperature on an upstream side of the second expansion device during the heating operation; a discharge refrigerant temperature detector that detects a discharge refrigerant temperature of the compressor; and a controller that controls an opening degree of the second expansion device and the third expansion device based on a detection result from the medium pressure detector and the discharge refrigerant temperature detector. Inside the refrigerant pipes, a refrigerant having a higher discharge refrigerant temperature than R410A is circulated as refrigerant. During heating operation, the controller performs medium pressure control that controls the opening degree of the second expansion device based on a deviation between a target value of medium pressure, and a detection result of the medium pressure detector or a predicted value. During the heating operation and a cooling operation, the controller controls the opening degree of the third expansion device based on a target value of the discharge refrigerant temperature of the compressor or a target value related to the discharge refrigerant temperature, and a detection result of the discharge refrigerant temperature detector or a value related to the discharge refrigerant temperature computed using a detected detection result, and regulates a flow rate of refrigerant to supply to the suction side of the compressor via the injection pipe.

Since an air-conditioning apparatus according to the present invention has the above configuration, it is possible to obtain a highly reliable air-conditioning apparatus that improves operating stability by lowering the temperature of discharge refrigerant from a compressor, irrespective of operation mode.

BRIEF DESCRIPTION OF DRAWINGS

FIG. 2 is an exemplary circuit layout of the air-conditioning apparatus according to Embodiment 1 of the present invention.

FIG. 3 is a diagram explaining the flow of refrigerant and heat medium during a cooling only operation of the air-conditioning apparatus illustrated in FIG. 2.

FIG. 5 is a diagram explaining the flow of refrigerant and heat medium during a heating only operation of the air-conditioning apparatus illustrated in FIG. 2.

FIG. 6 is a p-h chart during the heating only operation illustrated in FIG. 5.

FIG. 7 is a diagram explaining the flow of refrigerant and heat medium during cooling main operation of the air-conditioning apparatus illustrated in FIG. 2.

FIG. 9 is a diagram explaining the flow of refrigerant and heat medium during the heating only operation of the air-conditioning apparatus illustrated in FIG. 2.

FIG. 14 is a graph for explaining three-point prediction.

DETAILED DESCRIPTION

Embodiment 1.

Figure 1:
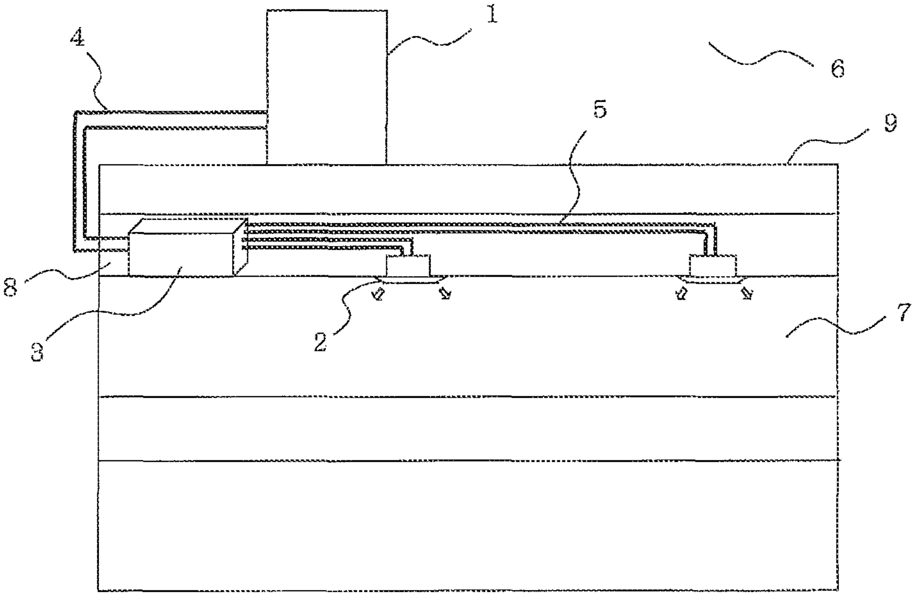
FIG. 1 is a schematic diagram illustrating an exemplary installation of an air-conditioning apparatus according to Embodiment 1 of the present invention.

An embodiment of the present invention will be described on the basis of the drawings. FIG. 1 is a schematic diagram illustrating an exemplary installation of an air-conditioning apparatus according to the present embodiment. An exemplary installation of the air-conditioning apparatus will be described on the basis of FIG. 1. With the present air-conditioning apparatus, each indoor unit is able to freely select a cooling mode or a heating mode as the operation mode by utilizing refrigeration cycles (a refrigerant circuit A and a heat medium circuit B) that circulate a refrigerant and a heat medium. Note that, in the drawings hereinafter, including FIG. 1, the relative sizes of respective structural members may differ from actual sizes in some cases.

In FIG. 1, the air-conditioning apparatus according to the present embodiment is equipped with one outdoor unit 1 which is the heat source unit, multiple indoor units 2, and a heat medium relay unit 3 interposed between the outdoor unit 1 and the indoor units 2. The heat medium relay unit 3 exchanges heat between the refrigerant (heat source side refrigerant) and the heat medium. The outdoor unit 1 and the heat medium relay unit 3 are connected by refrigerant pipes 4 that conduct the refrigerant. The heat medium relay unit 3 and the indoor units 2 are connected by pipes (heat medium pipes) 5 that conduct the heat medium. Also, cooling energy or heating energy generated at the outdoor unit 1 is transferred to the indoor units 2 via the heat medium relay unit 3.

The outdoor unit 1 is ordinarily placed in an outdoor space 6, which is a space outside a building or other facility 9 (such as the roof, for example), and provides cooling energy or heating energy to the indoor units 2 via the heat medium relay unit 3. The indoor units 2 are disposed at positions able to supply cooled air or heated air to an indoor space 7, which is a space inside the facility 9 (such as a room, for example), and provide cooled air or heated air to the indoor space 7 or air-conditioned space. The heat medium relay unit 3 is configured as a separate housing from the outdoor unit 1 and the indoor units 2 able to be installed in a separate location from the outdoor space 6 and the indoor space 7, is connected to the outdoor unit 1 and the indoor units 2 by the refrigerant pipe 4 and the heat medium pipes 5, respectively, and conveys cooling energy or heating energy supplied from the outdoor unit 1 to the indoor units 2.

As illustrated in FIG. 1, in the air-conditioning apparatus according to the present embodiment, the outdoor unit 1 and the heat medium relay unit 3 are connected using two refrigerant pipes 4, while the heat medium relay unit 3 and each of the indoor units 2 are connected by two pipes 5. In this way, by using two pipes (the refrigerant pipes 4 and the pipes 5) to connect each unit (the outdoor unit 1, the indoor units 2, and the heat medium relay unit 3) in the air-conditioning apparatus according to the present embodiment, construction becomes facilitate.

Note that FIG. 1 illustrates, as an example, a state in which the heat medium relay unit 3, although inside the facility 9, is installed in a space which is a separate space from the indoor space 7, such as above the ceiling (hereinafter simply designated the space 8). The heat medium relay unit 3 is otherwise installable in a shared space containing an elevator or the like. Also, although FIGS. 1 and 2 illustrate the case in which the indoor units 2 are ceiling cassettes as an example, the configuration is not limited thereto, and the indoor units 2 may be of any type, such as ceiling-concealed or ceiling-hung units, insofar as the indoor units 2 are able to expel heated air or cooled air into the indoor space 7 directly or via means such as ducts.

Although FIG. 1 illustrates the case of the outdoor unit 1 being installed in the outdoor space 6 as an example, the configuration is not limited thereto. For example, the outdoor unit 1 may also be installed in an enclosed space such as a ventilated machine room, and may be installed inside the facility 9 insofar as waste heat can be exhausted outside the facility 9 by an exhaust duct. Alternatively, the outdoor unit 1 may be installed inside the facility 9 using a water-cooled outdoor unit 1. Installing the outdoor unit 1 in any such location is not particularly problematic.

It is also possible to install the heat medium relay unit 3 near the outdoor unit 1. However, the heat medium pumping power will be very large if the distance from the heat medium relay unit 3 to the indoor units 2 is too long, and thus care must be taken not to squander the energy-saving advantages. Furthermore, the number of connected outdoor units 1, indoor units 2, and heat medium relay units 3 is not limited to the numbers illustrated in FIGS. 1 and 2, and it is sufficient to determine numbers according to the facility 9 where the air-conditioning apparatus according to the present embodiment is installed.

FIG. 2 is an exemplary circuit layout of an air-conditioning apparatus (hereinafter designated the air-conditioning apparatus 100) according to the present Embodiment 1. A detailed configuration of the air-conditioning apparatus 100 will be described on the basis of FIG. 2.

As illustrated in FIG. 2, the outdoor unit 1 and the heat medium relay unit 3 are connected by refrigerant pipes 4 via an intermediate heat exchanger 15*a* and an intermediate heat exchanger 15*b* provided in the heat medium relay unit 3. Also, the heat medium relay unit 3 and the indoor units 2 are likewise connected by the pipes 5 via the intermediate heat exchanger 15*a* and the intermediate heat exchanger 15*b*. Note that the refrigerant pipes 4 will be further discussed at a later stage.

The air-conditioning apparatus 100 includes a refrigerant circuit A, which is a refrigeration cycle that circulates a refrigerant, as well as a heat medium circuit B that circulates a heat medium. Each of the indoor units 2 is able to select between a cooling operation and a heating operation. Additionally, it is possible to conduct a cooling only operation mode, which is a mode in which all operating indoor units 2 execute the cooling operation, a heating only operation mode, which is a mode in which all indoor units 2 execute the heating operation, and a cooling and heating mixed operation mode, which is a mode in which indoor units execute a mix of the cooling operation and heating operation. Note that the cooling and heating mixed operation mode includes a cooling main operation mode in which the cooling load is greater, and a heating main operation mode in which the heating load is greater. The cooling only operation mode, the heating only operation mode, the cooling main operation mode, and the heating main operation mode will be described in detail with the description of FIGS. 3 to 10.

[Outdoor Unit 1]

The outdoor unit 1 is equipped with a compressor 10, a first refrigerant flow switching device 11 such as a four-way valve, a heat source side heat exchanger 12, and an accumulator 19, which are connected in series by the refrigerant pipes 4.

The outdoor unit 1 is also provided with a first connecting pipe 4*a*, a second connecting pipe 4*b*, a check valve 13*a*, a check valve 13*b*, a check valve 13*c*, and a check valve 13*d*.

Furthermore, the outdoor unit 1 is equipped with a branching unit 27*a*, a branching unit 27*b*, an opening and closing device 24, a backflow prevention device 20, an expansion device 14*a*, an expansion device 14*b*, a medium pressure detection device 32, a discharge refrigerant temperature detection device 37, a suction refrigerant temperature detection device 38, a branch refrigerant temperature detection device 33, a high pressure detection device 39, a suction pressure detection device 60, a compressor shell temperature detection device 61, a suction injection pipe 4*c*, a branch pipe 4*d*, and a controller 50.

The compressor 10 suctions refrigerant and compresses the refrigerant to a high temperature, high pressure state. The compressor 10 may be configured as a variable-capacity inverter compressor or the like, for example. The discharge side of the compressor 10 is connected to the first refrigerant flow switching device 11, while the suction side is connected to the suction injection pipe 4*c* and the accumulator 19. The compressor 10 is a low-pressure shell-type compressor, which also includes a compression chamber inside a hermetically sealed container, in which the inside of the hermetically sealed container is in a low-pressure refrigerant pressure environment, and that suctions and compresses low-pressure refrigerant inside the hermetically sealed container into the compression chamber. In addition, the compressor 10 is connected to the suction injection pipe 4*c* connected to the refrigerant pipe 4 between the suction side of the compressor 10 and the accumulator 19, making it possible to supply high pressure or medium pressure refrigerant to the suction injection pipe 4*c*.

In the lower part of the compressor 10, refrigerant and oil (refrigerating machine oil) flowing in from the suction side of the compressor 10 is able to flow in. Also, the compressor 10 includes a middle part where a motor is disposed, in which the refrigerant flowing in from the lower part of the compressor 10 is compressed. Furthermore, in the upper part of the compressor 10, a discharge chamber made up of a hermetically sealed container is provided, making it possible to discharge the refrigerant and oil compressed in the middle part. In this way, the compressor 10 includes a portion exposed to high temperature and high pressure refrigerant as in the upper part of the compressor 10, and a portion exposed to low temperature and low pressure refrigerant as in the lower part of the compressor 10, and thus the temperature of the hermetically sealed container constituting the compressor 10 becomes an intermediate temperature therebetween. Note that while the compressor 10 is operating, the motor generates heat due to an electric current supplied to the motor in the middle part. Consequently, the low temperature and low pressure two-phase gas-liquid refrigerant suctioned into the compressor 10 is heated by the hermetically sealed container and the motor of the compressor 10.

The first refrigerant flow switching device 11 switches between a flow of refrigerant during the heating operation (during the heating only operation mode and during the heating main operation mode discussed later) and a flow of refrigerant during the cooling operation (during the cooling only operation mode and during the cooling main operation mode discussed later). Note that FIG. 2 illustrates a state in which the first refrigerant flow switching device 11 is connected to the discharge side of the compressor 10 and the first connecting pipe 4*a,* and connected to the heat source side heat exchanger 12 and the accumulator 19.

The heat source side heat exchanger 12 functions as an evaporator during the heating operation, functions as a condenser (or radiator) during the cooling operation, and exchanges heat between the refrigerant and air supplied from an air-sending device such as a fan (not illustrated), causing that refrigerant to evaporate and gasify or condense and liquefy. One side of the heat source side heat exchanger 12 is connected to the first refrigerant flow switching device 11, while the other side is connected to the refrigerant pipe 4 on which the check valve 13*a* is provided.

The accumulator 19 is provided on the suction side of the compressor 10, and accumulates excess refrigerant. One side of the accumulator 19 is connected to the first refrigerant flow switching device 11, while the other side is connected to the suction side of the compressor 10.

The check valve 13*a* is provided on a refrigerant pipe 4 between the heat source side heat exchanger 12 and the heat medium relay unit 3, and allows the flow of refrigerant only in a designated direction (the direction from the outdoor unit 1 to the heat medium relay unit 3). The check valve 13*b* is provided on the first connecting pipe 4*a,* and causes the refrigerant discharged from the compressor 10 during the heating operation to circulate only in the direction towards the heat medium relay unit 3. The check valve 13*c* is provided on the second connecting pipe 4*b,* and causes the refrigerant returning from the heat medium relay unit 3 during the heating operation to flow to the suction side of the compressor 10. The check valve 13*d* is provided on a refrigerant pipe 4 between the heat medium relay unit 3 and the first refrigerant flow switching device 11, and allows the flow of refrigerant only in a designated direction (the direction from the heat medium relay unit 3 to the outdoor unit 1).

The first connecting pipe 4*a* connects, inside the outdoor unit 1, the refrigerant pipe 4 between the first refrigerant flow switching device 11 and the check valve 13*d,* and the refrigerant pipe 4 between the check valve 13*a* and the heat medium relay unit 3.

The second connecting pipe 4*b* connects, inside the outdoor unit 1, the refrigerant pipe 4 between the check valve 13*d* and the heat medium relay unit 3, and refrigerant pipe 4 between the heat source side heat exchanger 12 and the check valve 13*a*. By providing the first connecting pipe 4*a,* the second connecting pipe 4*b,* and the check valves 13*a* to 13*d,* it is possible to keep the flow of refrigerant flowing into the heat medium relay unit 3 going in a fixed direction, regardless of the operation demanded by the indoor units 2.

The two branching units 27 (branching unit 27*a,* branching unit 27*b*) cause inflowing refrigerant to branch. The refrigerant inflow side of the branching unit 27*a* is connected to the refrigerant pipe 4 on which the check valve 13*a* is provided, while one end on the refrigerant outflow side is connected to the refrigerant pipe 4 that connects the outdoor unit 1 and the heat medium relay unit 3, and the other end on the refrigerant outflow side is connected to the branch pipe 4*d*. Also, the refrigerant inflow side of the branching unit 27*b* is connected to the refrigerant pipe 4 that connects the heat medium relay unit 3 and the outdoor unit 1, while one end of the refrigerant outflow side is connected to the refrigerant pipe 4 on which the check valve 13*d* is provided and the second connecting pipe 4*b,* and the other end of the refrigerant outflow side is connected to the branch pipe 4*d*. Note that the branching units 27 may be made up of Y-junctions, T-junctions, or the like, for example.

Liquid refrigerant or two-phase gas-liquid refrigerant flows into the branching units 27, depending on the operation mode of the air-conditioning apparatus 100. For example, in the case of the cooling main operation mode, two-phase gas-liquid refrigerant flows into the branching unit 27*a,* while in the case of the heating only operation mode and the heating main operation mode, two-phase gas-liquid refrigerant flows into the branching unit 27*b*. Accordingly, in order to equally distribute the two-phase gas-liquid refrigerant, the branching units 27 are structured so as to split the flow in a configuration state such that refrigerant branches into two after flowing from bottom to top. In other words, take the refrigerant inflow side of the branching units 27 to be the lower side (lower in the gravitational direction), and take the refrigerant outflow sides of the branching units 27 (both sides) to be the upper side (upper in the gravitational direction). In so doing, two-phase gas-liquid refrigerant flowing into the branching units 27 may be equally distributed, and it is possible to moderate reductions in the air conditioning performance of the air-conditioning apparatus 100.

The opening and closing device 24 opens and closes the flow between the branching unit 27*a* and the suction injection pipe 4*c*. The opening and closing device 24 opens in the case of injecting in the cooling only operation mode and in the case of injecting in the cooling main operation mode, and closes in the case of not injecting. In addition, the opening and closing device 24 closes in the heating only operation mode and the heating main operation mode. The opening and closing device 24 is provided on the branch pipe 4*d,* with one end connected to the branching unit 27*a,* and the other end connected to the suction injection pipe 4*c*. Note that the opening and closing device 24 may be anything capable of switching a flow open/closed, such as a solenoid valve capable of open/close switching, an electronic expansion valve capable of varying an aperture surface area, or the like.

The backflow prevention device 20 makes refrigerant flow from the branching unit 27*b* to the suction injection pipe 4*c* in the case of injecting in the heating only operation mode and the case of injecting in the heating main operation mode. Note that the backflow prevention device 20 closes in the case of injecting in the cooling only operation mode and the case of injecting in the cooling main operation mode. Note that although FIG. 2 illustrates the case in which the backflow prevention device 20 is a check valve as an example, a solenoid valve capable of open/close switching, an electronic expansion valve capable of varying an aperture surface area, or the like is also acceptable.

The medium pressure detection device 32 detects the pressure of refrigerant flowing between the branching unit 27*b* and the expansion device 14*a*. In other words, the medium pressure detection device 32 detects the pressure of medium pressure refrigerant that was depressurized by the expansion devices 16 of the heat medium relay unit 3 and returned to the outdoor unit 1. The medium pressure detection device 32 is provided between the branching unit 27*b* and the expansion device 14*a*.

The high pressure detection device 39 detects the pressure of refrigerant that was pressurized by the compressor 10 and reached high pressure. The high pressure detection device 39 is provided on the refrigerant pipe 4 connected on the discharge side of the compressor 10.

The medium pressure detection device 32 and the high pressure detection device 39 may be pressure sensors, but may also be made up of temperature sensors. In other words, it is also possible to enable the controller 50 to compute a medium pressure by computation on the basis of a detected temperature.

The discharge refrigerant temperature detection device 37 detects the temperature of refrigerant discharged from the compressor 10, and is provided on the refrigerant pipe 4 connected on the discharge side of the compressor 10.

A suction refrigerant temperature detection device 38 detects the temperature of refrigerant flowing into the compressor 10, and is provided on the refrigerant pipe 4 on the downstream side of the accumulator 19.

A branch refrigerant temperature detection device 33 detects the temperature of refrigerant flowing into the branching unit 27*a*, and is provided in the flow on the inflow side of the branching unit 27*a*.

A suction pressure detection device 60 detects the pressure of refrigerant suctioned into the compressor 10, and is provided on the refrigerant pipe 4 on the upstream side of the accumulator 19.

A compressor shell temperature detection device 61 detects the temperature of the shell of the compressor 10, and is provided on the bottom of the shell of the compressor 10. Note that the compressor 10 provided with the compressor shell temperature detection device 61 is a low-pressure shell-structure compressor, which typically includes a compression chamber inside a hermetically sealed container (the shell), in which the inside of the hermetically sealed container is in a low-pressure refrigerant pressure environment, and that suctions and compresses low-pressure refrigerant inside the hermetically sealed container into the compression chamber. However, in Embodiment 1, the compressor 10 is not limited to such a compressor.

The two expansion devices 14 (expansion device 14*a*, expansion device 14*b*) function as a pressure-reducing valve or an expansion valve, dropping the pressure to cause refrigerant to expand. The expansion device 14*a* is provided on the second connecting pipe 4*b* (the flow leading from the branching unit 27*b* to the heat source side heat exchanger 12 in the heating only operation mode and the heating main operation mode discussed later), and is provided on the upstream side of the check valve 13*c*. Meanwhile, the expansion device 14*b* is provided on the suction injection pipe 4*c*. Two-phase gas-liquid refrigerant flows into the expansion device 14*a* in the case of the heating only operation mode and the heating main operation mode. Meanwhile, liquid refrigerant flows into the expansion device 14*b* during the cooling only operation mode, whereas refrigerant in a two-phase gas-liquid state flows into the expansion device 14*b* in the case of the cooling main operation mode, the heating only operation mode, and the heating main operation mode.

The expansion device 14*a* may be configured as an electronic expansion valve that is capable of varying an aperture surface area. If the expansion device 14*a* is configured with an electronic expansion valve, it is possible to control the pressure on the upstream side of the expansion device 14*a* to an arbitrary pressure. Note that the expansion device 14*a* is not limited to an electronic expansion valve, and although controllability suffers slightly, compact solenoid valves or the like may also be combined to enable selecting from multiple aperture surface areas, or configured as a capillary tube such that a medium pressure is formed due to refrigerant pressure loss.

Also, the expansion device 14*b* likewise may be configured as an electronic expansion valve that is capable of varying an aperture surface area. In the case of injecting, this expansion device 14*b* controls the aperture surface area of the expansion device 14*b* such that the discharge refrigerant temperature of the compressor 10 detected by the discharge refrigerant temperature detection device 37 does not become too high.

The suction injection pipe 4*c* is a pipe that supplies liquid refrigerant to the compressor 10. Herein, suction injection refers supplying liquid refrigerant to the refrigerant pipe 4 between the compressor 10 and the accumulator 19, or in other words, on the suction side of the compressor 10.

One end of the suction injection pipe 4*c* is connected to the branch pipe 4*d*, while the other end is connected to the refrigerant pipe 4 that connects the accumulator 19 and the compressor 10. The expansion device 14*b* is provided on the suction injection pipe 4*c*.

The branch pipe 4*d* is a pipe for leading refrigerant to the suction injection pipe 4*c* in the case of injection into the compressor 10. The branch pipe 4*d* is connected to the branching unit 27*a*, the branching unit 27*b*, and the suction injection pipe 4*c*. The backflow prevention device 20 and the opening and closing device 24 are provided on the branch pipe 4*d*.

The controller 50 is made up of a microcontroller or the like, and conducts control on the basis of detected information from various detection devices as well as instructions from a remote control. Besides controlling the actuators discussed earlier, the controller 50 is configured to control the driving frequency of the compressor 10, the rotation speed of the air-sending device provided in the heat source side heat exchanger 12 (including ON/OFF), the opening and closing of the opening and closing device 24, the opening degree (expansion amount) of the expansion device 14, the switching of the first refrigerant flow switching device 11, and various equipment provided in the heat medium relay unit 3 and the indoor units 2, and to execute the respective operation modes discussed later.

During the cooling only operation mode and the cooling main operation mode, the controller 50 is able to control the flow rate of refrigerant to inject by opening the opening and closing device 24 and adjusting the opening degree of the expansion device 14*b*. Also, during the heating only operation mode and the heating main operation mode, the controller 50 is able to control the flow rate of refrigerant to inject by closing the opening and closing device 24 and adjusting the opening degrees of the expansion device 14*a* and the expansion device 14*b*. Then, by injecting into the compressor 10, it is possible to reduce the temperature of refrigerant discharged from the compressor 10. Note that specific control operations will be described in the operational description of each operation mode discussed later.

Note that in the case of injecting, control of the discharge refrigerant temperature by the expansion device 14*b* stabilizes if, for the expansion device 14*a*, the controller 50 controls the opening degree of the expansion device 14*a* such that the medium pressure detected by the medium pressure detection device 32 becomes a fixed value (target value) during the heating only operation mode and the heating main operation mode.

More specifically, control of the discharge refrigerant temperature by the expansion device 14*b* stabilizes if the controller 50 controls the opening degree of the expansion device 14*a* such that the detected pressure of the medium pressure detection device 32 or the saturation pressure of the detected temperature of the medium pressure detection device 32, or alternatively, the detected temperature of the medium pressure detection device 32 or the saturation temperature of the detected pressure of the medium pressure detection device 32, reaches a fixed value (target value).

Also, in the case of injecting, for the expansion device 14*b* the controller 50 may control the aperture surface area of the expansion device 14*b* such that the discharge refrigerant temperature of the compressor 10 detected by the discharge refrigerant temperature detection device 37 does not become too high.

More specifically, upon determining that the discharge refrigerant temperature has exceeded a fixed value (such as 110 degrees C., for example), the expansion device 14*b* may be controlled to open a fixed opening degree, such as 10 pulses each, for example, or the opening degree of the expansion device 14*b* may be controlled such that the discharge refrigerant temperature becomes a target value (100 degrees C., for example), or controlled such that the discharge refrigerant temperature becomes less than or equal to a target value (100 degrees C., for example), or controlled such that the discharge refrigerant temperature falls within a target range (between 90 degrees C. to 100 degrees C., for example).

Furthermore, the controller 50 may also be configured to compute a discharge degree of superheat of the compressor 10 from the detected temperature of the discharge refrigerant temperature detection device 37 and the detected pressure of the high pressure detection device 39, and control the opening degree of the expansion device 14*b* such that the discharge degree of superheat becomes a target value (40 degrees C., for example), or apply control such that the discharge degree of superheat becomes less than or equal to a target value (40 degrees C., for example), or apply control such that the discharge degree of superheat falls within a target range (between 20 degrees C. and 40 degrees C., for example).

[Indoor Units 2]

The indoor units 2 are respectively equipped with use side heat exchangers 26. The use side heat exchangers 26 are connected to heat medium flow control devices 25 and second heat medium flow switching devices 23 of the heat medium relay unit 3 by the pipes 5. The use side heat exchangers 26 exchange heat between heat medium and air supplied from an air-sending device such as a fan (not illustrated), and generate heated air or cooled air to supply to the indoor space 7.

FIG. 2 illustrates a case in which four indoor units 2 are connected to the heat medium relay unit 3 as an example, these being indicated as an indoor unit 2*a*, an indoor unit 2*b*, an indoor unit 2*c*, and an indoor unit 2*d* from the bottom of the page. Also, the use side heat exchanger 26 are indicated as a use side heat exchanger 26*a*, a use side heat exchanger 26*b*, a use side heat exchanger 26*c*, and a use side heat exchanger 26*d* from the bottom of the page, in correspondence with the indoor unit 2*a* to the indoor unit 2*d*. Note that, similarly to FIG. 1, the number of connected indoor units 2 is not limited to the four as illustrated in FIG. 2.

[Heat Medium Relay Unit 3]

The heat medium relay unit 3 is equipped with two intermediate heat exchangers 15, two expansion devices 16, two opening and closing devices 17, two second refrigerant flow switching devices 18, two pumps 21, four first heat medium flow switching devices 22, four second heat medium flow switching devices 23, and four heat medium flow control devices 25.

The two intermediate heat exchangers 15 (intermediate heat exchanger 15*a*, intermediate heat exchanger 15*b*) function as condensers (radiators) or evaporators, exchanging heat between refrigerant and a heat medium, and transferring cooling energy or heating energy generated by the outdoor unit 1 and stored in the refrigerant to the heat medium. The intermediate heat exchanger 15*a* is provided between the expansion device 16*a* and the second refrigerant flow switching device 18*a* on the refrigerant circuit A, serving to cool the heat medium during the cooling only operation mode, heat the heat medium during the heating only operation mode, and cool the heat medium during the cooling and heating mixed operation mode. Meanwhile, the intermediate heat exchanger 15*b* is provided between the expansion device 16*b* and the second refrigerant flow switching device 18*b* on the refrigerant circuit A, serving to cool the heat medium during the cooling only operation mode, heat the heat medium during the heating only operation mode, and heat the heat medium during the cooling and heating mixed operation mode.

The two expansion devices 16 (expansion device 16*a*, expansion device 16*b*) have the function of a pressure-reducing valve or an expansion valve, dropping the pressure to cause refrigerant to expand. The expansion device 16*a* is provided on the upstream side of the intermediate heat exchanger 15*a* with respect to the flow of refrigerant during the cooling operation. The expansion device 16*b* is provided on the upstream side of the intermediate heat exchanger 15*b* with respect to the flow of refrigerant during the cooling operation. The two expansion devices 16 may have variably controllable opening degrees, and may be configured as an electronic expansion valve or the like, for example.

The two opening and closing devices 17 (opening and closing device 17*a*, opening and closing device 17*b*) are made up of a two-way valve or the like, and opening and closing the refrigerant pipes 4. The opening and closing device 17*a* is provided in a refrigerant pipe 4 at the refrigerant inlet side. The opening and closing device 17*b* is provided in a pipe connecting refrigerant pipes 4 on the refrigerant inlet side and outlet side. The two second refrigerant flow switching devices 18 (second refrigerant flow switching device 18*a*, second refrigerant flow switching device 18*b*) are made up of a four-way valve or the like, switching the flow of refrigerant according to the operation mode. The second refrigerant flow switching device 18*a* is provided on the downstream side of the intermediate heat exchanger 15*a* with respect to the flow of refrigerant during the cooling operation. The second refrigerant flow switching device 18*b* is provided on the downstream side of the intermediate heat exchanger 15*b* with respect to the flow of refrigerant during the cooling only operation.

The two pumps 21 (pump 21*a*, pump 21*b*) circulate the heat medium conducted through the pipes 5. The pump 21*a* is provided on a pipe 5 between the intermediate heat exchanger 15*a* and the second heat medium flow switching devices 23. The pump 21*b* is provided on a pipe 5 between the intermediate heat exchanger 15*b* and the second heat medium flow switching devices 23. The two pumps 21 may be configured as variable-capacity pumps or the like, for example.

The four first heat medium flow switching devices 22 (first heat medium flow switching device 22*a* to first heat medium flow switching device 22*d*) are made up of a three-way valve or the like, and switch the flow of the heat medium. The number of first heat medium flow switching devices 22 provided corresponds to the number of installed indoor units 2 (herein, four). In the first heat medium flow switching devices 22, one of the three ways is connected to the intermediate heat exchanger 15*a*, one of the three ways is connected to the intermediate heat exchanger 15*b*, and one of the three ways is connected to the heat medium flow control devices 25, and are provided on the outlet side of the heat medium flows of the use side heat exchangers 26. Note that the first heat medium flow switching devices 22 are indicated as a first heat medium flow switching device 22*a*, a first heat medium flow switching device 22*b*, a first heat medium flow switching device 22*c*, and a first heat medium flow switching device 22*d* from the bottom of the page, in correspondence with the indoor units 2.

The four second heat medium flow switching devices 23 (second heat medium flow switching device 23*a* to second heat medium flow switching device 23*d*) are made up of a three-way valve or the like, and switch the flow of the heat medium. The number of second heat medium flow switching devices 23 provided corresponds to the number of installed indoor units 2 (herein, four). In the second heat medium flow switching devices 23, one of the three ways is connected to the intermediate heat exchanger 15*a*, one of the three ways is connected to the intermediate heat exchanger 15*b*, and one of the three ways is connected to the use side heat exchangers 26, and are provided on the inlet side of the heat medium flows of the use side heat exchangers 26. Note that the second heat medium flow switching devices 23 are indicated as a second heat medium flow switching device 23*a*, a second heat medium flow switching device 23*b*, a second heat medium flow switching device 23*c*, and a second heat medium flow switching device 23*d* from the bottom of the page, in correspondence with the indoor units 2.

The four heat medium flow control devices 25 (heat medium flow control device 25*a* to heat medium flow control device 25*d*) are made up of a two-way valve or the like with a controllable opening surface area, and control the flow rate flowing through the pipes 5. The number of heat medium flow control devices 25 provided corresponds to the number of installed indoor units 2 (herein, four). The heat medium flow control devices 25 are connected to the use side heat exchangers 26 on one end and to the first heat medium flow switching devices 22 on the other end, and are provided on the outlet side of the heat medium flow channel of the use side heat exchangers 26. Note that the heat medium flow control devices 25 are indicated as a heat medium flow control device 25*a*, a heat medium flow control device 25*b*, a heat medium flow control device 25*c*, and a heat medium flow control device 25*d* from the bottom of the page, in correspondence with the indoor units 2. Also, the heat medium flow control devices 25 may be provided on the inlet side of the heat medium flow channels of the use side heat exchangers 26.

The heat medium relay unit 3 is further provided with various detection devices (two first temperature sensors 31, four second temperature sensors 34, four third temperature sensors 35, and one pressure sensor 36). Information detected by these detection devices (temperature information, pressure information) is sent to a controller (not illustrated) that centrally controls operation of the air-conditioning apparatus 100, and is used to control the driving frequency of the compressor 10, the rotation speed of the air-sending device that is not illustrated, the switching of the first refrigerant flow switching device 11, the driving frequency of the pumps 21, the switching of the second refrigerant flow switching devices 18, the switching of the flow of the heat medium, and the like.

The two first temperature sensors 31 (first temperature sensor 31*a*, first temperature sensor 31*b*) detect the temperature of the heat medium flowing out from the intermediate heat exchangers 15, or in other words, the heat medium at the outlets of the intermediate heat exchangers 15, and may be made up of thermistors or the like, for example. The first temperature sensor 31*a* is provided in the pipe 5 on the inlet side of the pump 21*a*. The first temperature sensor 31*b* is provided in the pipe 5 on the inlet side of the pump 21*b*.

The four second temperature sensors 34 (second temperature sensor 34*a* to second temperature sensor 34*d*) are provided between the first heat medium flow switching devices 22 and the heat medium flow control devices 25, detect the temperature of the heat medium flowing out from the use side heat exchangers 26, and may be made up of thermistors or the like. The number of second temperature sensors 34 provided corresponds to the number of installed indoor units 2 (herein, four). Note that the second temperature sensors 34 are indicated as a second temperature sensor 34*a*, a second temperature sensor 34*b*, a second temperature sensor 34*c*, and a second temperature sensor 34*d* from the bottom of the page, in correspondence with the indoor units 2.

The four third temperature sensors 35 (third temperature sensor 35*a* to third temperature sensor 35*d*) are provided on the refrigerant inlet side or outlet side of the intermediate heat exchangers 15, detect the temperature of refrigerant flowing into the intermediate heat exchangers 15 or the temperature of refrigerant flowing out from the intermediate heat exchangers 15, and may be made up of thermistors or the like. The third temperature sensor 35*a* is provided between the intermediate heat exchanger 15*a* and the second refrigerant flow switching device 18*a*. The third temperature sensor 35*b* is provided between the intermediate heat exchanger 15*a* and the expansion device 16*a*. The third temperature sensor 35*c* is provided between the intermediate heat exchanger 15*b* and the second refrigerant flow switching device 18*b*. The third temperature sensor 35*d* is provided between the intermediate heat exchanger 15*b* and the expansion device 16*b*.

The pressure sensor 36 is provided between the intermediate heat exchanger 15*b* and the expansion device 16*b*, similarly to the installation position of the third temperature sensor 35*d*, and detects the pressure of refrigerant flowing between the intermediate heat exchanger 15*b* and the expansion device 16*b*.

Additionally, a controller provided in the heat medium relay unit 3 (not illustrated) is made up of a microcontroller or the like, and on the basis of detected information from various detection devices as well as instructions from a remote control, controls the driving of the pumps 21, the opening degree of the expansion devices 16, the opening degree of the opening and closing devices 17, the switching of the second refrigerant flow switching devices 18, the switching of the first heat medium flow switching devices 22, the switching of the second heat medium flow switching devices 23, the opening degree of the heat medium flow control devices 25, and the like, and execute the respective operation modes discussed later. Note that a controller that controls the operations of both the outdoor unit 1 and the heat medium relay unit 3 may also be provided in only one of the outdoor unit 1 and the heat medium relay unit 3.

[Refrigerant Pipes 4]

The outdoor unit 1 and the heat medium relay unit 3 are connected by refrigerant pipes 4, and refrigerant flows through the refrigerant pipes 4.

[Pipes 5]

The heat medium relay unit 3 and the indoor units 2 are connected by (heat medium) pipes 5, and a heat medium such as water or antifreeze flows through the pipes 5.

The pipes 5 that conduct the heat medium are made up of those connected to the intermediate heat exchanger 15*a*, and those connected to the intermediate heat exchanger 15*b*. The pipes 5 are branched according to the number of indoor units 2 connected to the heat medium relay unit 3 (herein, a four-way branch each). Additionally, the pipes 5 are connected by the first heat medium flow switching devices 22 and the second heat medium flow switching devices 23. By controlling the first heat medium flow switching devices 22 and the second heat medium flow switching devices 23, it is decided whether to circulate a heat medium from the intermediate heat exchanger 15*a* into the use side heat exchangers 26, or circulate the heat medium from the intermediate heat exchanger 15*b* into the use side heat exchangers 26.

In addition, in the air-conditioning apparatus 100, the compressor 10, the first refrigerant flow switching device 11, the heat source side heat exchanger 12, the opening and closing devices 17, the second refrigerant flow switching devices 18, the refrigerant flow of the intermediate heat exchanger 15*a*, the expansion devices 16, and the accumulator 19 are connected by the refrigerant pipes 4 to constitute a refrigerant circuit A. Meanwhile, the heat medium flow of the intermediate heat exchanger 15*a*, the pumps 21, the first heat medium flow switching devices 22, the heat medium flow control devices 25, the use side heat exchangers 26, and the second heat medium flow switching devices 23 are connected by the pipes 5 to constitute a heat medium circuit B. In other words, multiple use side heat exchangers 26 are connected in parallel to each of the intermediate heat exchangers 15, making the heat medium circuit B a multi-branch circuit.

Thus, in the air-conditioning apparatus 100, the outdoor unit 1 and the heat medium relay unit 3 are connected via the intermediate heat exchanger 15*a* and the intermediate heat exchanger 15*b* provided in the heat medium relay unit 3, while the heat medium relay unit 3 and the indoor units 2 are also connected via the intermediate heat exchanger 15*a* and the intermediate heat exchanger 15*b*. In other words, in the air-conditioning apparatus 100, heat is exchanged between the refrigerant circulating through the refrigerant circuit A and the heat medium circulating through the heat medium circuit B by the intermediate heat exchanger 15*a* and the intermediate heat exchanger 15*b*.

Next, the respective operation modes executed by the air-conditioning apparatus 100 will be described. The air-conditioning apparatus 100 is capable of the cooling operation or the heating operation with each indoor unit 2, on the basis of instructions from each indoor unit 2. In other words, the air-conditioning apparatus 100 is configured such that all of the indoor units 2 may operate identically, but also such that each of the indoor units 2 may operate differently.

The operation modes executed by the air-conditioning apparatus 100 include a cooling only operation mode in which all indoor units 2 being driven execute the cooling operation, a heating only operation mode in which all indoor units 2 being driven execute the heating operation, a cooling main operation mode in which the cooling load is larger, and a heating main operation mode in which the heating load is larger. Hereinafter, the respective operation modes will be described together with the flows of refrigerant and a heat medium.

[Cooling only Operation Mode]

FIG. 3 is a diagram explaining the flow of refrigerant and heat medium during the cooling only operation of the air-conditioning apparatus 100 illustrated in FIG. 2. The cooling only operation mode will be described with FIG. 3, taking as an example the case where a cooling load is generated by only the use side heat exchanger 26*a* and the use side heat exchanger 26*b*. Note that in FIG. 3, pipes indicated in bold represent pipes carrying refrigerant (refrigerant and a heat medium). Also, in FIG. 3, solid arrows indicate the direction of refrigerant flow, while dashed arrows represent the direction of heat medium flow.

In the case of the cooling only operation mode illustrated in FIG. 3, in the outdoor unit 1, the first refrigerant flow switching device 11 switches such that refrigerant discharged from the compressor 10 flows into the heat source side heat exchanger 12. In the heat medium relay unit 3, the pump 21*a* and the pump 21*b* are driven, the heat medium flow control device 25*a* and the heat medium flow control device 25*b* are fully opened, and the heat medium flow control device 25*c* and the heat medium flow control device 25*d* are fully closed, causing heat medium to circulate between each of the intermediate heat exchanger 15*a* and the intermediate heat exchanger 15*b*, and the use side heat exchanger 26*a* and the use side heat exchanger 26*b*, respectively.

First, the flow of refrigerant in the refrigerant circuit A will be described.

Low temperature and low pressure refrigerant is compressed by the compressor 10 to become high temperature and high pressure gas refrigerant, and is discharged. The high temperature and high pressure gas refrigerant discharged from the compressor 10 flows into the heat source side heat exchanger 12 via the first refrigerant flow switching device 11. Then, the refrigerant condenses and liquefies while transferring heat to the outside air in the heat source side heat exchanger 12, and becomes high pressure liquid refrigerant. The high pressure liquid refrigerant flowing out from the heat source side heat exchanger 12 passes through the check valve 13*a*, flows out from the outdoor unit 1 via the branching unit 27*a*, and goes through the refrigerant pipes 4 to flow into the heat medium relay unit 3. After passing through the opening and closing device 17*a*, the high pressure two-phase gas-liquid refrigerant flowing into the heat medium relay unit 3 is branched and expanded by the expansion device 16*a* and the expansion device 16*b* to become a low temperature and low pressure two-phase refrigerant.

The two-phase refrigerant respectively flows into the intermediate heat exchanger 15*a* and the intermediate heat exchanger 15*b* which act as evaporators, and evaporates to become low temperature and low pressure gas refrigerant while cooling the heat medium by taking away heat from the heat medium circulating through the heat medium circuit B. The gas refrigerant flowing out of the intermediate heat exchanger 15*a* and the intermediate heat exchanger 15*b* flows out from the heat medium relay unit 3 via the second refrigerant flow switching device 18*a* and the second refrigerant flow switching device 18*b*, and passes through the refrigerant pipes 4 to once again flow into the outdoor unit 1. The refrigerant flowing into the outdoor unit 1 passes through the check valve 13*d* via the branching unit 27*b*, and is once again suctioned into the compressor 10 via the first refrigerant flow switching device 11 and the accumulator 19.

At this point, the opening degree of the expansion device 16*a* is controlled such that the superheat (degree of superheat) obtained as the difference between the temperature detected by the third temperature sensor 35*a* and the temperature detected by the third temperature sensor 35*b* becomes constant. Similarly, the opening degree of the expansion device 16*b* is controlled such that the superheat obtained as the difference between the temperature detected by the third temperature sensor 35*c* and the temperature detected by the third temperature sensor 35*d* becomes constant. Also, the opening and closing device 17*a* opens, while the opening and closing device 17*b* closes.

[Cooling only Operation Mode p-h Chart]

Figure 4:
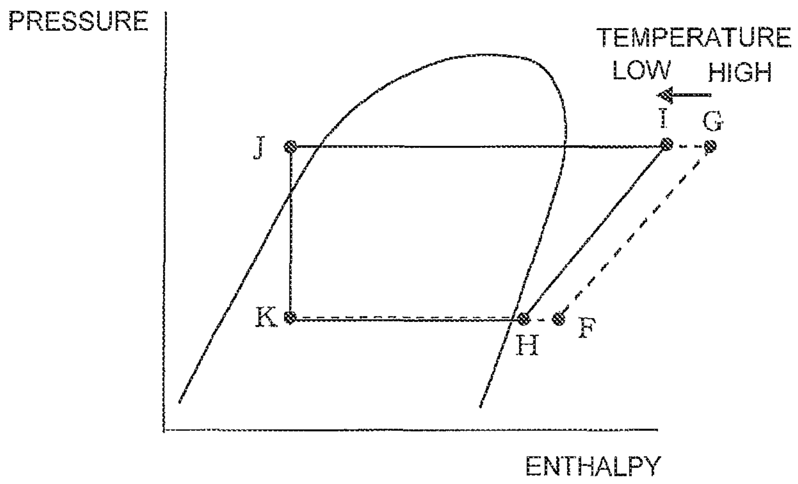
FIG. 4 is a pressure-enthalpy chart (p-h chart) during the cooling only operation illustrated in FIG. 3.

FIG. 4 is a pressure-enthalpy chart (p-h chart) during the cooling only operation illustrated in FIG. 3. Injection operations in this mode will be described using FIG. 3 and the p-h chart in FIG. 4.

Refrigerant suctioned into the compressor 10 and compressed by the compressor 10 is condensed in the heat source side heat exchanger 12 to become high pressure liquid refrigerant (point J in FIG. 4). This high pressure liquid refrigerant reaches the branching unit 27*a* via the check valve 13*a*.

In the case of conducting injection, the opening and closing device 24 opens, and part of the high pressure liquid refrigerant branched at the branching unit 27*a* is made to flow into the suction injection pipe 4*c* via the opening and closing device 24 and the branch pipe 4*d*. The high pressure liquid refrigerant flowing into the suction injection pipe 4*c* is depressurized by the expansion device 14*b* to become a low temperature and low pressure two-phase gas-liquid refrigerant (point K in FIG. 4), and flows into a refrigerant pipe joining the compressor 10 and the accumulator 19.

Meanwhile, the remaining high pressure liquid refrigerant branched at the branching unit 27*a* flows into the heat medium relay unit 3, is depressurized by the expansion devices 16 to become a low pressure two-phase gas-liquid refrigerant, and flows into the intermediate heat exchangers 15 which function as evaporators, becoming a low temperature and low pressure gas refrigerant. After that, the low temperature and low pressure gas refrigerant flows into the outdoor unit 1, and flows into the accumulator 19.

The low temperature and low pressure two-phase gas-liquid refrigerant flowing out from the suction injection pipe 4*c* converges with the low temperature and low pressure gas refrigerant flowing out from the accumulator 19 at a refrigerant pipe 4 connected on the suction side of the compressor 10 (point H in FIG. 4), and is suctioned into the compressor 10. The low temperature and low pressure two-phase gas-liquid refrigerant suctioned into the compressor 10 is heated and evaporated by the hermetically sealed container and the motor of the compressor 10, becomes a low temperature and low pressure gas refrigerant at a lower temperature than in the case of not conducting injection, is suctioned into the compression chamber of the compressor 10, and is once again discharged from the compressor 10 (point I in FIG. 4).

Note that in the case of not conducting injection, the opening and closing device 24 closes, and the high pressure liquid refrigerant branched at the branching unit 27*a* is depressurized by the expansion devices 16 to become a low pressure two-phase gas-liquid refrigerant, flows into the intermediate heat exchangers 15, which function as evaporators, to become a low temperature and low pressure gas refrigerant, and is suctioned into the compressor 10 via the accumulator 19 (point F in FIG. 4). This low temperature and low pressure gas refrigerant is heated and evaporated by the hermetically sealed container and the motor of the compressor 10, becomes a low temperature and low pressure gas refrigerant at a higher temperature than in the case of conducting injection, is suctioned into the compression chamber of the compressor 10, and is once again discharged from the compressor 10 (point G in FIG. 4).

In addition, the temperature of refrigerant discharged from the compressor 10 in the case of conducting injection (point I in FIG. 4) lowers with respect to the temperature of refrigerant discharged from the compressor 10 in the case of not conducting injection (point G in FIG. 4). In this way, even if the air-conditioning apparatus 100 employs a refrigerant whose discharge refrigerant temperature from the compressor 10 reaches a high temperature (such as R32, for example), it is possible to lower the discharge refrigerant temperature of the compressor 10, and improve the stability of the operation of the air-conditioning apparatus 100.

Note that the refrigerant in the flow proceeding from the opening and closing device 24 in the branch pipe 4*d* to the backflow prevention device 20 is high pressure refrigerant, whereas the refrigerant which returns to the outdoor unit 1 from the heat medium relay unit 3 via the refrigerant pipes 4 and reaches the branching unit 27*b* is low pressure refrigerant. Due to the action of the backflow prevention device 20, the high pressure refrigerant in the branch pipe 4*d* is prevented from mixing with the low pressure refrigerant in the branching unit 27*b*. Since refrigerant does not flow through the expansion device 14*a*, an arbitrary opening degree may be set. The expansion device 14*b* may control the opening degree (expansion amount) such that the discharge refrigerant temperature of the compressor 10 detected by the discharge refrigerant temperature detection device 37 does not become too high.

Next, the flow of heat medium in the heat medium circuit B will be described.

In the cooling only operation mode, the cooling energy of the refrigerant is transferred to the heat medium in both the intermediate heat exchanger 15*a* and the intermediate heat exchanger 15*b*, and the cooled heat medium is made to flow inside the pipes 5 by the pump 21*a* and the pump 21*b*. The outflowing heat medium pressurized by the pump 21*a* and the pump 21*b* flows into the use side heat exchanger 26*a* and the use side heat exchanger 26*b* via the second heat medium flow switching device 23*a* and the second heat medium flow switching device 23*b*. Then, the heat medium takes away heat from the indoor air at the use side heat exchanger 26*a* and the use side heat exchanger 26*b*, thereby cooling the indoor space 7.

Subsequently, the heat medium flows out from the use side heat exchanger 26*a* and the use side heat exchanger 26*b*, and flows into the heat medium flow control device 25*a* and the heat medium flow control device 25*b*. At this point, the heat medium is made to flow into the use side heat exchanger 26*a* and the use side heat exchanger 26*b* at a flow rate controlled by the action of the heat medium flow control device 25*a* and the heat medium flow control device 25*b*, this flow rate being the flow rate of heat medium necessary to cover the air conditioning load required indoors. The heat medium flowing out from the heat medium flow control device 25*a* and the heat medium flow control device 25*b* passes through the first heat medium flow switching device 22*a* and the first heat medium flow switching device 22*b*, flows into the intermediate heat exchanger 15*a* and the intermediate heat exchanger 15*b*, and is once again suctioned into the pump 21*a* and the pump 21*b*.

Note that inside the pipes 5 of the use side heat exchangers 26, the heat medium flows in the direction going from the second heat medium flow switching devices 23 to the first heat medium flow switching devices 22 via the heat medium flow control devices 25. In addition, the air conditioning load required in the indoor space 7 may be covered by applying control to keep the difference between the temperature detected by the first temperature sensor 31*a* or the temperature detected by the first temperature sensor 31*b* and the temperature detected by the second temperature sensors 34 at a target value. The temperature of either the first temperature sensor 31*a* or the first temperature sensor 31*b* may be used as the outlet temperature of the intermediate heat exchangers 15, or their average temperature may be used. At this point, the first heat medium flow switching devices 22 and the second heat medium flow switching devices 23 are set to intermediate opening degrees to maintain flows flowing into both the intermediate heat exchanger 15*a* and the intermediate heat exchanger 15*b*.

[Heating only Operation Mode]

FIG. 5 is a diagram explaining the flow of refrigerant and heat medium during the heating only operation of the air-conditioning apparatus 100 illustrated in FIG. 2. The heating only operation mode will be described with FIG. 5, taking as an example the case where a heating load is generated by only the use side heat exchanger 26*a* and the use side heat exchanger 26*b*. Note that in FIG. 5, pipes indicated in bold represent pipes carrying refrigerant (refrigerant and a heat medium). Also, in FIG. 5, solid arrows indicate the direction of refrigerant flow, while dashed arrows represent the direction of heat medium flow.

In the case of the heating only operation mode illustrated in FIG. 5, in the outdoor unit 1, the first refrigerant flow switching device 11 switches such that refrigerant discharged from the compressor 10 flows into the heat medium relay unit 3 without passing through the heat source side heat exchanger 12. In the heat medium relay unit 3, the pump 21*a* and the pump 21*b* are driven, the heat medium flow control device 25*a* and the heat medium flow control device 25*b* are fully opened, and the heat medium flow control device 25*c* and the heat medium flow control device 25*d* are fully closed, causing heat medium to circulate between each of the intermediate heat exchanger 15*a* and the intermediate heat exchanger 15*b*, and the use side heat exchanger 26*a* and the use side heat exchanger 26*b*, respectively.

First, the flow of refrigerant in the refrigerant circuit A will be described.

Low temperature and low pressure refrigerant is compressed by the compressor 10 to become high temperature and high pressure gas refrigerant, and is discharged. The high temperature and high pressure gas refrigerant discharged from the compressor 10 goes through the first refrigerant flow switching device 11, is conducted through the first connecting pipe 4*a*, passes through the check valve 13*b* and the branching unit 27*a*, and flows out from the outdoor unit 1. The high temperature and high pressure gas refrigerant flowing out of the outdoor unit 1 flows into the heat medium relay unit 3 via the refrigerant pipes 4. The high temperature and high pressure gas refrigerant flowing into the heat medium relay unit 3 is branched, goes through the second refrigerant flow switching device 18*a* and the second refrigerant flow switching device 18*b*, and respectively flows into the intermediate heat exchanger 15*a* and the intermediate heat exchanger 15*b*.

The high temperature and high pressure gas refrigerant flowing into the intermediate heat exchanger 15*a* and the intermediate heat exchanger 15*b* condenses and liquefies to become high pressure liquid refrigerant while transferring heat to the heat medium circulating through the heat medium circuit B. The liquid refrigerant flowing out of the intermediate heat exchanger 15*a* and the intermediate heat exchanger 15*b* is expanded by the expansion device 16*a* and the expansion device 16*b* to become a medium temperature and medium pressure two-phase refrigerant. This two-phase refrigerant goes through the opening and closing device 17*b*, flows out from the heat medium relay unit 3, goes through the refrigerant pipes 4, and once again flows into the outdoor unit 1. The refrigerant flowing into the outdoor unit 1 flows into the second connecting pipe 4*b* via the branching unit 27*b*, goes through the expansion device 14*a*, is constricted by the expansion device 14*a* to become low temperature and low pressure two-phase refrigerant, passes through the check valve 13*c*, and flows into the heat source side heat exchanger 12 which acts as an evaporator.

Then, the refrigerant flowing into the heat source side heat exchanger 12 takes away heat from the outside air at the heat source side heat exchanger 12, and becomes a low temperature and low pressure gas refrigerant. The low temperature and low pressure gas refrigerant flowing out of the heat source side heat exchanger 12 is once again suctioned into the compressor 10 via the first refrigerant flow switching device 11 and the accumulator 19.

At this point, the opening degree of the expansion device 16*a* is controlled such that the subcooling (degree of cooling) obtained as the difference between the temperature detected by the third temperature sensor 35*b* and a value obtained by converting the pressure detected by the pressure sensor 36 into a saturation temperature becomes constant. Similarly, the opening degree of the expansion device 16*b* is controlled such that the subcooling obtained as the difference between the temperature detected by the third temperature sensor 35*d* and a value obtained by converting the pressure detected by the pressure sensor 36 into a saturation temperature becomes constant. Also, the opening and closing device 17*a* closes, while the opening and closing device 17*b* opens. Note that in the case where the temperature at an intermediate position between the intermediate heat exchangers 15 can be measured, the temperature at that intermediate position may be used instead of the pressure sensor 36, making it possible to configure the system at lower cost.

[Heating only Operation Mode p-h Chart]

FIG. 6 is a p-h chart during the heating only operation illustrated in FIG. 5. Injection operations in this mode will be described using FIG. 5 and the p-h chart in FIG. 6.

Refrigerant suctioned into the compressor 10 and compressed by the compressor 10 flows out of the outdoor unit 1 and is condensed by the intermediate heat exchangers 15 of the heat medium relay unit 3 to reach medium temperature, is depressurized by the expansion devices 16 to reach medium pressure (point J in FIG. 6), and flows from the heat medium relay unit 3 into the outdoor unit 1 via the refrigerant pipes 4. The medium temperature and medium pressure two-phase refrigerant flowing into the outdoor unit 1 reaches the branching unit 27*b*.

In the case of conducting injection, the expansion device 14*b* is opened to a predetermined opening degree, and part of the medium temperature and medium pressure refrigerant branched at the branching unit 27*b* is made to flow into the suction injection pipe 4*c* via the branch pipe 4*d*. The medium temperature and medium pressure refrigerant flowing into the suction injection pipe 4*c* is depressurized by the expansion device 14*b* to become a low temperature and low pressure two-phase gas-liquid refrigerant (point K in FIG. 6), and flows into a refrigerant pipe joining the compressor 10 and the accumulator 19.

Meanwhile, the remaining medium temperature and medium pressure refrigerant branched at the branching unit 27*b* is depressurized by the expansion device 14*a* to become a low pressure two-phase gas-liquid refrigerant, and flows into the heat source side heat exchanger 12 which acts as an evaporator, becoming a low temperature and low pressure gas refrigerant. After that, the low temperature and low pressure gas refrigerant flows into the accumulator 19.

The low temperature and low pressure two-phase gas-liquid refrigerant flowing out from the suction injection pipe 4*c* converges with the low temperature and low pressure gas refrigerant flowing out from the accumulator 19 at a refrigerant pipe 4 connected on the suction side of the compressor 10 (point H in FIG. 6), and is suctioned into the compressor 10. The low temperature and low pressure two-phase gas-liquid refrigerant suctioned into the compressor 10 is heated and evaporated by the hermetically sealed container and the motor of the compressor 10, becomes a low temperature and low pressure gas refrigerant at a lower temperature than in the case of not conducting injection, is suctioned into the compression chamber of the compressor 10, and is once again discharged from the compressor 10 (point I in FIG. 6).

Note that in the case of not conducting injection, the expansion device 14*b* closes, and the medium temperature and medium pressure two-phase gas-liquid refrigerant that passed through the branching unit 27*b* is depressurized by the expansion device 14*a* to become a low pressure two-phase gas-liquid refrigerant, flows into the heat source side heat exchanger 12, which functions as an evaporator, to become a low temperature and low pressure gas refrigerant, and is suctioned into the compressor 10 via the accumulator 19 (point F in FIG. 6). This low temperature and low pressure gas refrigerant is heated and evaporated by the hermetically sealed container and the motor of the compressor 10, becomes a low temperature and low pressure gas refrigerant at a higher temperature than in the case of conducting injection, is suctioned into the compression chamber of the compressor 10, and is once again discharged from the compressor 10 (point G in FIG. 6).

In addition, the temperature of refrigerant discharged from the compressor 10 in the case of conducting injection (point I in FIG. 6) lowers with respect to the temperature of refrigerant discharged from the compressor 10 in the case of not conducting injection (point G in FIG. 6). In this way, even if the air-conditioning apparatus 100 employs a refrigerant whose discharge refrigerant temperature from the compressor 10 reaches a high temperature (such as R32, for example), it is possible to lower the discharge refrigerant temperature of the compressor 10, and improve the stability of the operation of the air-conditioning apparatus 100.

Note that the opening and closing device 24 closes, preventing the refrigerant in a high pressure state from the branching unit 27*a* from mixing with the refrigerant in a medium pressure state coming via the backflow prevention device 20. Also, if the expansion device 14*a* applies control such that the medium pressure detected by the medium pressure detection device 32 becomes a constant value, control of the discharge refrigerant temperature from the expansion device 14*b* stabilizes. Furthermore, the opening degree (expansion amount) of the expansion device 14*b* is controlled such that the discharge refrigerant temperature of the compressor 10 detected by the discharge refrigerant temperature detection device 37 does not become too high.

Also, in the heating only operation mode, since the intermediate heat exchanger 15*a* and the intermediate heat exchanger 15*b* are both heating the heat medium, control may also be applied to raise the pressure (medium pressure) of the refrigerant on the upstream side of the expansion device 14*a* insofar as the pressure is within a range enabling the expansion device 16*a* and the expansion device 16*b* to control subcooling. If control is applied to raise the medium pressure, the differential pressure between the inside of the compression chamber and the pressure can be increased, and thus the quantity of refrigerant to inject on the suction side of the compression chamber can be increased, and it is possible to supply the compressor 10 with an injection flow rate sufficient to lower the discharge refrigerant temperature, even in cases where the outside air temperature is low.

Next, the flow of heat medium in the heat medium circuit B will be described.

In the heating only operation mode, the heating energy of the refrigerant is transferred to the heat medium in both the intermediate heat exchanger 15*a* and the intermediate heat exchanger 15*b*, and the heated heat medium is made to flow inside the pipes 5 by the pump 21*a* and the pump 21*b*. The outflowing heat medium pressurized by the pump 21*a* and the pump 21*b* flows into the use side heat exchanger 26*a* and the use side heat exchanger 26*b* via the second heat medium flow switching device 23*a* and the second heat medium flow switching device 23*b*. Then, the heat medium transfers heat to the indoor air at the use side heat exchanger 26*a* and the use side heat exchanger 26*b*, thereby heating the indoor space 7.

Subsequently, the heat medium flows out from the use side heat exchanger 26*a* and the use side heat exchanger 26*b*, and flows into the heat medium flow control device 25*a* and the heat medium flow control device 25*b*. At this point, the heat medium is made to flow into the use side heat exchanger 26*a* and the use side heat exchanger 26*b* at a flow rate controlled by the action of the heat medium flow control device 25*a* and the heat medium flow control device 25*b*, this flow rate being the flow rate of heat medium necessary to cover the air conditioning load required indoors. The heat medium flowing out from the heat medium flow control device 25*a* and the heat medium flow control device 25*b* passes through the first heat medium flow switching device 22*a* and the first heat medium flow switching device 22*b*, flows into the intermediate heat exchanger 15*a* and the intermediate heat exchanger 15*b*, and is once again suctioned into the pump 21*a* and the pump 21*b*.

Note that inside the pipes 5 of the use side heat exchangers 26, the heat medium flows in the direction going from the second heat medium flow switching devices 23 to the first heat medium flow switching devices 22 via the heat medium flow control devices 25. In addition, the air conditioning load required in the indoor space 7 may be covered by applying control to keep the difference between the temperature detected by the first temperature sensor 31*a* or the temperature detected by the first temperature sensor 31*b* and the temperature detected by the second temperature sensors 34 at a target value. The temperature of either the first temperature sensor 31*a* or the first temperature sensor 31*b* may be used as the outlet temperature of the intermediate heat exchangers 15, or their average temperature may be used.

At this point, the first heat medium flow switching devices 22 and the second heat medium flow switching devices 23 are set to intermediate opening degrees to maintain flows flowing into both the intermediate heat exchanger 15*a* and the intermediate heat exchanger 15*b*. Also, although the use side heat exchanger 26*a* should ideally apply control according to the temperature difference between the inlet and the outlet, the heat medium temperature on the inlet side of the use side heat exchangers 26 is nearly the same temperature as the temperature detected by the first temperature sensor 31*b*, and thus using the first temperature sensor 31*b* enables a reduction in the number of temperature sensors, making it possible to configure the system at lower cost.

[Cooling Main Operation Mode]

FIG. 7 is a diagram explaining the flow of refrigerant and heat medium during cooling main operation of the air-conditioning apparatus 100 illustrated in FIG. 2. The cooling main operation mode will be described with FIG. 7, taking as an example the case where a cooling load is generated by the use side heat exchanger 26*a*, and a heating load is generated by the use side heat exchanger 26*b*. Note that in FIG. 7, pipes indicated in bold represent pipes circulating refrigerant (refrigerant and a heat medium). Also, in FIG. 7, solid arrows indicate the direction of refrigerant flow, while dashed arrows represent the direction of heat medium flow.

In the case of the cooling main operation mode illustrated in FIG. 7, in the outdoor unit 1, the first refrigerant flow switching device 11 switches such that refrigerant discharged from the compressor 10 flows into the heat source side heat exchanger 12. In the heat medium relay unit 3, the pump 21*a* and the pump 21*b* are driven, the heat medium flow control device 25*a* and the heat medium flow control device 25*b* open, and the heat medium flow control device 25*c* and the heat medium flow control device 25*d* fully close, causing heat medium to respectively circulate between the intermediate heat exchanger 15*a* and the use side heat exchanger 26*a*, and between the intermediate heat exchanger 15*b* and the use side heat exchanger 26*b*.

First, the flow of refrigerant in the refrigerant circuit A will be described.

Low temperature and low pressure refrigerant is compressed by the compressor 10 to become high temperature and high pressure gas refrigerant, and is discharged. The high temperature and high pressure gas refrigerant discharged from the compressor 10 flows into the heat source side heat exchanger 12 via the first refrigerant flow switching device 11. The refrigerant then condenses to become two-phase refrigerant while transferring heat to the outside air in the heat source side heat exchanger 12. The two-phase refrigerant flowing out from the heat source side heat exchanger 12 passes through the check valve 13*a*, flows out from the outdoor unit 1 via the branching unit 27*a*, and goes through the refrigerant pipes 4 to flow into the heat medium relay unit 3. The two-phase refrigerant flowing into the heat medium relay unit 3 goes through the second refrigerant flow switching device 18*b*, and flows into the intermediate heat exchanger 15*b* which acts as a condenser.

The two-phase refrigerant flowing into the intermediate heat exchanger 15*b* condenses and liquefies to become liquid refrigerant while transferring heat to the heat medium circulating through the heat medium circuit B. The liquid refrigerant flowing out of the intermediate heat exchanger 15*b* is expanded by the expansion device 16*b* to become low pressure two-phase refrigerant. This low pressure two-phase refrigerant flows via the expansion device 16*a* into the intermediate heat exchanger 15*a*, which acts as an evaporator. The low pressure two-phase refrigerant flowing into the intermediate heat exchanger 15*a* takes away heat from the heat medium circulating through the heat medium circuit B, thus becoming low pressure gas refrigerant while cooling the heat medium. This gas refrigerant flows out of the intermediate heat exchanger 15*a*, flows out of the heat medium relay unit 3 via the second refrigerant flow switching device 18*a*, and once again flows into the outdoor unit 1 via the refrigerant pipes 4. The refrigerant flowing into the outdoor unit 1 passes through the check valve 13*d* via the branching unit 27*b*, and is once again suctioned into the compressor 10 via the first refrigerant flow switching device 11 and the accumulator 19.

At this point, the opening degree of the expansion device 16*b* is controlled such that the superheat obtained as the difference between the temperature detected by the third temperature sensor 35*a* and the temperature detected by the third temperature sensor 35*b* becomes constant. Also, the expansion device 16*a* fully opens, while the opening and closing devices 17*a* and 17*b* close. Note that the opening degree of the expansion device 16*b* may also be controlled such that the subcooling obtained as the difference between the temperature detected by the third temperature sensor 35*d* and a value obtained by converting the pressure detected by the pressure sensor 36 into a saturation temperature becomes constant. Also, the expansion device 16*b* may fully open, and the superheat or subcooling may be controlled with the expansion device 16*a*.

[Cooling Main Operation Mode p-h Chart]

Figure 8:
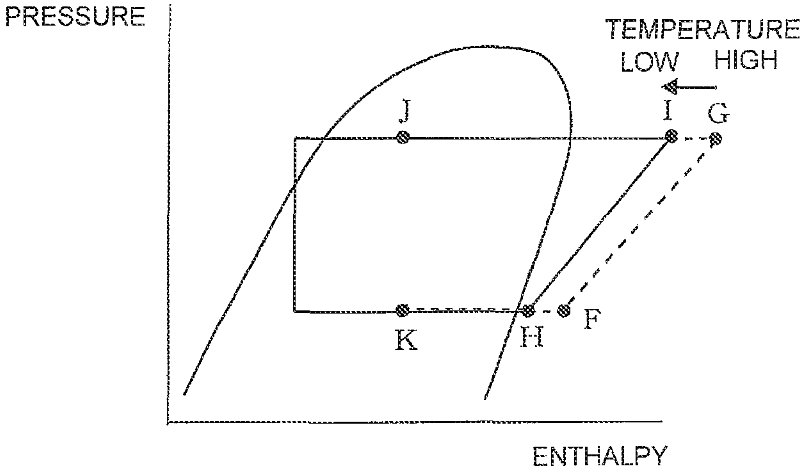
FIG. 8 is a p-h chart during the cooling main operation illustrated in FIG. 7.

FIG. 8 is a p-h chart during the cooling main operation illustrated in FIG. 7. Injection operations in this mode will be described using FIG. 7 and the p-h chart in FIG. 8.

Refrigerant suctioned into the compressor 10 and compressed by the compressor 10 is condensed in the heat source side heat exchanger 12 to become high pressure two-phase gas-liquid refrigerant (point J in FIG. 8). This high pressure two-phase gas-liquid refrigerant reaches the branching unit 27*a* via the check valve 13*a*.

In the case of conducting injection, the opening and closing device 24 closes, and part of the high pressure two-phase gas-liquid refrigerant branched at the branching unit 27*a* is made to flow into the suction injection pipe 4*c* via the opening and closing device 24 and the branch pipe 4*d*. The high pressure two-phase gas-liquid refrigerant flowing into the suction injection pipe 4*c* is depressurized by the expansion device 14*b* to become a low temperature and low pressure two-phase gas-liquid refrigerant (point K in FIG. 8), and flows into a refrigerant pipe joining the compressor 10 and the accumulator 19.

Meanwhile, the remaining high pressure two-phase gas-liquid refrigerant branched at the branching unit 27*a* flows into the heat medium relay unit 3, is depressurized by the expansion devices 16 to become a low pressure two-phase gas-liquid refrigerant, and then flows into the intermediate heat exchangers 15 which function as evaporators, becoming a low temperature and low pressure gas refrigerant. After that, the low temperature and low pressure gas refrigerant returns to the outdoor unit 1, and flows into the accumulator 19.

The low temperature and low pressure two-phase gas-liquid refrigerant flowing out from the suction injection pipe 4*c* converges with the low temperature and low pressure gas refrigerant flowing out from the accumulator 19 at a refrigerant pipe 4 connected on the suction side of the compressor 10 (point H in FIG. 8), and is suctioned into the compressor 10. The low temperature and low pressure two-phase gas-liquid refrigerant suctioned into the compressor 10 is heated and evaporated by the hermetically sealed container and the motor of the compressor 10, becomes a low temperature and low pressure gas refrigerant at a lower temperature than in the case of not conducting injection, is suctioned into the compression chamber of the compressor 10, and is once again discharged from the compressor 10 (point I in FIG. 8).

Note that in the case of not conducting injection, the opening and closing device 24 closes, and the high pressure two-phase gas-liquid refrigerant branched at the branching unit 27*a* flows into the expansion device 16*b* and the expansion device 16*a* via the intermediate heat exchanger 15*b* which functions as a condenser, becoming a low pressure two-phase gas-liquid refrigerant, and after flowing into the intermediate heat exchanger 15*a* which functions as an evaporator and becoming a low temperature and low pressure gas refrigerant, is suctioned into the compressor 10 via the accumulator 19 (point F in FIG. 8). This low temperature and low pressure gas refrigerant is heated by the hermetically sealed container and the motor of the compressor 10, becomes a low temperature and low pressure gas refrigerant at a higher temperature than in the case of conducting injection, is suctioned into the compression chamber of the compressor 10, and is once again discharged from the compressor 10 (point G in FIG. 8).

In addition, the temperature of refrigerant discharged from the compressor 10 in the case of conducting injection (point I in FIG. 8) lowers with respect to the temperature of refrigerant discharged from the compressor 10 in the case of not conducting injection (point G in FIG. 8). In this way, even if the air-conditioning apparatus 100 employs a refrigerant whose discharge refrigerant temperature from the compressor 10 reaches a high temperature (such as R32, for example), it is possible to lower the discharge refrigerant temperature of the compressor 10, and improve the stability of the operation of the air-conditioning apparatus 100.

Note that the refrigerant in the flow path proceeding from the opening and closing device 24 in the branch pipe 4*d* to the backflow prevention device 20 is high pressure refrigerant, whereas the refrigerant which returns to the outdoor unit 1 from the heat medium relay unit 3 via the refrigerant pipes 4 and reaches the branching unit 27*b* is low pressure refrigerant. Due to the action of the backflow prevention device 20, the high pressure refrigerant in the branch pipe 4*d* is prevented from mixing with the low pressure refrigerant in the branching unit 27*b*. Since refrigerant does not flow through the expansion device 14*a*, an arbitrary opening degree may be set. The expansion device 14*b* may control the opening degree (expansion amount) such that the discharge refrigerant temperature of the compressor 10 detected by the discharge refrigerant temperature detection device 37 does not become too high.

Next, the flow of heat medium in the heat medium circuit B will be described.

In the cooling main operation mode, the heating energy of the refrigerant is transferred to the heat medium in the intermediate heat exchanger 15*b*, and the heated heat medium is made to flow inside the pipes 5 by the pump 21*b*. Also, in the cooling main operation mode, the cooling energy of the refrigerant is transferred to the heat medium in the intermediate heat exchanger 15*a*, and the cooled heat medium is made to flow inside the pipes 5 by the pump 21*a*. The outflowing heat medium pressurized by the pump 21*a* and the pump 21*b* flows into the use side heat exchanger 26*a* and the use side heat exchanger 26*b* via the second heat medium flow switching device 23*a* and the second heat medium flow switching device 23*b*.

In the use side heat exchanger 26*b*, the heat medium transfers heat to the indoor air, thereby heating the indoor space 7. Also, in the use side heat exchanger 26*a*, the heat medium takes away heat from the indoor air, thereby cooling the indoor space 7. At this point, the heat medium is made to flow into the use side heat exchanger 26*a* and the use side heat exchanger 26*b* at a flow rate controlled by the action of the heat medium flow control device 25*a* and the heat medium flow control device 25*b*, this flow rate being the flow rate of heat medium necessary to cover the air conditioning load required indoors. The heat medium with slightly lowered temperature passing through the use side heat exchanger 26*b* goes through the heat medium flow control device 25*b* and the first heat medium flow switching device 22*b*, flows into the intermediate heat exchanger 15*b*, and is once again suctioned into the pump 21*b*. The heat medium with slightly raised temperature passing through the use side heat exchanger 26*a* goes through the heat medium flow control device 25*a* and the first heat medium flow switching device 22*a*, flows into the intermediate heat exchanger 15*a*, and is once again suctioned into the pump 21*a*.

Meanwhile, each of the warm heat medium and the cool heat medium is introduced into use side heat exchangers 26 having a heating load and a cooling load, respectively, and due to the action of the first heat medium flow switching devices 22 and the second heat medium flow switching devices 23, the heat medium does not mix. Note that inside the pipes 5 of the use side heat exchangers 26, on both the heating side and the cooling side, the heat medium flows in the direction going from the second heat medium flow switching devices 23 to the first heat medium flow switching devices 22 via the heat medium flow control devices 25. In addition, the air conditioning load required in the indoor space 7 may be covered by applying control to keep the difference between the temperature detected by the first temperature sensor 31*b* and the temperature detected by the second temperature sensors 34 at a target value on the heating side, while keeping the difference between the temperature detected by the second temperature sensors 34 and the temperature detected by the first temperature sensor 31*a* at a target value on the cooling side.

[Heating Main Operation Mode]

FIG. 9 is a diagram explaining the flow of refrigerant and heat medium during the heating only operation of the air-conditioning apparatus 100 illustrated in FIG. 2. The heating main operation mode will be described with FIG. 9, taking as an example the case where a heating load is generated by the use side heat exchanger 26*a*, and a cooling load is generated by the use side heat exchanger 26*b*. Note that in FIG. 9, pipes indicated in bold represent pipes circulating refrigerant (refrigerant and a heat medium). Also, in FIG. 9, solid arrows indicate the direction of refrigerant flow, while dashed arrows represent the direction of heat medium flow.

In the case of the heating main operation mode illustrated in FIG. 9, in the outdoor unit 1, the first refrigerant flow switching device 11 switches such that refrigerant discharged from the compressor 10 flows into the heat medium relay unit 3 without passing through the heat source side heat exchanger 12. In the heat medium relay unit 3, the pump 21*a* and the pump 21*b* are driven, the heat medium flow control device 25*a* and the heat medium flow control device 25*b* are fully opened, and the heat medium flow control device 25*c* and the heat medium flow control device 25*d* are fully closed, causing heat medium to circulate between each of the intermediate heat exchanger 15*a* and the intermediate heat exchanger 15*b*, and the use side heat exchanger 26*a* and the use side heat exchanger 26*b*, respectively.

First, the flow of refrigerant in the refrigerant circuit A will be described.

Low temperature and low pressure refrigerant is compressed by the compressor 10 to become high temperature and high pressure gas refrigerant, and is discharged. The high temperature and high pressure gas refrigerant discharged from the compressor 10 goes through the first refrigerant flow switching device 11, is conducted through the first connecting pipe 4*a*, passes through the check valve 13*b*, and flows out from the outdoor unit 1 via the branching unit 27*a*. The high temperature and high pressure gas refrigerant flowing out of the outdoor unit 1 flows into the heat medium relay unit 3 via the refrigerant pipes 4. The high temperature and high pressure gas refrigerant flowing into the heat medium relay unit 3 goes through the second refrigerant flow switching device 18*b*, and flows into the intermediate heat exchanger 15*b* which acts as a condenser.

The gas refrigerant flowing into the intermediate heat exchanger 15*b* condenses and liquefies to become liquid refrigerant while transferring heat to the heat medium circulating through the heat medium circuit B. The liquid refrigerant flowing out of the intermediate heat exchanger 15*b* is expanded by the expansion device 16*b* to become medium pressure two-phase refrigerant. This medium pressure two-phase refrigerant flows via the expansion device 16*a* into the intermediate heat exchanger 15*a,* which acts as an evaporator. The medium pressure two-phase refrigerant flowing into the intermediate heat exchanger 15*a* evaporates by taking away heat from the heat medium circulating through the heat medium circuit B, thus cooling the heat medium. This medium pressure two-phase refrigerant flowing through the intermediate heat exchanger 15*a* flows out of the intermediate heat exchanger 15*a,* flows out of the heat medium relay unit 3 via the second refrigerant flow switching device 18*a,* and once again flows into the outdoor unit 1 via the refrigerant pipes 4.

The refrigerant flowing into the outdoor unit 1 flows into the second connecting pipe 4*b* via the branching unit 27*b,* goes through the expansion device 14*a,* is constricted by the expansion device 14*a* to become low temperature and low pressure two-phase refrigerant, goes through the check valve 13*c,* and flows into the heat source side heat exchanger 12 which acts as an evaporator. Then, the refrigerant flowing into the heat source side heat exchanger 12 takes away heat from the outside air at the heat source side heat exchanger 12, and becomes a low temperature and low pressure gas refrigerant. The low temperature and low pressure gas refrigerant flowing out of the heat source side heat exchanger 12 is once again suctioned into the compressor 10 via the first refrigerant flow switching device 11 and the accumulator 19.

At this point, the opening degree of the expansion device 16*b* is controlled such that the subcooling obtained as the difference between the temperature detected by the third temperature sensor 35*b* and a value obtained by converting the pressure detected by the pressure sensor 36 into a saturation temperature becomes constant. Also, the expansion device 16*a* fully opens, while the opening and closing device 17*a* closes, and the opening and closing device 17*b* closes. Note that the expansion device 16*b* may fully open, and the subcooling may be controlled with the expansion device 16*a.*

[Heating Main Operation Mode p-h Chart]

Figure 10:
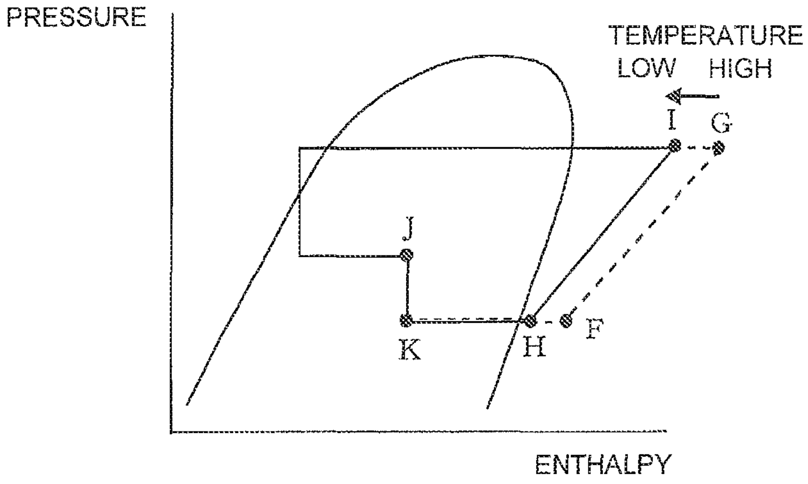
FIG. 10 is a p-h chart during the heating main operation illustrated in FIG. 9.

FIG. 10 is a p-h chart during the heating main operation illustrated in FIG. 9. Injection operations in this mode will be described using FIG. 9 and the p-h chart in FIG. 10.

Refrigerant suctioned into the compressor 10 and compressed by the compressor 10 flows out of the outdoor unit 1 and is condensed by the intermediate heat exchanger 15*a* of the heat medium relay unit 3, is depressurized by the expansion device 16*a* and the expansion device 16*b* to reach medium pressure, and is evaporated by the intermediate heat exchanger 15*b* to reach medium temperature (point J in FIG. 10), and flows from the heat medium relay unit 3 into the outdoor unit 1 via the refrigerant pipes 4. The medium temperature and medium pressure refrigerant flowing into the outdoor unit 1 reaches the branching unit 27*b.*

In the case of conducting suction injection, the expansion device 14*b* is opened to a predetermined opening degree, and part of the medium temperature and medium pressure two-phase gas-liquid refrigerant branched at the branching unit 27*b* is made to flow into the suction injection pipe 4*c* via the branch pipe 4*d.* The medium temperature and medium pressure refrigerant flowing into the suction injection pipe 4*c* is depressurized by the expansion device 14*b* to become a low temperature and low pressure two-phase gas-liquid refrigerant (point K in FIG. 10), and flows into a refrigerant pipe joining the compressor 10 and the accumulator 19.

Meanwhile, the remaining medium temperature and medium pressure two-phase gas-liquid refrigerant branched at the branching unit 27*b* is depressurized by the expansion device 14*a* to become a low pressure two-phase gas-liquid refrigerant, and then flows into the heat source side heat exchanger 12 which acts as an evaporator, becoming a low temperature and low pressure gas refrigerant. After that, the low temperature and low pressure gas refrigerant flows into the accumulator 19.

The low temperature and low pressure two-phase gas-liquid refrigerant flowing out from the suction injection pipe 4*c* converges with the low temperature and low pressure gas refrigerant flowing out from the accumulator 19 at a refrigerant pipe 4 connected on the suction side of the compressor 10 (point H in FIG. 10), and is suctioned into the compressor 10. The low temperature and low pressure two-phase gas-liquid refrigerant is heated and evaporated by the hermetically sealed container and the motor of the compressor 10, becomes a low temperature and low pressure gas refrigerant at a lower temperature than in the case of not conducting injection, is suctioned into the compression chamber of the compressor 10, and is once again discharged from the compressor 10 (point I in FIG. 10).

Note that in the case of not conducting injection, the expansion device 14*b* closes, and the medium temperature and medium pressure two-phase gas-liquid refrigerant that passed through the branching unit 27*b* is depressurized by the expansion device 14*a* to become a low pressure two-phase gas-liquid refrigerant, flows into the heat source side heat exchanger 12, which functions as an evaporator, to become a low temperature and low pressure gas refrigerant, and is suctioned into the compressor 10 via the accumulator 19 (point F in FIG. 10). This low temperature and low pressure gas refrigerant is by the hermetically sealed container and the motor of the compressor 10, becomes a low temperature and low pressure gas refrigerant at a higher temperature than in the case of conducting injection, is suctioned into the compression chamber of the compressor 10, and is once again discharged from the compressor 10 (point G in FIG. 10).

In addition, the temperature of refrigerant discharged from the compressor 10 in the case of conducting injection (point I in FIG. 10) lowers with respect to the temperature of refrigerant discharged from the compressor 10 in the case of not conducting injection (point G in FIG. 10). In this way, even if the air-conditioning apparatus 100 employs a refrigerant whose discharge refrigerant temperature from the compressor 10 reaches a high temperature (such as R32, for example), it is possible to lower the discharge refrigerant temperature of the compressor 10, and improve the stability of the operation of the air-conditioning apparatus 100.

Note that the opening and closing device 24 closes, preventing the refrigerant in a high pressure state from the branching unit 27*a* from mixing with the refrigerant in a medium pressure state coming via the backflow prevention device 20. Also, if the expansion device 14*a* applies control such that the medium pressure detected by the medium pressure detection device 32 becomes a constant value, control of the discharge refrigerant temperature from the expansion device 14*b* stabilizes. Furthermore, the opening degree (expansion amount) of the expansion device 14*b* is controlled such that the discharge refrigerant temperature of the compressor 10 detected by the discharge refrigerant temperature detection device 37 does not become too high.

Also, in the heating main operation mode, it is necessary to cool heat medium in the intermediate heat exchanger 15*b,* and the pressure of refrigerant on the upstream side of the expansion device 14*a* (medium pressure) cannot be set very high. If medium pressure cannot be set high, the flow rate of refrigerant to inject on the suction side of the compressor 10 decreases, and the discharge refrigerant temperature is not lowered as much. However, this is not problematic. Since it is necessary to prevent freezing of the heat medium, it may be configured such that the system does not enter the heating main operation mode when the outside air temperature is low (for example, when the outside air temperature is −5° C. or less). When the outside temperature is high, the discharge refrigerant temperature is not very high, and the flow rate of suction injection does not need to be very large. With the expansion device 14*a,* cooling of the heat medium in the intermediate heat exchanger 15*b* is also possible, and the medium pressure can be set to enable a supply a suction injection flow rate that is sufficient to lower the discharge refrigerant temperature. Thus, safer operation is possible.

Next, the flow of heat medium in the heat medium circuit B will be described.

In the heating main operation mode, the heating energy of the refrigerant is transferred to the heat medium in the intermediate heat exchanger 15*b,* and the heated heat medium is made to flow inside the pipes 5 by the pump 21*b.* Also, in the heating main operation mode, the cooling energy of the refrigerant is transferred to the heat medium in the intermediate heat exchanger 15*a,* and the cooled heat medium is made to flow inside the pipes 5 by the pump 21*a.* The outflowing heat medium pressurized by the pump 21*a* and the pump 21*b* flows into the use side heat exchanger 26*a* and the use side heat exchanger 26*b* via the second heat medium flow switching device 23*a* and the second heat medium flow switching device 23*b.*

In the use side heat exchanger 26*b,* the heat medium takes away heat from the indoor air, thereby cooling the indoor space 7. Also, in the use side heat exchanger 26*a,* the heat medium transfer heat to the indoor air, thereby heating the indoor space 7. At this point, the heat medium is made to flow into the use side heat exchanger 26*a* and the use side heat exchanger 26*b* at a flow rate controlled by the action of the heat medium flow control device 25*a* and the heat medium flow control device 25*b,* this flow rate being the flow rate of heat medium necessary to cover the air conditioning load required indoors. The heat medium with slightly raised temperature passing through the use side heat exchanger 26*b* goes through the heat medium flow control device 25*b* and the first heat medium flow switching device 22*b,* flows into the intermediate heat exchanger 15*a,* and is once again suctioned into the pump 21*a.* The heat medium with slightly lowered temperature passing through the use side heat exchanger 26*a* goes through the heat medium flow control device 25*a* and the first heat medium flow switching device 22*a,* flows into the intermediate heat exchanger 15*b,* and is once again suctioned into the pump 21*b.*

Meanwhile, the warm heat medium and the cool heat medium is introduced into use side heat exchangers 26 having a heating load and a cooling load, respectively, and due to the action of the first heat medium flow switching devices 22 and the second heat medium flow switching devices 23, the heat medium does not mix. Note that inside the pipes 5 of the use side heat exchangers 26, on both the heating side and the cooling side, the heat medium flows in the direction going from the second heat medium flow switching devices 23 to the first heat medium flow switching devices 22 via the heat medium flow control devices 25. In addition, the air conditioning load required in the indoor space 7 may be covered by applying control to keep the difference between the temperature detected by the first temperature sensor 31*b* and the temperature detected by the second temperature sensors 34 at a target value on the heating side, while keeping the difference between the temperature detected by the second temperature sensors 34 and the temperature detected by the first temperature sensor 31*a* at a target value on the cooling side.

Note that when executing the cooling only operation mode, the heating only operation mode, the cooling main operation mode, and the heating main operation mode, it is not necessary for the heat medium to flow to use side heat exchangers 26 with no heat load (including those switched off by thermo-off control). For this reason, the heat medium is made to not flow to the use side heat exchangers 26 by closing flow paths with the heat medium flow control devices 25.

In other words, the heat medium flow control devices 25 are controlled to fully open or fully close according to the heat load produced in the use side heat exchangers 26.

[Compressor Protection Control]

Figure 11:
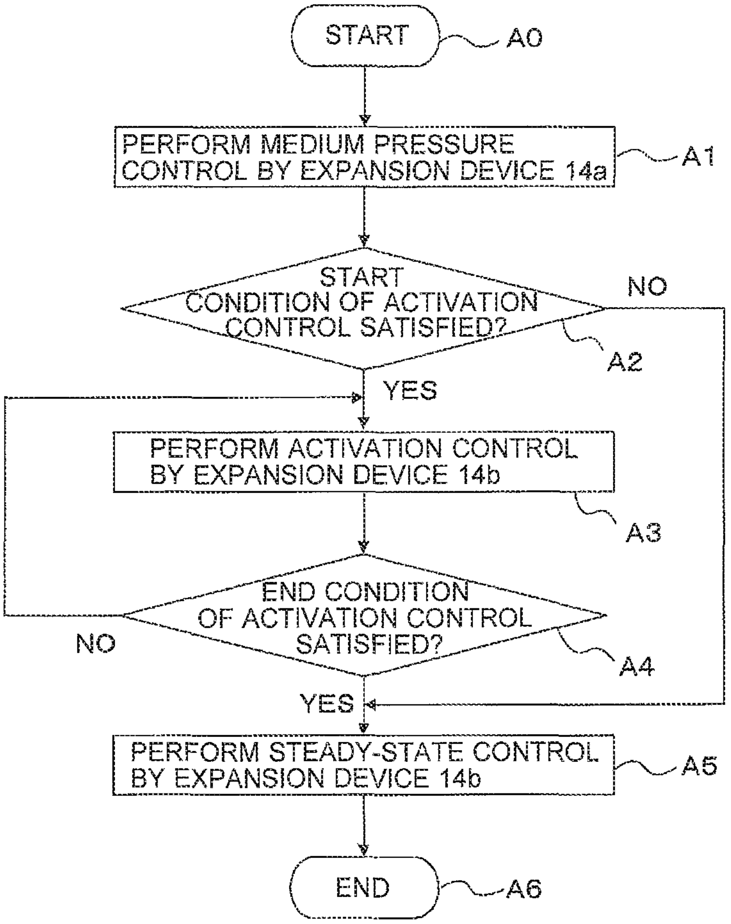
FIG. 11 is a flowchart illustrating the operation of medium pressure control, activation control, and steady-state control of the air-conditioning apparatus according to Embodiment 1 of the present invention.

FIG. 11 is a flowchart illustrating the operation of medium pressure control, activation control, and steady-state control of the air-conditioning apparatus 100 according to Embodiment 1. Note that in the following description, the expansion device 14*a* and the expansion device 14*b* are described as devices that have continuously variable opening degrees, such as electronic expansion valves driven by a stepping motor, for example.

The air-conditioning apparatus 100 according to the present Embodiment 1 is able to control the expansion device 14*a* used for medium pressure control and the expansion device 14*b* used for discharge temperature control of the compressor 10 (compressor protection control) to enable the effective injection of liquid refrigerant into the compressor 10 irrespective of the operation mode.

The compressor protection control is broadly classified into medium pressure control by the expansion device 14*a,* steady-state control of the expansion device 14*b* when the discharge refrigerant temperature of the compressor 10 transiently does not vary, and activation control of the expansion device 14*b* when the discharge refrigerant temperature of the compressor 10 transiently rises.

Note that "transiently" refers to cases when the discharge refrigerant temperature of the compressor 10 rises significantly, such as after activation of the compressor 10 or after returning from a defrost operation.

(Medium Pressure Control)

The objectives of performing medium pressure control may be the following, for example. In the case of a low outside air temperature, the evaporation temperature of the heat source side heat exchanger 12 that functions as an evaporator falls, and if the discharge refrigerant temperature of the compressor 10 becomes an extremely high temperature or the density of the refrigerant suctioned into the compressor 10 falls, the performance of the heating only operation mode and the heating main operation mode may decrease in some cases.

Consequently, by performing medium pressure control that regulates the opening degree of the expansion device 14*a,* the refrigerant on the upstream side of the expansion device 14*a* becomes medium pressure refrigerant having a higher refrigerant pressure and a greater density than gas refrigerant or the like. Subsequently, by supplying the medium pressure refrigerant to the suction injection pipe 4*c,* decreased discharge refrigerant temperature of the compressor 10 when the outside air temperature is low as well as decreased performance of the heating only operation mode and the heating main operation mode are minimized.

At this point, medium pressure will be described.

In the heating only operation mode, let low pressure refrigerant be the refrigerant flowing out from the heat source side heat exchanger 12, and let high pressure refrigerant be the refrigerant supplied to the intermediate heat exchangers 15*a* and 15*b*. In this case, medium pressure refers to a pressure that is less than the high pressure but greater than the low pressure described herein.

In the heating main operation mode, let low pressure refrigerant be the refrigerant flowing out from the heat source side heat exchanger 12, and let high pressure refrigerant be the refrigerant supplied to the intermediate heat exchanger 15*b*. Medium pressure refers to a pressure that is less than the high pressure but greater than the low pressure described herein.

Medium pressure control is control that regulates the opening degree of the expansion device 14*a* to set the refrigerant depressurized by the expansion devices 16 to medium pressure, as described in the refrigerant flow of the refrigerant circuit A discussed earlier. The medium pressure control corresponds to step A1 of FIG. 11, and is expressed more specifically by the control method in FIG. 12 discussed later.

During the heating only operation mode, medium pressure control is control that regulates the opening degree of the expansion device 14*a* so that the opening degree becomes a preset target value, and sets the pressure of refrigerant on the upstream side of the expansion device 14*a* and the downstream side of the expansion device 16*a* and the expansion device 16*b* to medium pressure (see FIG. 5).

Also, during the heating main operation mode, medium pressure control is control that regulates the opening degree of the expansion device 14*a* so that the opening degree becomes a preset target value, and sets the pressure of refrigerant on the upstream side of the expansion device 14*a* and the downstream side of the expansion device 16*b* to medium pressure (see FIG. 9). Note that the opening degree of the expansion device 14*a* is controlled so that the medium pressure detected by the medium pressure detection device 32 becomes a target value.

Furthermore, in medium pressure control during the cooling only operation mode and cooling main operation mode, high pressure two-phase gas-liquid refrigerant flowing out from the heat source side heat exchanger 12 is supplied to the suction injection pipe 4*c* via the branching unit 27*a* and the opening and closing device 24. The refrigerant supplied to the suction injection pipe 4*c* is depressurized by the expansion device 14*b*. Subsequently, liquid refrigerant is supplied to the suction side of the compressor 10.

Note that during the cooling only operation mode and cooling main operation mode, the refrigerant flowing out from the heat source side heat exchanger 12 does not pass through the expansion devices 16, and thus is at high pressure. For this reason, during the cooling only operation mode and cooling main operation mode, the opening degree of the expansion device 14*a* is not particularly controlled, but instead set to a fixed opening degree (for example, a fully open opening degree), and the refrigerant supplied to the suction side of the compressor 10 by the expansion device 14*b* becomes low pressure.

(Steady-State Control)

Steady-state control is control that controls the opening degree of the expansion device 14*b* to minimize the risk of degradation of refrigerating machine oil and damage to the compressor 10 due to the refrigerant in the discharge part of the compressor 10 going to high temperature. The steady-state control is performed when the discharge refrigerant temperature of the compressor 10 does not transiently rise.

Note that the steady-state control may be performed in the cooling only operation mode, the heating only operation mode, the cooling main operation mode, and the heating main operation mode, and controls the opening degree of the expansion device 14*b* on the basis of a target value of the discharge refrigerant temperature of the compressor 10 (hereinafter also designated the target value Tdm of the discharge refrigerant temperature). The steady-state control corresponds to step A5 of FIG. 11, and is expressed more specifically by the control method in FIG. 13 discussed later.

(Activation Control)

Activation control is similar to steady-state control in being control that controls the opening degree of the expansion device 14*b* to minimize the risk of degradation of refrigerating machine oil and damage to the compressor 10 due to the refrigerant in the discharge part of the compressor 10 going to high temperature. However, activation control is performed instead of steady-state control when the discharge refrigerant temperature transiently rises.

In cases such as immediately after activation of the compressor 10 or immediately after returning from a defrost operation, the discharge refrigerant temperature of the compressor 10 transiently changes from a low value to a high value, whereas the opening degree of the expansion device 14*b* in this case is closed in the pre-activation state or the state during the defrost operation.

In this way, if the opening degree of the expansion device 14*b* does not increase even though the discharge refrigerant temperature transiently rises, there is a possibility of being unable to reliably minimize degradation of refrigerating machine oil and damage to the compressor 10. In other words, during activation of the compressor 10, although the refrigerant temperature transiently rises and may reach high temperature, since the refrigerant temperature is not stable over time and the discharge refrigerant temperature detection device 37 cannot detect an accurate temperature, control to increase the opening degree of the expansion device 14*b* is not performed. For this reason, there is a possibility that the discharge refrigerant temperature of the compressor 10 will go to high temperature and cause degradation of refrigerating machine oil and damage to the compressor 10.

Accordingly, in the activation control, the opening degree of the expansion device 14*b* is increased in cases such as immediately after activation of the compressor 10 or immediately after returning from a defrost operation.

Note that the degree to which the opening degree of the expansion device 14*b* increases is configured to be greater for the activation control than the steady-state control. More specifically, the value of the target value Tdm of the discharge refrigerant temperature for activation operation is configured to be less than the target value Tdm of the discharge refrigerant temperature for steady-state control (see step D2 of FIG. 15 discussed later), thereby causing the opening degree of the expansion device 14*b* to become greater for activation control than steady-state control. As a result, the quantity of liquid refrigerant supplied to the compressor 10 increases, making it possible to rapidly decrease the refrigerant temperature even if the discharge refrigerant temperature of the compressor 10 transiently rises.

Note that similarly to the steady-state control, the activation control may be performed in the cooling only operation mode, the heating only operation mode, the cooling main operation mode, and the heating main operation mode, and controls the opening degree of the expansion device 14_b_ on the basis of the temperature of refrigerant discharged by the compressor 10. The activation control corresponds to step A3 of FIG. 11, and is expressed more specifically by the control method in FIG. 15 discussed later.

Next, a flow of medium pressure control, steady-state control, and activation control in the compressor protection control will be described with reference to FIG. 11. Note that the detailed content of the medium pressure control, the steady-state control, and the activation control will be described later using FIGS. 12, 13, and 15.

<Step A0>

The controller 50 starts the compressor activation control due to activation of the compressor 10.

The controller 50 sets the opening degree of the expansion device 14_a_ to an opening degree that does not generate medium pressure (for example, fully open), and sets the opening degree of the expansion device 14_b_ to an opening degree that does not perform suction injection (for example, fully closed).

<Step A1>

The controller 50 proceeds to the medium pressure control by the expansion device 14_a_. The control in step A1 will be described in detail using FIG. 12.

<Step A2>

The controller 50 makes a determination on a start condition of the activation control.

If the start condition of the activation control is satisfied, the flow proceeds to step A3.

If the start condition of the activation control is not satisfied, the flow proceeds to step A5.

Note that the start condition of activation control is decided on the basis of the discharge refrigerant temperature of the compressor 10 increasing significantly, such as after activation of the compressor 10 or after returning from a defrost operation. Accordingly, the start condition may be defined as (1) when a predetermined time elapses after activation of the compressor 10, or (2) when a predetermined time elapses after returning from a defrost operation, for example.

<Step A3>

In step A3, activation control by the expansion device 14_b_ is performed. The control in step A3 will be described in detail using FIG. 15.

<Step A4>

The controller 50 makes a determination on an end condition of the activation control.

If the end condition of the activation control is satisfied, the flow proceeds to step A5.

If the end condition of the activation control is not satisfied, the flow returns to step A3.

<Step A5>

The controller 50 performs steady-state control.

<Step A6>

The controller 50 ends the compressor activation control.

(Detailed Description of Medium Pressure Control)

Figure 12:
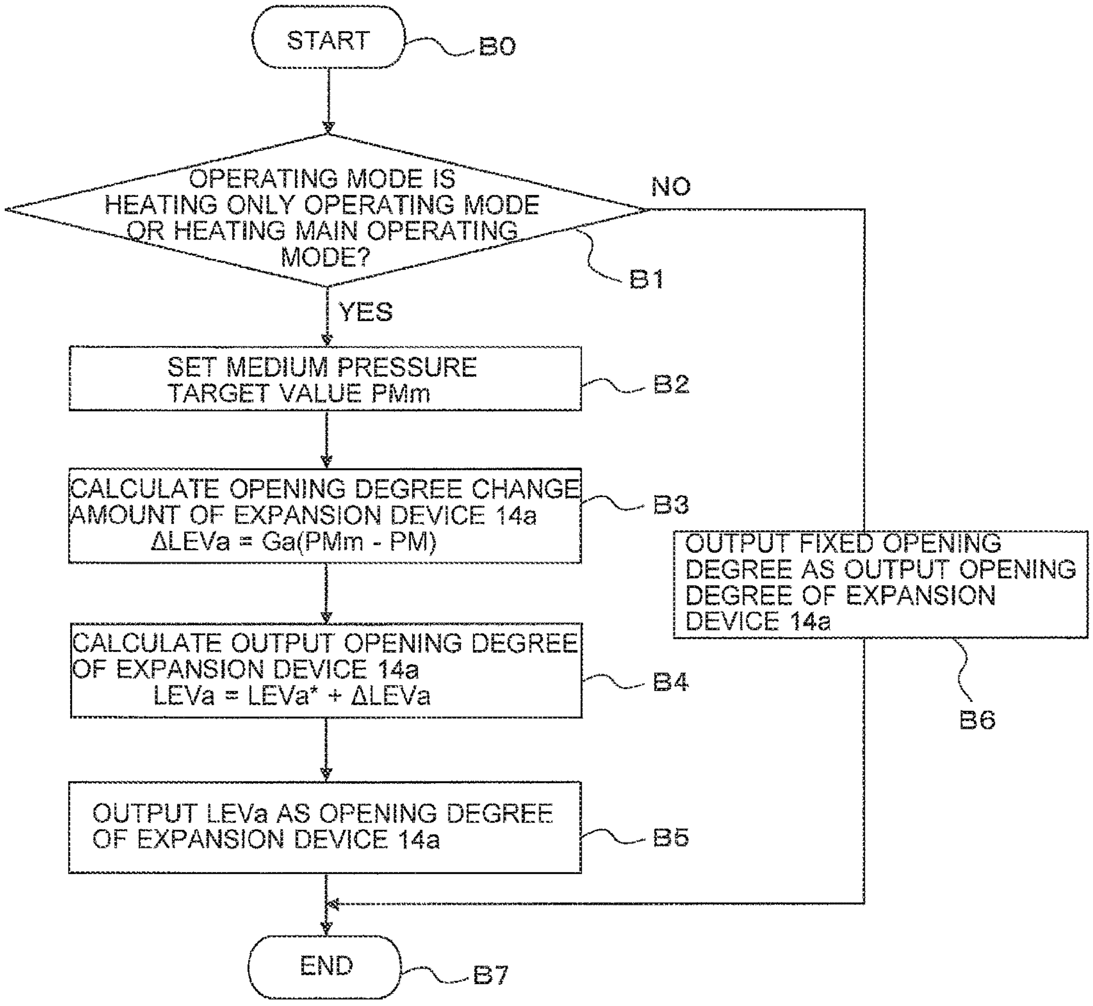
FIG. 12 is a flowchart illustrating the operation of medium pressure control of the air-conditioning apparatus according to Embodiment 1 of the present invention.

FIG. 12 is a flowchart illustrating the operation of the medium pressure control of the air-conditioning apparatus 100. The medium pressure control by the expansion device 14_a_ will be described in detail with reference to FIG. 12.

<Step B0>

The controller 50 starts the medium pressure control by the expansion device 14_a_.

The controller 50 sets the opening degree of the expansion device 14_a_ to an opening degree that does not generate medium pressure (for example, fully open), and sets the opening degree of the expansion device 14_b_ to an opening degree that does not perform suction injection (for example, fully closed).

<Step B1>

The controller 50 determines whether or not the operation mode is the heating only operation mode or the heating main operation mode.

If the operation mode is one of these operation modes, the flow proceeds to step B2.

If the operation mode is not one of these operation modes, the flow proceeds to step B6.

<Step B2>

The controller 50 sets a medium pressure target value PMm.

Since heating only operation mode operates under an operating condition of a lower outside air temperature than heating main operation, the discharge refrigerant temperature correspondingly rises more readily, and the flow rate of refrigerant to inject into the suction side of the compressor 10 increases. Accordingly, during the heating only operation mode, a higher medium pressure target value PMm compared to heating main operation mode may be set to increase the refrigerant flow rate. For example, the medium pressure target value PMm may be set to the saturation pressure at 20 degrees C.

On the other hand, during the heating main operation mode, since any of the indoor units 2_a_ to 2_d_ are performing cooling operation, and the intermediate heat exchanger 15_a_ is functioning as an evaporator, the medium pressure cannot reach a very high value. For this reason, in the heating main operation mode, a lower medium pressure target value PMm compared to heating only operation mode may be set. For example, the medium pressure target value PMm may be set to such as the saturation pressure from 0 to 10 degrees C.

Note that to smoothly change modes between the heating only operation mode and the heating main operation mode, the medium pressure target value PMm in the heating only operation mode may be set to a value of similar degree to the medium pressure target value PMm during the heating main operation mode.

<Step B3>

The controller 50 calculates an opening degree change amount ΔLEVa of the expansion device 14_a_ on the basis of the detection result of the medium pressure detection device 32 (hereinafter also designated the medium pressure detected value PM) and the medium pressure target value PMm in step B2.

Note that the opening degree change amount ΔLEVa of the expansion device 14_a_ is calculated according to the formula indicated in the following Eq. (1). Also, Eq. (1) expresses the opening degree change amount ΔLEVa of the expansion device 14_a_ as the value obtained by subtracting the medium pressure detected value PM of the medium pressure detection device 32 from the medium pressure target value PMm, multiplied by a control gain Ga. Herein, the control gain Ga is a value determined by the specifications of the expansion device 14_a_.

<Step B4>

The controller 50 calculates the sum of the opening degree change amount ΔLEVa calculated in step B3 and the previously output opening degree LEVa* of the expansion device 14_a_, as in Eq. (2) below. The value of the sum corresponds to the opening degree LEVa of the expansion device 14_a_.

Note that the previously output opening degree LEVa* of the expansion device 14_a_ refers to the value of the opening degree LEVa calculated in step B4 in the cycle performed one cycle previously to the cycle currently being performed, provided that one cycle is the compressor protection control (see FIG. 11) that starts in step A0 and ends in step A6.

<Step B5>

The controller 50 regulates the opening degree of the expansion device 14*a* to reach the opening degree LEVa of the expansion device 14*a* calculated in step B4.

<Step B6>

The controller 50 sets the opening degree of the expansion device 14*a* to a fixed opening degree (for example, fully open).

<Step B7>

The controller 50 ends the medium pressure control by the expansion device 14*a*.

(Math. 1)

$$\Delta LEVa = Ga \times (PMm - PM) \tag{1}$$

(Math. 2)

$$LEVa = LEVa^{*} + \Delta LEVa \tag{2}$$

(Detailed Description of Steady-state Control)

Figure 13:
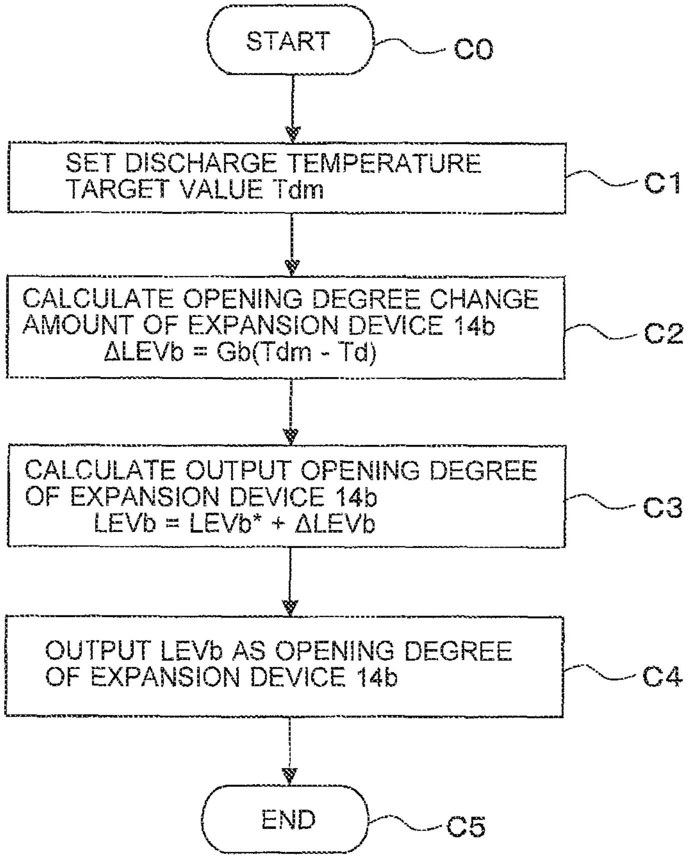
FIG. 13 is a flowchart illustrating the operation of stead-state control of the air-conditioning apparatus according to Embodiment 1 of the present invention.

FIG. 13 is a flowchart illustrating the operation of the steady-state control of the air-conditioning apparatus 100. The steady-state control by the expansion device 14*b* performed when the discharge refrigerant temperature of the compressor 10 does not transiently rise will be described in detail with reference to FIG. 13.

<Step C0>

The controller 50 starts the steady-state control by the expansion device 14*b*.

<Step C1>

The controller 50 sets a target value Tdm of the discharge refrigerant temperature of the compressor 10.

For the description in FIG. 13, a case will be described in which the discharge refrigerant temperature target value Tdm is set to 105 degrees C., for example.

<Step C2>

The controller 50 calculates an opening degree change amount ΔLEVb of the expansion device 14*b* on the basis of the predetermined discharge refrigerant temperature target value Tdm of step C1, and the detection result of the discharge refrigerant temperature detection device 37, or in other words the current value Td0 of the discharge refrigerant temperature of the compressor 10.

Note that the opening degree change amount ΔLEVb of the expansion device 14*b* is calculated according to the formula indicated in the following Eq. (3). Also, Eq. (3) is expressed as the value obtained by subtracting the current value Td0 of the discharge refrigerant temperature of the compressor 10 from the discharge refrigerant temperature target value Tdm, multiplied by a control gain Gb. Herein, the control gain Gb is a value determined by the specifications of the expansion device 14*b*.

Note that step C2 herein is described as adopting a target value Tdm of the discharge refrigerant temperature of the compressor 10, but is not limited thereto. For example, instead of the target value Tdm of the discharge refrigerant temperature, a discharge degree of superheat of the compressor 10 obtained on the basis of the detected temperature from the discharge refrigerant temperature detection device 37 and the detected pressure from the high pressure detection device 39 may also be used. In this way, not only the discharge refrigerant temperature but also a factor related to the discharge refrigerant temperature, such as the degree of superheat, may also be used.

In other words, in the present step C2, instead of the target value Tdm of the discharge refrigerant temperature, the opening degree change amount ΔLEVb of the expansion device 14*b* may also be calculated on the basis of a target value of the discharge degree of superheat (corresponding to Tdm) which is a target value related to the discharge refrigerant temperature, and a value of the discharge degree of superheat related to the discharge refrigerant temperature (corresponding to Td0) obtained from the detected temperature from the discharge refrigerant temperature detection device 37 and the detected pressure from the high pressure detection device 39.

<Step C3>

The controller 50 calculates the sum of the opening degree change amount ΔLEVb of the expansion device 14*b* calculated using Eq. (3) and the previously output opening degree LEVb* of the expansion device 14*b*, as in Eq. (4) below. The value of the sum corresponds to the opening degree LEVb of the expansion device 14*b*.

<Step C4>

The controller 50 regulates the opening degree of the expansion device 14*b* to reach the opening degree LEVb of the expansion device 14*b* calculated in step C3.

<Step C5>

The controller 50 ends the steady-state control by the expansion device 14*b*.

(Math. 3)

$$\Delta LEVb = Gb \times (Tdm - Td0) \tag{3}$$

(Math. 4)

$$LEVb = LEVb^{*} + \Delta LEVb \tag{4}$$

FIG. 14 is a graph for explaining three-point prediction. Although the opening degree change amount ΔLEVb of the expansion device 14*b* is calculated on the basis of Eq. (3), the configuration is not limited thereto, and the three-point prediction discussed hereinafter may also be used.

In other words, rather than using the current value Td0 of the discharge refrigerant temperature of the compressor 10 as in Eq. (3), the opening degree change amount ΔLEVb of the expansion device 14*b* may also be calculated using a three-point prediction that calculates a discharge refrigerant temperature predicted value Tdn at the next control timing.

Three-point prediction is a method that assumes that various types of response exhibit first-order lag characteristics, and from the values at three different times, calculates a predicted value at the next time, or an endpoint value Tde that will be reached if the current state continues.

To describe the discharge refrigerant temperature of the compressor 10 using FIG. 14 as an example, when first-order lag (the curve in FIG. 14) is expressed in the response of the discharge refrigerant temperature of the compressor 10 due to a change in the opening degree of the expansion device 14*b*, the discharge refrigerant temperatures Td0, Td1, and Td2 at three different times may be used to calculate a predicted value Tdn of the discharge refrigerant temperature at the next time in the format indicated in Eq. (5) given below.

(Math. 5)

$$Tdn = Td0 + \frac{(Td0 - Td1)^2}{Td1 - Td0} \tag{5}$$

Herein, Td0 in Eq. (5) is the current value of the discharge refrigerant temperature of the compressor 10, while Td1 is the discharge refrigerant temperature of the compressor 10 at ΔT seconds before, and Td2 is the discharge refrigerant temperature of the compressor 10 at (ΔT×2) seconds before. Herein, ΔT is set so that the control interval of the expansion device 14*b* is (ΔT×3) seconds or greater.

To calculate the discharge refrigerant temperature predicted value Tdn of the compressor 10 at the next control timing using Eq. (5), the three conditional expressions expressed in Eq. (6) must be satisfied.

(Math. 6)

$$Td0>Td1 \text{ and } Td1>Td2 \text{ and } Td0-Td1<Td1-Td2 \quad (6)$$

In an actual operating state, the prediction does not necessarily yield a feasible operating state, and thus when the prediction is not possible, the value calculated using Eq. (7) is used as the discharge refrigerant temperature predicted value Tdn of the compressor 10 at the next control timing.

(Math. 7)

$$Tdn=Td0+(Td0-Td1) \quad (7)$$

Note that the target value Tdm of the discharge refrigerant temperature of the compressor 10 is required to be set as a value that is lower than an upper-limit value of the discharge refrigerant temperature of the compressor 10 set for the purpose of preventing degradation of the refrigerating machine oil or the like, but if it is set too low, the discharge refrigerant temperature of the compressor 10 falls, and both heating performance and cooling performance decreases.

Consequently, it is desirable to set the target value Tdm of the discharge refrigerant temperature to as high a value as possible. For example, provided that the upper-limit value of the discharge refrigerant temperature of the compressor 10 is 120 degrees C., a value that is 15 degrees C. lower, or 105 degrees C., may be set. Although Embodiment 1 describes an example of treating 105 degrees C. as the control target value, the configuration is not limited thereto. For example, a value of approximately 100 degrees C. does not pose a significant problem. To stop or slow down the compressor 10 at 110 degrees C., the target value of the discharge refrigerant temperature may be set to a value from 100 to 110 degrees C.

Additionally, although the description of FIG. 14 describes a method of predicting the discharge refrigerant temperature of the compressor 10 as part of the control in FIG. 13, this prediction method may also be applied to the medium pressure as part of the control in FIG. 12. In other words, the detection result of the medium pressure detection device 32 may be predicted by three-point prediction, and in step B2 of FIG. 12, the opening degree change amount ΔLEVa of the expansion device 14*a* may also be calculated on the basis of the predicted value of the medium pressure detection device 32, and the medium pressure target value PMm in step B2.

(Detailed Description of Activation Control)

Figure 15:
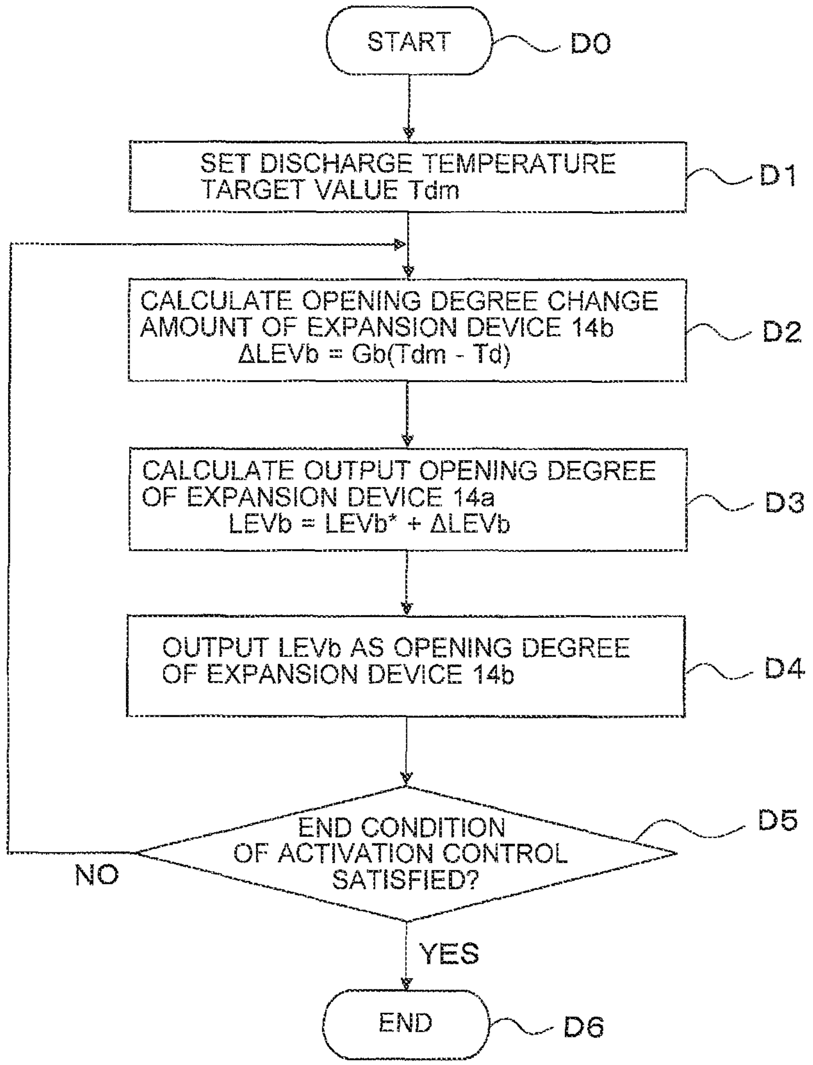
FIG. 15 is a flowchart illustrating the operation of activation control of the air-conditioning apparatus according to Embodiment 1 of the present invention.

FIG. 15 is a flowchart illustrating the operation of activation control of the air-conditioning apparatus 100 according to Embodiment 1. The activation control by the expansion device 14*b* performed when the discharge refrigerant temperature of the compressor 10 transiently rises will be described in detail with reference to FIG. 15.

<Step D0>

The controller 50 proceeds to the activation control by the expansion device 14*b*.

<Step D1>

The controller 50 sets a target value Tdm of the discharge refrigerant temperature of the compressor 10.

In the activation control, the target value Tdm of the discharge refrigerant temperature is set to a lower value than the target value Tdm of the discharge refrigerant temperature of the steady-state control, and is set to a value such as 90 degrees C., for example. Note that if the target value of the discharge refrigerant temperature during steady-state is set to a value from 100 to 110 degrees C., the target value of the discharge refrigerant temperature in the activation control may be set to a lower value from 80 to 100 degrees C.

<Step D2>

The controller 50 calculates an opening degree change amount ΔLEVb of the expansion device 14*b* on the basis of the predetermined discharge refrigerant temperature target value Tdm of step D1, and the current value Td0 of the discharge refrigerant temperature of the compressor 10.

Note that the opening degree change amount ΔLEVb of the expansion device 14*b* uses Eq. (3), similarly to step C2 discussed earlier.

Also, in the present step D2, the opening degree change amount ΔLEVb likewise may be calculated on the basis of a target degree of superheat related to the discharge refrigerant temperature and a current value of the discharge degree of superheat related to the discharge refrigerant temperature, as discussed in step C2.

<Step D3>

The controller 50 calculates the sum of the calculated opening degree change amount ΔLEVb of the expansion device 14*b* and the previously output opening degree LEVb* of the expansion device 14*b*, as in Eq. (4) above. The value of the sum corresponds to the opening degree LEVb of the expansion device 14*b*.

<Step D4>

The controller 50 regulates the opening degree of the expansion device 14*b* to reach the opening degree LEVb of the expansion device 14*b* calculated in step D3.

In certain cases such as immediately after activating the compressor 10, the discharge refrigerant temperature Tdm is not stable, and the detection result of the discharge refrigerant temperature detection device 37 (the current value Td0 in step D1) takes a relatively low value. However, in step D1, the target value Tdm of the discharge refrigerant temperature is set to a lower value than the target value Tdm of the discharge refrigerant temperature of the steady-state control. In other words, the current value Td0 more readily exceeds the target value Tdm of the discharge refrigerant temperature.

For this reason, immediately after the compressor 10 is activated, even if the value of the opening degree LEVb* in step D3 is a first value corresponding to being fully closed, the value of the opening degree change amount ΔLEVb in step D2 becomes a second value that increases the opening degree. In other words, after taking the sum of the first value and the second value in step D3, a value that increases the opening degree is output in step D4.

In this way, in the activation control, by setting the set value of the discharge refrigerant temperature Tdm lower than in steady-state control, the opening degree of the expansion device 14*b* more readily becomes greater than in steady-state control.

<Step D5>

The controller 50 determines whether or not the end condition in FIG. 16 discussed later is satisfied.

If the end condition is satisfied, the flow proceeds to step D6.

If the end condition is not satisfied, the flow returns to step D2, and control of the opening degree of the expansion device 14*b* continues.

<Step D6>

The controller 50 ends the steady-state control by the expansion device 14*b*.

Figure 16:
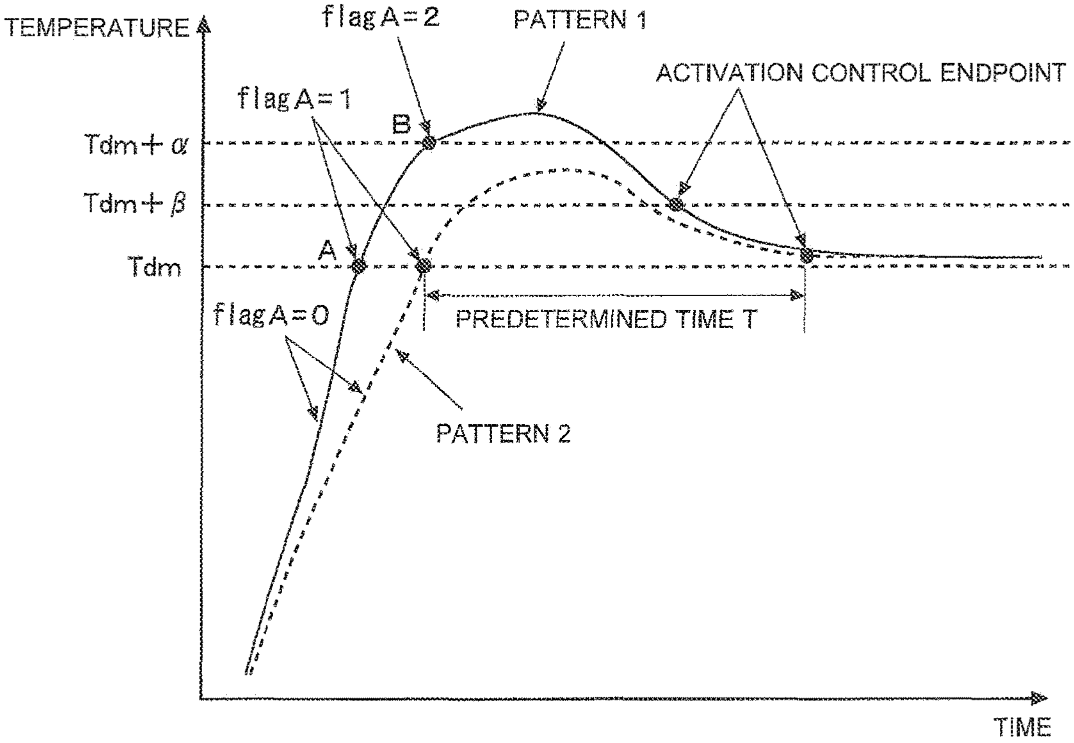
FIG. 16 is a graph illustrating the state of an end determination flag used in activation control of the air-conditioning apparatus according to Embodiment 1 of the present invention.

FIG. 16 is a graph illustrating the state of an end determination flag used in activation control of the air-conditioning apparatus 100 according to Embodiment 1. The end condition of activation control (corresponding to step A4 of FIG. 11) will be described with reference to FIG. 16. First, the definition of an activation control end determination flag flagA for determining whether or not to end the activation control will be described using FIG. 16.

The definition of the activation control end determination flag flagA is described below.

First, suppose that the end determination flag flagA=0 at activation or when defrosting ends.

Also, suppose that the end determination flag flagA=1 in the case in which the discharge refrigerant temperature Td of the compressor 10 becomes equal to or greater than the target value Tdm of the discharge refrigerant temperature when the end determination flag flagA=0 (point A in FIG. 16).

Furthermore, suppose that the end determination flag flagA=2 in the case in which the discharge refrigerant temperature Td of the compressor 10 becomes equal to or greater than the target value Tdm+$\alpha$ of the discharge refrigerant temperature when the end determination flag flagA=2 (point B in FIG. 16).

Herein, $\alpha$ is a threshold value to determine whether or not the discharge refrigerant temperature has overshot the target value, and may be set to 5 degrees C., for example.

Herein, suppose that the present activation control ends when either one of the following two conditions is satisfied.

(1) The first condition is the case in which the end determination flag flagA=2 and Td<Tdm+$\beta$ (Pattern 1 in FIG. 16).

(2) The second condition is the case in which the end determination flag flagA=1 and a predetermined time T has elapsed since flagA became flagA=1 (Pattern 2 in FIG. 16).

Herein, $\beta$ is a threshold value to determine whether or not a discharge refrigerant temperature that overshot the discharge refrigerant temperature target value+$\alpha$ has fallen back down. This threshold value $\beta$ must be set to a smaller value than the threshold value $\alpha$ discussed above, and may be set to 3 degrees C., for example.

Also, the predetermined time T is a time used when determining whether or not the state of performing the activation control is an operating state in which the discharge refrigerant temperature of the compressor 10 rises, and may be set to a time such as 7 minutes, for example. Subsequently, the controller 50 determines that the discharge refrigerant temperature of the compressor 10 is stable if the discharge refrigerant temperature of the compressor 10 is low after the time T elapses.

When the activation control satisfies the end condition, the activation control ends, and the flow proceeds to the steady-state control.

By conducting control as above, the discharge refrigerant temperature may be suitably controlled even when the discharge refrigerant temperature of the compressor 10 greatly changes from a low value to a high value, such as at activation, and a highly reliable air-conditioning apparatus may be obtained.

Note that although the case in which the target value Tdm of the discharge refrigerant temperature in the activation control is 90 degrees C. has been described as an example, the configuration is not limited thereto.

Provided that the upper limit of the discharge refrigerant temperature of the compressor 10 is approximately 120 degrees C., the controller 50 is configured to stop or slow down the compressor 10 if the discharge refrigerant temperature reaches 110 degrees C., for example. In other words, since there is a high probability of damage to the compressor 10 and the like if the refrigerant temperature reaches approximately 120 degrees C., to protect the compressor 10, the compressor 10 is stopped or slowed down before that point, at 110 degrees C.

At this point, if the target value Tdm of the discharge refrigerant temperature is set to 105 degrees C. and the discharge refrigerant temperature overshoots the discharge refrigerant temperature Tdm by 5 degrees C. or more, protection of the compressor 10 starts, and the compressor 10 is stopped or slowed down. For this reason, the target value Tdm of the discharge refrigerant temperature may be set to a temperature lower than 105 degrees C. In this way, by providing an interval greater than 5 degrees C. between the temperature at which the compressor 10 is stopped or slowed down for protection (110 degrees C.) and the target value Tdm of the discharge refrigerant temperature (105 degrees C.), the air-conditioning apparatus 100 becomes able to use the compressor protection control more effectively.

Accordingly, the target value Tdm of the discharge refrigerant temperature during the activation control may be set to 95 degrees C., allowing for a discharge refrigerant temperature overshoot of 10 degrees C., or double 5 degrees C. Additionally, the target value Tdm of the discharge refrigerant temperature may also be set to 90 degrees C. to provide an even greater margin.

However, setting the target value Tdm of the discharge refrigerant temperature to a temperature lower than 80 degrees C. means that more liquid or two-phase refrigerant must be injected into the compressor 10 to lower the discharge refrigerant temperature. In other words, a problem occurs in that the expansion device 14*b* opens too much, and produces an excessive inflow of liquid or two-phase refrigerant into the compressor 10.

Accordingly, the target value Tdm of the discharge refrigerant temperature may be set to a temperature at which the compressor 10 does not enter discharge refrigerant temperature protection operation due to overshooting of the discharge refrigerant temperature of the compressor 10 producing during the activation control, and at which the expansion device 14*b* opens for injection (for example, approximately 90 degrees C. or 95 degrees C.).

In addition, by setting the opening degree of the expansion device 14*a* when starting the activation control to a value (such as fully open) that is larger than the opening degree in the steady state, the control target value may be reached quickly, and controllability may be improved. In addition, by setting the opening degree of the expansion device 14*b* when starting the activation control to a value (such as fully closed) that is smaller than the opening degree in the steady state, the control target value may be reached quickly, and controllability may be improved.

In the activation control and the steady-state control of the expansion device 14*b*, three-point prediction is described as an example of the method of calculating a predicted value of the discharge refrigerant temperature of the compressor 10, but the method of prediction is not limited to three-point prediction, and a predicted value of the discharge refrigerant temperature may also be computed using another prediction method.

Figure 17:
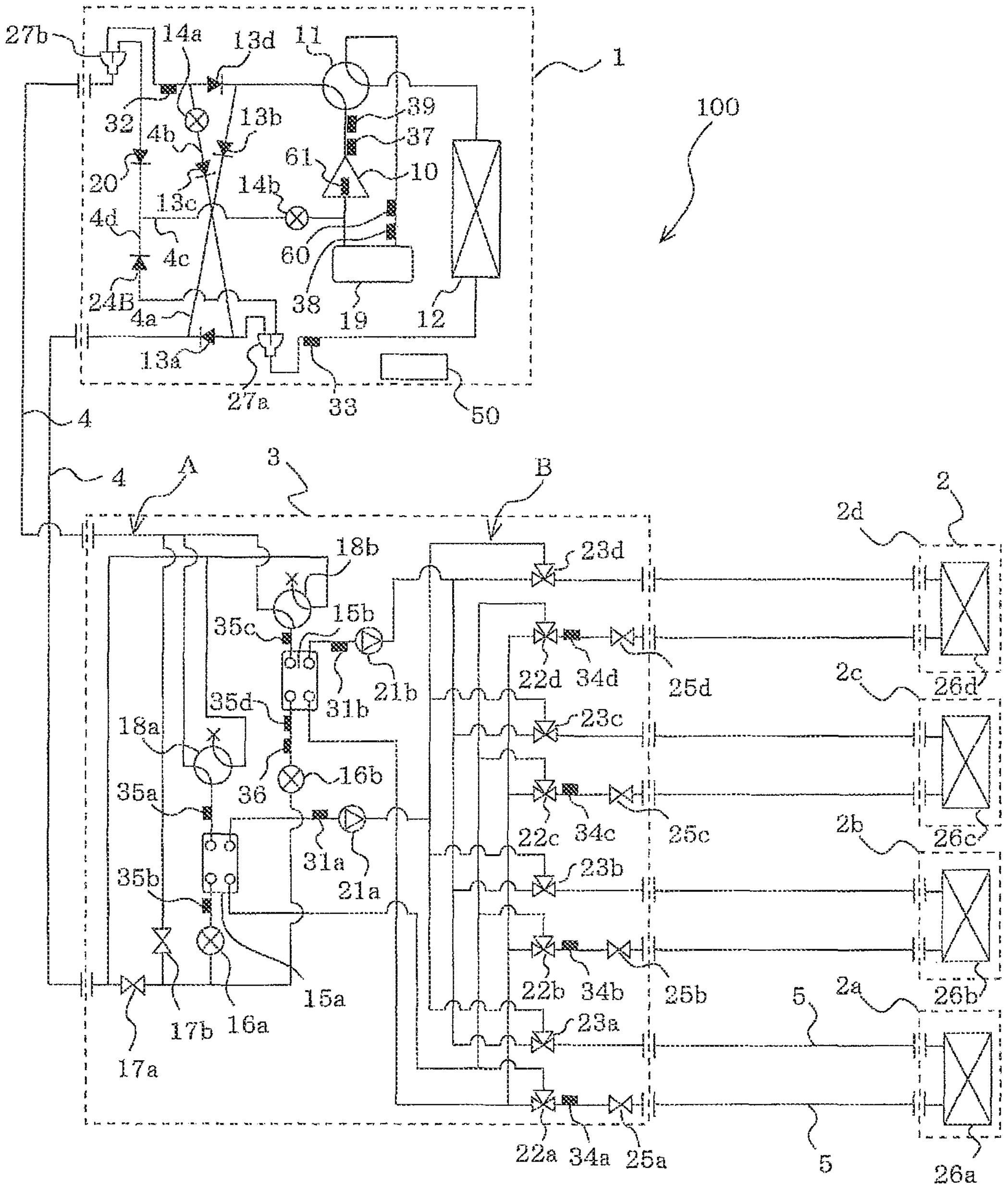
FIG. 17 is an explanatory diagram of a circuit layout that differs from the exemplary circuit layout illustrated in FIG. 2.

Also, in the outdoor unit 1 according to the present embodiment, by limiting the installation position of the branching unit 27*a* to a position on the refrigerant pipe 4 joining the heat source side heat exchanger 12 and the check valve 13*a* as illustrated in FIG. 17, the opening and closing device 24 may be substituted with a backflow prevention device 24B, making it possible to configure the air-conditioning apparatus 100 at lower cost. Note that even with the circuit layout in FIG. 17, the air-conditioning apparatus 100 is obviously still able to exhibit the same advantageous effects as the circuit layout in FIG. 2.

[Advantageous Effects of Air-Conditioning Apparatus 100 according to Embodiment 1]

The air-conditioning apparatus 100 according to Embodiment 1 performs a steady-state control and an activation control to regulate the opening degree of the expansion device 14*b*, thereby enabling medium pressure refrigerant generated by the medium pressure control of the expansion device 14*a* to be supplied to the suction injection pipe 4*c* as appropriate. For this reason, it is possible to obtain a highly reliable air-conditioning apparatus 100 that improves operating stability by lowering the discharge refrigerant temperature Tdm of the compressor 10, irrespective of the operation mode.

Embodiment 2.

Figure 18:
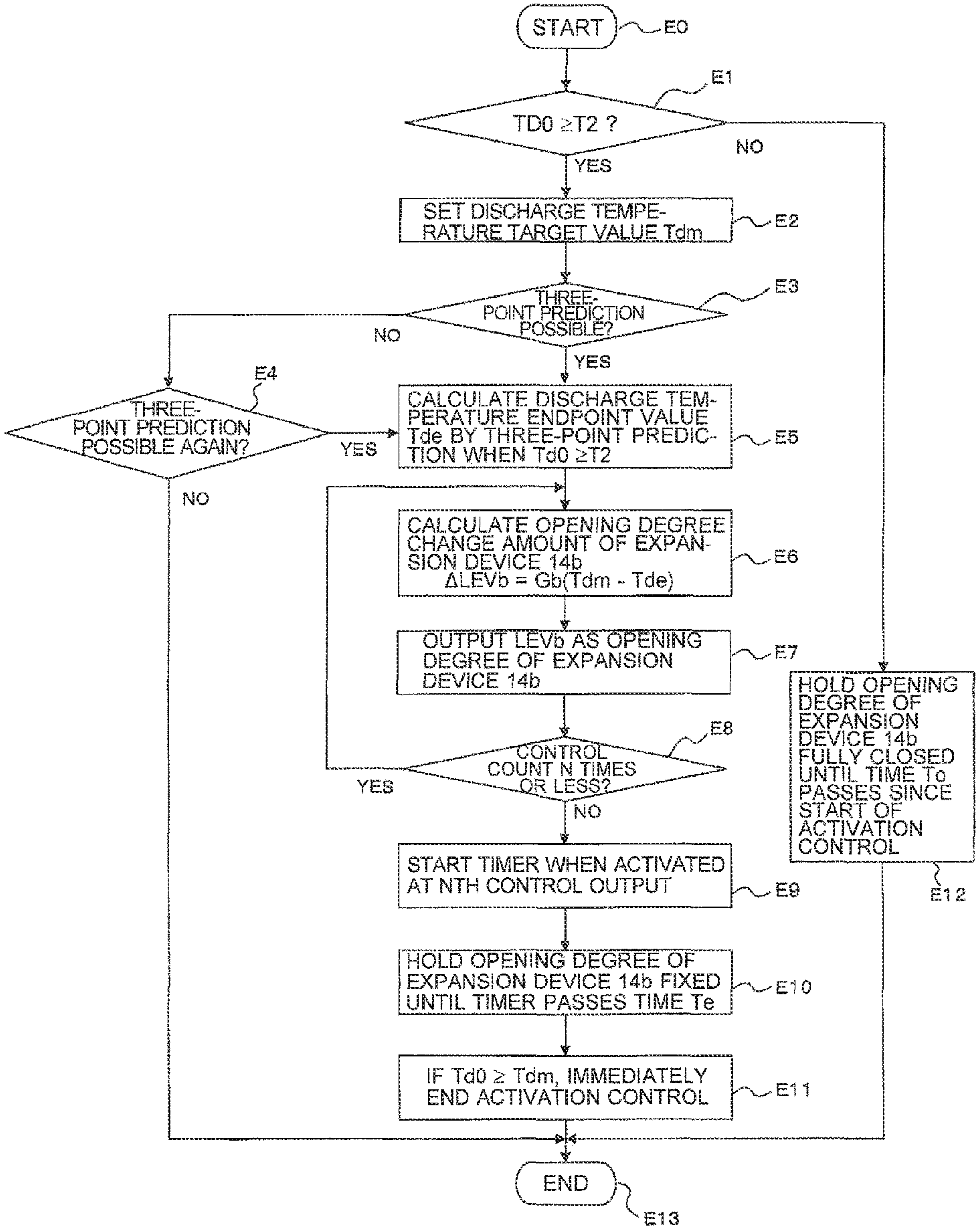
FIG. 18 is a flowchart illustrating the operation of activation control of the air-conditioning apparatus according to Embodiment 2 of the present invention.

FIG. 18 is a flowchart illustrating the operation of activation control of the air-conditioning apparatus according to Embodiment 2. Note that in the present Embodiment 2, the portions that differ from Embodiment 1 primarily will be described.

Since the configuration of the refrigeration cycle and the flow of refrigerant and heat medium in the respective operation modes in Embodiment 2 are the same as Embodiment 1, description thereof will be reduced or omitted.

The method of controlling the expansion device 14*b* in the activation control differs from Embodiment 1. Namely, the controller 50 performs the control illustrated in FIG. 18 instead of the control in FIG. 15 corresponding to step A3 of FIG. 11 in Embodiment 1. Note that the medium pressure control and the steady-state control are similar to Embodiment 1.

[Activation Control Method 2]

The activation control method 2 by the expansion device 14*b* performed when the discharge refrigerant temperature of the compressor 10 transiently rises will be described in detail with reference to FIG. 18.

<Step E0>

The controller 50 proceeds to the activation control by the expansion device 14*b*.

<Step E1>

The controller 50 determines whether or not the discharge refrigerant temperature of the compressor 10 is equal to or greater than a predetermined temperature T2 (for example, 80 degrees C.).

In the case of determining that the discharge refrigerant temperature is equal to or greater than the temperature T2, the flow proceeds to step E2.

In the case of determining that the discharge refrigerant temperature is not equal to or greater than the temperature T2, the flow proceeds to step E12.

<Step E2>

The controller 50 sets a target value Tdm of the discharge refrigerant temperature of the compressor 10.

The target value Tdm of the discharge refrigerant temperature in the activation control is set to a value such as 90 degrees C., for example.

<Step E3>

The controller 50 uses Eq. (6) to determine whether or not three-point prediction is possible for the discharge refrigerant temperature of the compressor 10.

In the case of determining that the conditions of Eq. (6) are satisfied and three-point prediction is possible, the flow proceeds to step E5.

In the case of determining that the conditions of Eq. (6) are not satisfied and three-point prediction is not possible, the flow proceeds to step E4.

<Step E4>

In the present step E4, which is the next control timing after step E3, the controller 50 again determines whether or not three-point prediction is possible for the discharge refrigerant temperature of the compressor 10.

In the case of determining that three-point prediction is possible, the flow proceeds to step E5.

In the case of determining that three-point prediction is not possible, the flow proceeds to step E13.

<Step E5>

The controller 50 uses three-point prediction and Eq. (8) to calculate a predicted value that the discharge refrigerant temperature of the compressor 10 is expected to reach. Note that the predicted value referred to herein is the endpoint value Tde (see FIG. 14) that will be reached if the current state continues when the discharge refrigerant temperature is varying according to first-order lag characteristics.

[Math. 8]

$$Tde = Td2 + \frac{(Td1 - Td2)^2}{-Td2 + 2 \times Td1 - Td0} \tag{8}$$

<Step E6>

The controller 50 calculates an opening degree change amount ΔLEVb of the expansion device 14*b* on the basis of the predetermined discharge refrigerant temperature target value Tdm of step E2, and the predicted value Tde from step E5.

Note that Eq. (9) is used to calculate the opening degree change amount ΔLEVb of the expansion device 14*b* in the present step E6. Herein, the control gain Gb is a value determined by the specifications of the expansion device 14*b*.

(Math. 9)

$$\Delta LEVb = Gb \times (Tdm - Tde) \tag{9}$$

<Step E7>

The controller 50 calculates the sum of the calculated opening degree change amount ΔLEVb of the expansion device 14*b* and the previously output opening degree LEVb* of the expansion device 14*b*, as in Eq. (4) above. The value of the sum corresponds to the opening degree LEVb of the expansion device 14*b*.

<Step E8>

The controller 50 determines whether or not a control count of the number of times that the opening degree of the expansion device 14*b* has been output is less than a predetermined count N (for example, N=3).

If the control count is less than N, the flow returns to step E6.

If the control count is not less than N, or in other words equal to or greater than N, the flow proceeds to step E9.

<Step E9>

If the output of the opening degree of the expansion device 14*b* in step E7 is the Nth time, the controller 50 starts a timer.

Note that in the present step E9, if the output of the opening degree is the (N+1)th time or greater, the timer has already started, and thus the flow proceeds to step E10 without performing any particular control.

<Step E10>

The controller 50 holds the opening degree of the expansion device 14*b* fixed until the timer passes a predetermined time Te (for example, 15 minutes).

<Step E11>

When the timer passes the time Te, the controller 50 ends the activation control of FIG. 18, and proceeds to the steady-state control.

Also, if the discharge refrigerant temperature Td0 of the compressor 10 exceeds the target value Tdm of the discharge refrigerant temperature before the timer passes the predetermined time Te, the controller 50 immediately ends the activation control and proceeds to the steady-state control.

<Step E12>

After starting the activation control, the controller 50 holds the opening degree of the expansion device 14*b* fixed in a fully closed state until a predetermined time To elapses. After the time To elapses, the flow proceeds to step E13.

<Step E13>

The controller 50 ends the activation control by the expansion device 14*b*.

Note that the opening degree of the expansion device 14*b* is incrementally controlled N times in step E8 in order to prevent the system from becoming unstable due to the opening degree of the expansion device 14*b* varying greatly. Herein, the opening degree is incrementally output three times, but the configuration is not limited thereto, and the calculated opening degree may also be output directly without being incremented, insofar as the system does not become unstable.

[Advantageous Effects of Air-Conditioning Apparatus according to Embodiment 2]

The air-conditioning apparatus according to Embodiment 2 performs an activation control as discussed above, and exhibits advantageous effects similar to the air-conditioning apparatus 100 according to Embodiment 1.

Embodiment 3.

Figure 19:
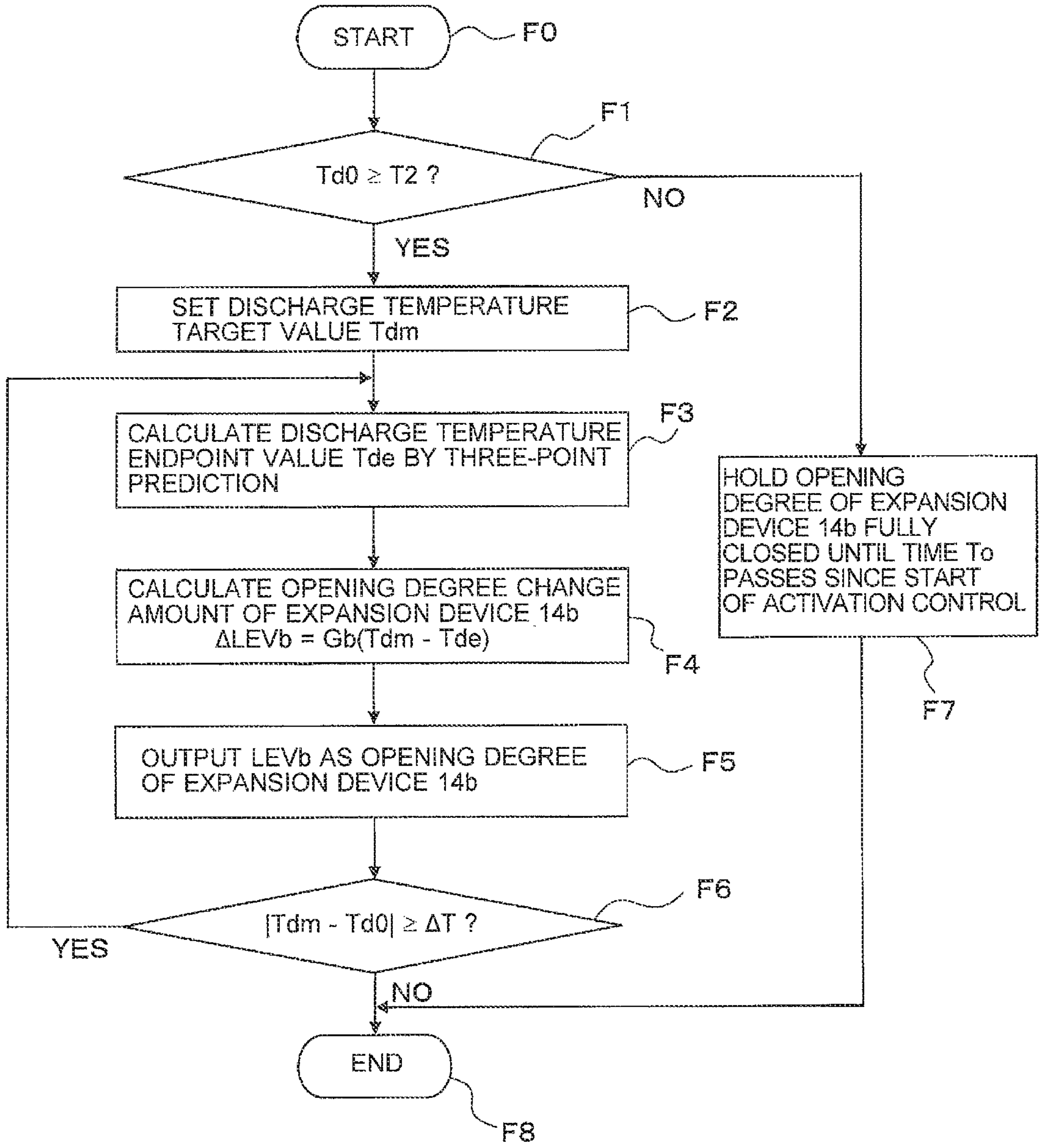
FIG. 19 is a flowchart illustrating the operation of activation control of the air-conditioning apparatus according to Embodiment 3 of the present invention.

FIG. 19 is a flowchart illustrating the operation of activation control of the air-conditioning apparatus 100 according to Embodiment 3. Note that in the present Embodiment 3, the portions that differ from Embodiments 1 and 2 primarily will be described.

Since the configuration of the refrigeration cycle and the flow of refrigerant and heat medium in the respective operation modes in Embodiment 3 are the same as Embodiment 1, description thereof will be reduced or omitted. The method of controlling the expansion device 14*b* in the activation control differs from Embodiment 1. Namely, the controller 50 performs the control illustrated in FIG. 19 instead of the control in FIG. 15 corresponding to step A3 of FIG. 11 in Embodiment 1. Note that the medium pressure control and the steady-state control are similar to Embodiment 1.

[Activation Control Method 3]

The activation control method 3 by the expansion device 14*b* performed when the discharge refrigerant temperature of the compressor 10 transiently rises will be described in detail with reference to FIG. 19.

<Step F0>

The controller 50 proceeds to the activation control by the expansion device 14*b*.

<Step F1>

The controller 50 determines whether or not the discharge refrigerant temperature of the compressor 10 is equal to or greater than a predetermined temperature T2 (for example, 80 degrees C.).

In the case of determining that the discharge refrigerant temperature is equal to or greater than the temperature T2, the flow proceeds to step F2.

In the case of determining that the discharge refrigerant temperature is not equal to or greater than the temperature T2, the flow proceeds to step F7.

<Step F2>

The controller 50 sets a target value Tdm of the discharge refrigerant temperature of the compressor 10.

The target value Tdm of the discharge refrigerant temperature in the activation control is set to a value such as 90 degrees C., for example.

<Step F3>

The controller 50 uses three-point prediction and Eq. (8) to calculate a predicted value that the discharge refrigerant temperature of the compressor 10 is expected to reach. Note that the predicted value referred to herein is the endpoint value Tde (see FIG. 14) that will be reached if the current state continues when the discharge refrigerant temperature is varying according to first-order lag characteristics.

If three-point prediction according to Eq. (8) is not possible, instead of the endpoint value Tde of the discharge refrigerant temperature of the compressor 10 according to Eq. (8), the value calculated according to Eq. (10) may be treated as the endpoint value Tde of the discharge refrigerant temperature of the compressor 10.

(Math. 10)

$$Tde = Td0 + (Td0 - Td1) \quad (10)$$

<Step F4>

The controller 50 calculates an opening degree change amount ΔLEVb of the expansion device 14*b* on the basis of the predetermined discharge refrigerant temperature target value Tdm of step F2, and the predicted value Tde from step F3.

Note that Eq. (9) is used to calculate the opening degree change amount ΔLEVb of the expansion device 14*b* in the present step F4.

<Step F5>

The controller 50 calculates the sum of the calculated opening degree change amount ΔLEVb of the expansion device 14*b* and the previously output opening degree LEVb* of the expansion device 14*b*, as in Eq. (4) above. The value of the sum corresponds to the opening degree LEVb of the expansion device 14*b*.

<Step F6>

The controller 50 determines whether or not the absolute value of the difference between the target value Tdm of the discharge refrigerant temperature of the compressor 10 and the current value Td0 of the discharge refrigerant temperature of the compressor 10 is equal to or greater than a predetermined temperature difference ΔT (for example, 3 degrees C.).

If the absolute value of the difference is equal to or greater than the temperature difference ΔT, the flow returns to step F3, and the activation control continues.

If the absolute value of the difference is not equal to or greater than the temperature difference ΔT, or in other words less than the temperature difference ΔT, the flow proceeds to step F8.

<Step F7>

After starting the activation control, the controller 50 holds the opening degree of the expansion device 14*b* fixed in a fully closed state until a predetermined time To elapses. After the time To elapses, the flow proceeds to step F8.

<Step F8>

The controller 50 ends the activation control by the expansion device 14*b*.

[Advantageous Effects of Air-Conditioning Apparatus 100 according to Embodiment 3]

The air-conditioning apparatus 100 according to Embodiment 3 performs an activation control as discussed above, and exhibits advantageous effects similar to the air-conditioning apparatus 100 according to Embodiments 1 and 2.

Embodiment 4.

Figure 20:
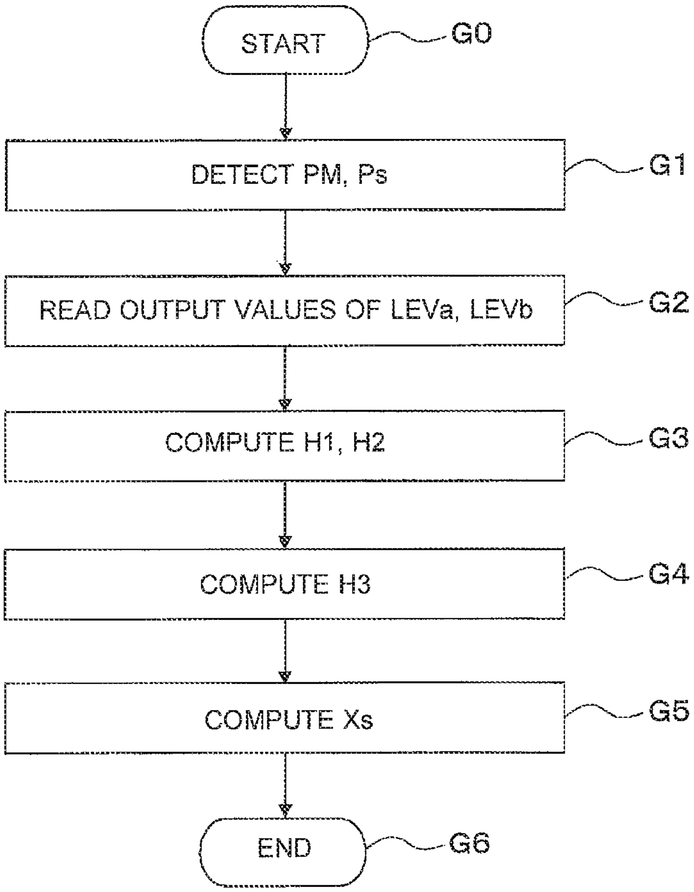
FIG. 20 is a computational flowchart for computing the quality of refrigerant suctioned into a compressor of the air-conditioning apparatus according to Embodiment 4 of the present invention.

FIG. 20 is a computational flowchart for computing the quality of refrigerant suctioned into the compressor 10 of the air-conditioning apparatus 100 according to Embodiment 4. Note that in the present Embodiment 4, the portions that differ from Embodiments 1 to 3 primarily will be described.

For the compressor 10, it is conceivable to use a compressor that is a low-pressure shell type compressor which includes a compression chamber inside a hermetically sealed container, in which the inside of the hermetically sealed container is in a low-pressure refrigerant pressure environment, and that suctions and compresses low-pressure refrigerant inside the hermetically sealed container into the compression chamber.

Note that in the present Embodiment 4, a scroll compressor with a low-pressure shell structure is described as an example of the compressor 10. When liquid or two-phase refrigerant is bypassed on the suction side of the compressor 10 by suction injection, with a low-pressure shell-type compressor, the refrigerant suctioned into the compressor 10 is sucked into the compression chamber after being heated by the hermetically sealed container (that is, the shell). Consequently, even if an inflow of some liquid refrigerant into the compressor 10 occurs, since the liquid refrigerant is heated and gasified by the shell, liquid refrigerant is not sucked into the compression chamber.

However, if the target value Tdm of the discharge refrigerant temperature is set too low and the expansion device 14*b* is opened too wide or depending on the operating state or the like, there is a possibility that an inflow of excessive liquid refrigerant into the compressor 10 will occur, the liquid refrigerant will not be sufficiently gasified by the heat of the shell, and liquid refrigerant will be mixed with the refrigerant suctioned into the compression chamber.

If liquid refrigerant is mixed with the refrigerant suctioned into the compression chamber, inexpediences like the following may occur.

(1) If excessive liquid refrigerant that cannot be fully gasified by the heat of the shell of the compressor 10 is suctioned, liquid compression that compresses the incompressible liquid refrigerant inside the compression chamber occurs, and there is a possibility that the scroll part constituting the compression chamber may be damaged.

(2) If excessive liquid refrigerant accumulates in the bottom of the shell, the density of the refrigerating machine oil stored at the bottom of the shell falls, and the sliding member of the compressor 10 cannot be fully lubricated, possibly leading to wear or damage of the sliding member of the compressor 10.

Accordingly, when an inflow of excessive liquid refrigerant into the compressor 10 occurs, it is necessary to reduce the opening degree of the expansion device 14*b* to decrease the injection flow rate of liquid refrigerant and protect the compressor 10.

In Embodiment 4, the determination of whether or not there is an inflow of excessive liquid refrigerant into the compressor 10 is made on the basis of the computed value of the quality Xs (−) of refrigerant flowing into the compressor 10. Accordingly, hereinafter, a method of computing the quality Xs will be described taking the heating only operation mode as an example.

Note that (−) indicates a dimensionless quantity with no units.

<Step G0>

The controller 50 proceeds to the quality Xs computation control.

<Step G1>

The controller 50 detects the medium pressure PM (MPa) with the medium pressure detection device 32, and detects the pressure Ps (MPa) of the refrigerant suctioned into the compressor 10 with the suction pressure detection device 60.

<Step G2>

The controller 50 reads the current opening degrees LEVa and LEVb of the expansion device 14*a* and the expansion device 14*b*. Note that the opening degree control of the expansion device 14*b* is similar to Embodiments 1 to 3.

<Step G3>

The controller 50 calculates an enthalpy H1 (kJ/kg) of refrigerant flowing out from the accumulator 19 on the basis of the pressure Ps (MPa) of suctioned refrigerant, and calculates an enthalpy H2 (kJ/kg) of refrigerant passing through the expansion device 14*b* on the basis of the medium pressure PM (MPa).

Note that a detailed method of computing the enthalpy H1 and the enthalpy H2 (kJ/kg) will be discussed later.

<Step G4>

The controller 50 uses the opening degrees of the expansion device 14*a* and the expansion device 14*b* read in step G3 to compute an enthalpy H3 (kJ/kg) of refrigerant suctioned into the compressor 10.

Note that a detailed method of computing the enthalpy H3 will be discussed later.

<Step G5>

The controller 50 computes the quality Xs (−) of refrigerant suctioned into the compressor 10 on the basis of the enthalpy H1 (kJ/kg), H2 (kJ/kg), and H3 (kJ/kg) computed in step G4, and Eq. (19) below.

<Step G6>

The controller 50 ends the quality Xs computation control.

Next, a method of computing the enthalpy H3 in step G4 will be described in detail.

The refrigerant flow rate G1 (kg/h) flowing out from the accumulator 19 and the refrigerant flow rate G2 (kg/h) passing through the expansion device 14*b* are decided by the Cv value of the expansion device 14*a* and the Cv value of the expansion device 14*b*. The Cv value used herein is the one typically used to express the capacity of an expansion device.

By using the Cv value, the refrigerant flow rate G1 (kg/h) flowing out from the accumulator 19 and the refrigerant flow rate G2 (kg/h) passing through the expansion device 14*b* are respectively expressed in the form of Eq. (11) and Eq. (12), assuming that the pressure after passing through the expansion device 14*a* is equal to the pressure of the refrigerant suctioned into the compressor 10.

Herein, Cva and Cvb are the Cv values of the expansion device 14*a* and the expansion device 14*b*, respectively, while Ps (MPa) is the suction pressure of the compressor 10 (a detected value from the suction pressure detection device 60).

[Math. 11]

$$G1 \propto Cva\sqrt{PM-Ps} \quad (11)$$

[Math. 12]

$$G2 \propto Cvb\sqrt{PM-Ps} \quad (12)$$

Since the Cv value of an electronic expansion valve varies nearly proportionally to the output pulse of the electronic expansion valve, Eq. (11) and Eq. (12) may be expressed as Eq. (13) and Eq. (14), respectively, provided that LEVa (−) is the opening degree of the expansion device 14*a*, and LEVb (−) is the opening degree of the expansion device 14*b*.

[Math. 13]

$$G1 \propto LEVa\sqrt{PM-Ps} \quad (13)$$

[Math. 14]

$$G2 \propto LEVb\sqrt{PM-Ps} \quad (14)$$

Next, provided that G1 (kg/h) and H1 (kJ/kg) are the flow rate and enthalpy, respectively, of refrigerant flowing out from the accumulator 19, G2 (kg/h) and H2 (kJ/kg) are the flow rate and enthalpy, respectively, of refrigerant passing through the expansion device 14*b*, and G3 (kg/h) and H3 (kJ/kg) are the flow rate and enthalpy, respectively, of refrigerant suctioned into the compressor 10, Eq. (15) is obtained by the law of conservation of energy.

(Math. 15)

$$G1 \times H1 + G2 \times H2 = (G1 + G2) \times H3 \quad (15)$$

By substituting Eq. (13) and Eq. (14) into Eq. (15) and transforming the formula, the enthalpy H3 (kJ/kg) of the refrigerant suctioned into the compressor 10 is expressed in the form of Eq. (16).

[Math. 16]

$$H3 = \frac{1}{LEVa + LEVb}(LEVa \times H1 + LEVb \times H2) \quad (16)$$

In Eq. (16), since the opening degrees of the expansion device 14*a* and the expansion device 14*b* are known, if the enthalpy H1 of refrigerant flowing out from the accumulator 19 and the enthalpy H2 of refrigerant passing through the expansion device 14*b* are known, the enthalpy H3 (kJ/kg) of refrigerant suctioned into the compressor 10 may be calculated.

Herein, the enthalpy H1 (kJ/kg) of refrigerant flowing out from the accumulator 19 is assumed to be saturated gas enthalpy, and the enthalpy H2 (kJ/kg) of refrigerant passing through the expansion device 14*b* is assumed to be saturated liquid enthalpy.

Thus, with the detected value Ps (MPa) from the suction pressure detection device 60, the enthalpy H1 (kJ/kg) of refrigerant flowing out from the accumulator and the enthalpy H2 (kJ/kg) of refrigerant passing through the expansion device 14*b* may be calculated according to Eq. (17) and Eq. (18) indicated below. As a specific method, a table expressing pre-calculated pressure and enthalpy relationships may be stored in the controller 50, and the table may be referenced.

(Math. 17)

$$H1 = HG(Ps) \quad (17)$$

(Math. 18)

$$H2 = HL(Ps) \quad (18)$$

According to the above, in step G4, the controller 50 is able to calculate the enthalpies H1 (kJ/kg), H2 (kJ/kg), and H3 (kJ/kg) with Eqs. (11) to (18). Subsequently, the controller 50 may calculate the quality Xs on the basis of the calculation results and Eq. (19) in the later step G5.

(Math. 19)

$$Xs = (H3 - H2)/(H1 - H2) \quad (19)$$

Next, operation of the controller 50 in step G6 and thereafter will be described.

The controller 50 calculates the quality Xs of refrigerant suctioned into the compressor 10, and if the quality Xs of the refrigerant suctioned into the compressor 10 is less than a predetermined value, determines that the amount of liquid refrigerant flowing into the compressor 10 is excessive.

In other words, if the quality Xs of suctioned refrigerant of the compressor 10 calculated according to Eq. (19) becomes less than a value predetermined to protect the compressor 10, the amount of liquid refrigerant flowing into the compressor 10 is determined to be too much, and a protection control is conducted to, for example, decrease the opening degree of the expansion device 14*b* (for example, set the opening degree to fully closed).

Furthermore, besides the control of the opening degree of the expansion device 14*b* according to the quality Xs indicated in FIG. 20, if control is performed utilizing the compressor shell temperature detection device 61 as discussed next, damage to the compressor 10 may be more reliably prevented, as discussed hereinafter.

When an excessive inflow of liquid or two-phase refrigerant into the compressor 10 occurs, if, in addition to protection according to the quality Xs of refrigerant suctioned into the compressor 10 as discussed above, protection using the detected value Tcomp from the compressor shell temperature detection device 61 provided in the bottom of the shell of the compressor 10 is introduced as a backup operation, damage to the compressor 10 may be more reliably prevented.

In this case, if the superheat at the bottom of the shell of the compressor 10 (shell-bottom superheat) SHcomp, obtained by subtracting a saturation temperature Tsat calculated according to the detected pressure of the suction pressure detection device 60 from the detected value Tcomp of the compressor shell temperature detection device 61 as in Eq. (20), becomes less than a predetermined value (for example, 10 degrees C.), an excessive inflow of liquid or two-phase refrigerant into the compressor 10 is determined to have occurred, and a protection operation that stops or slows down the operation of the compressor 10 may be conducted.

(Math. 20)

$$SHcomp = Tcomp - Tsat \quad (20)$$

Since the refrigerating machine oil accumulating at the floor of the compressor 10 is sucked up along grooves or holes cut into the shaft of the motor and supplied to the scroll part as the motor of the compressor 10 revolves, if an excessive inflow of liquid refrigerant into the compressor 10 occurs, the refrigerating machine oil accumulating at the floor of the compressor 10 is diluted by the liquid refrigerant, and as a result of the reduced density of the refrigerating machine oil, the viscosity of the refrigerating machine oil decreases.

If the viscosity of the refrigerating machine oil becomes less than a viscosity limit, the oil film thickness on the sliding member becomes thinner and the sliding member is worn away, potentially leading to annealing or damage to the compressor.

Figure 21:
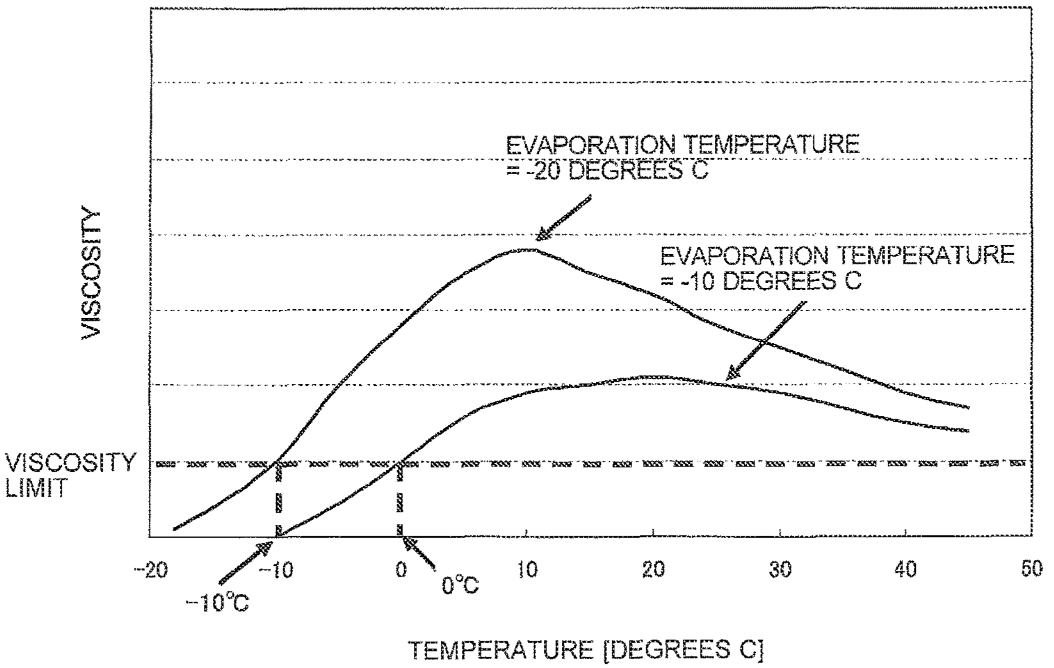
FIG. 21 is a graph illustrating the viscosity behavior of a mixture of refrigerant and refrigerating machine oil.

FIG. 21 illustrates the behavior of the mixed viscosity of R410A refrigerant and an ester-based refrigerating machine oil of viscosity grade 30. The horizontal axis of FIG. 21 is the temperature of the mixture of refrigerant and refrigerating machine oil, while the vertical axis is the viscosity of the mixture of refrigerant and refrigerating machine oil. The viscosity at which insufficient lubrication occurs corresponds to the viscosity limit indicated in FIG. 21.

In FIG. 21, when the evaporating temperature is −20 degrees C., the limit viscosity is reached at a temperature of −10 degrees C. for the refrigerant and refrigerating machine oil. When the evaporating temperature is −10 degrees C., the limit viscosity is reached at a temperature of 0 degrees C. for the refrigerant and refrigerating machine oil. In either state, the temperature difference obtained by subtracting the evaporating temperature from the temperature of the refrigerant and refrigerating machine oil is 10 degrees C., demonstrating that the viscosity of the refrigerating machine oil reaches the limit viscosity when the shell-bottom superheat of the compressor 10 reaches 10 degrees C.

Consequently, in this case, protection operation may be started when the shell-bottom superheat of the compressor 10 becomes less than 10 degrees C. However, since the refrigerant mixture ratio and the mixed viscosity differs depending on the type and viscosity grade of the refrigerating machine oil, the value at which to start the protection operation according to the shell-bottom superheat of the compressor 10 is not limited to 10 degrees C., and an appropriate value may be used according to the combination of the above factors.

Although FIG. 21 illustrates the behavior of the mixed viscosity of R410A refrigerant and an ester-based refrigerating machine oil of viscosity grade 30, the types of refrigerant and refrigerating machine oil are not limited to the above. An ether-based or other type of refrigerating machine oil may be used, and a viscosity grade with a value other than 30 does not pose a problem. In the case of using another refrigerant or refrigerating machine oil, the limit viscosity and the temperature at which to start the protection operation according to the shell-bottom superheat of the compressor 10 may be modified according to the change in the physical properties of the refrigerant and the refrigerating machine oil.

Experimental results demonstrate that for a typical low-pressure shell compressor, in an operating state with a large rotational speed of the compressor 10, a shell-bottom superheat of 10 degrees C. or greater may be ensured if the quality Xs of refrigerant suctioned into the compressor 10 is 0.90 or greater. Thus, the compressor 10 may be protected if operation is conducted so that the quality Xs of refrigerant suctioned into the compressor 10 as computed in Eq. (19) is a value greater than 0.90. In other words, by causing wet refrigerant with a quality Xs equal to or greater than 0.9 and less than or equal to 0.99 to be suctioned into the compressor 10, the discharge refrigerant temperature of the compressor 10 may be controlled while preventing damage to the compressor 10. Note that since the amount of heat produced by the motor of the compressor 10 varies according to the compression load and the rotational speed, the value at which an excessive quantity of liquid refrigerant is determined may be appropriately modified according to the compression load and the rotational speed.

Note that the present embodiment describes a case in which the compressor 10 is a low-pressure shell-type compressor. In a high-pressure shell-type compressor in which the inside of a hermetically sealed container of the compressor 10 is in a high-pressure refrigerant environment, refrigerant suctioned into the compressor 10 flows into the compression chamber, and after being compressed/pressurized, is discharged into the compressor shell, and flows out from the compressor 10. In a high-pressure shell compressor, if the quality Xs of the suction refrigerant decreases and the refrigerant liquid component increases too much, there is a possibility that the compression mechanism will break. The quality limit at which the compression mechanism breaks is lower than the decrease in oil viscosity at the bottom of a low-pressure shell compressor in a low-pressure shell compressor, but if the quality Xs of refrigerant suctioned into the compressor 10 is made to be equal to or greater than 0.9 and less than or equal to 0.99, even a high-pressure shell compressor may be reliably used safely.

[Advantageous Effects of Air-Conditioning Apparatus according to Embodiment 4]

The air-conditioning apparatus according to Embodiment 4 minimizes the supply of excessive liquid refrigerant to the compressor 10, and is able to prevent the scroll part constituting the compression chamber from being damaged.

Since the air-conditioning apparatus according to Embodiment 4 minimizes the supply of excessive liquid refrigerant to the compressor 10, the accumulation of excessive liquid refrigerant at the bottom of the shell may be minimized. For this reason, reductions in the density of the refrigerating machine oil are minimized, achieving minimal wear to the sliding member of the compressor 10, and preventing damage.

The air-conditioning apparatus according to Embodiments 1 to 4 is able to inject refrigerant into the suction side of the compressor 10, and thus is able to moderate decreases in the stability of operation.

Also, the air-conditioning apparatus according to Embodiments 1 to 4 is able to conduct injection in the heating only operation mode, the cooling only operation mode, the heating main operation mode, and the cooling main operation mode. In other words, the air-conditioning apparatus according to Embodiments 1 to 4 is able to conduct injection even if the flow of refrigerant changes, such as by switching from the cooling operation to the heating operation or the cooling and heating mixed operation or the like, for example.

Furthermore, the air-conditioning apparatus according to Embodiments 1 to 4 enables injection with the addition of an improvement to the refrigerant circuit in the outdoor unit 1 and the heat medium relay unit 3. In other words, the air-conditioning apparatus according to Embodiments 1 to 4 is capable of injection even without a configuration such as one that provides a check valve or the like in the indoor units 2, thus improving its versatility.

In the air-conditioning apparatus according to Embodiments 1 to 4, if only a heating load or a cooling load is generated in the use side heat exchangers 26, the corresponding first heat medium flow switching devices 22 and the second heat medium flow switching devices 23 are set to intermediate opening degrees to allow heat medium to flow through both the intermediate heat exchanger 15*a* and the intermediate heat exchanger 15*b*. Consequently, the use of both the intermediate heat exchanger 15*a* and the intermediate heat exchanger 15*b* may be used for the heating operation or cooling operation, thereby increasing the heat transfer area and enabling efficient heating operation or cooling operation to be conducted.

Also, in the case where a mixed heating load and cooling load is generated in the use side heat exchangers 26, the first heat medium flow switching devices 22 and the second heat medium flow switching devices 23 corresponding to the use side heat exchangers 26 switch to a flow path connected to the intermediate heat exchanger 15*b* used for heating, while the first heat medium flow switching devices 22 and the second heat medium flow switching devices 23 corresponding to the use side heat exchangers 26 switch to a flow path connected to the intermediate heat exchanger 15*a* used for cooling. In so doing, each indoor unit 2 is able to freely conduct the heating operation and cooling operation.

Note that it is sufficient for the first heat medium flow switching devices 22 and the second heat medium flow switching devices 23 to be devices able to switch flow paths, such as devices able to switch among a three-way passage such as three-way valves, or a combination of two opening and closing valves or other devices that open and close a two-way passage. In addition, devices able to vary the flow rate in a three-way passage such as a mixing valve driven by a stepping motor, or a combination of two devices able to vary the flow rate in a two-way passage such as an electronic expansion valve, may be used as the first heat medium flow switching devices 22 and the second heat medium flow switching devices 23. In this case, it is also possible to prevent a water hammer caused by the sudden opening or closing of a flow path. Furthermore, although the embodiments describe as an example the case where the heat medium flow control devices 25 are two-way valves, the heat medium flow control devices 25 may also be control valves having a three-way passage, and may be installed together with bypass pipes that bypass the use side heat exchangers 26.

Also, besides a device able to vary an aperture surface area such as an electronic expansion valve, an opening and closing valve such as a compact solenoid valve, a capillary tube, a compact check valve or the like may also be used for the expansion device 14*a* and the expansion device 14*b*. Any device able to form medium pressure is sufficient.

Also, the heat medium flow control devices 25 may use a device driven by a stepping motor and able to control the flow rate flowing through a flow path, and may also be a two-way valve or a three-way valve with one end sealed. Moreover, a device such as an opening and closing valve that opens and closes a two-way passage may be used as the heat medium flow control devices 25, with the average flow rate controlled by repeatedly switching the valve on and off.

In addition, although the second refrigerant flow switching devices 18 are illustrated like four-way valves, the configuration is not limited thereto, and refrigerant may be made to flow in the same way by using multiple two-way flow switching valves or three-way flow switching valves.

Also, a similar effect is obviously achieved even in the case where only one use side heat exchanger 26 and heat medium flow control device 25 are connected. In addition, installing multiple intermediate heat exchangers 15 and expansion devices 16 that work the same obviously poses no problems. Furthermore, although the case of the heat medium flow control devices 25 being housed inside the heat medium relay unit 3 is described as an example, the configuration is not limited thereto, and the heat medium flow control devices 25 may also be housed inside the indoor units 2, or configured separately from the heat medium relay unit 3 and the indoor units 2.

For the heat medium, substances such as brine (antifreeze), water, a mixture of brine and water, or a mixture of water and a highly anticorrosive additive may be used. Consequently, the air-conditioning apparatus according to Embodiments 1 to 4 contributes to improved safety even if the heat medium leaks into the indoor space 7 via the indoor units 2, because a highly safe substance is used for the heat medium.

For the refrigerant, the effects of suction injection are large when using a refrigerant with a higher discharge refrigerant temperature such as R32. Besides R32, a refrigerant mixture (zeotropic refrigerant mixture) of R32 and a tetrafluoropropene-based refrigerant with a low global warming potential such as HFO-1234yf expressed by the chemical formula CF3CF═CH2 or HFO-1234ze expressed by the chemical formula CF3CH═CHF may be used.

In the case of using R32 as the refrigerant, the discharge refrigerant temperature rises approximately 20 degrees C. compared to the case of using R410A in the same operating state, thus requiring usage of lowering the discharge refrigerant temperature, and the advantageous effects of suction injection are large. For R410A, it is necessary to lower the discharge temperature by suction injection when using a refrigerant whose discharge refrigerant temperature rises even slightly, whereas for a refrigerant mixture of R32 and HFO-1234yf, in the case where the R32 mass ratio is 62% (62 wt %) or greater, the discharge refrigerant temperature rises 3 degrees C. or more over the case of using R410A, and thus the advantageous effects are large if the discharge refrigerant temperature is lowered by suction injection.

Also, for a refrigerant mixture of R32 and HFO-1234ze, in the case where the R32 mass ratio is 43% (43 wt %) or greater, the discharge refrigerant temperature rises 3 degrees C. or more over the case of using R410A, and thus the advantageous effects are large if the discharge refrigerant temperature is lowered by suction injection.

Also, the refrigerant types in the refrigerant mixture are not limited to these, and a refrigerant mixture containing small quantities of other refrigerant components does not largely affect the discharge refrigerant temperature, and exhibits similar advantageous effects. For example, a refrigerant mixture of R32 and HFO-1234yf that also contains small quantities of other refrigerants may still be used.

In addition, although fans are typically installed in the heat source side heat exchanger 12 and the use side heat exchangers 26*a* to 26*d* to promote condensation or evaporation by blowing air, the configuration is not limited thereto. For example, devices such as panel heaters utilizing radiation may also be used as the use side heat exchangers 26*a* to 26*d*, while a water-cooled device that moves heat with water or antifreeze may be used as the heat source side heat exchanger 12. Any device may be used insofar as the device has a structure enabling heat to be given off or taken way.

Also, although the description herein takes the case of four use side heat exchangers 26*a* to 26*d* as an example, any number thereof may be connected.

In addition, although the case of two intermediate heat exchangers 15*a* and 15*b* is described as an example, the configuration is obviously not limited thereto, and any number of intermediate heat exchangers 15 may be installed insofar as the configuration enables the cooling and/or heating of heat medium.

In addition, the pumps 21*a* and 21*b* are not limited to one each, and multiple low-capacity pumps may also be arranged in parallel.

Also, in the present embodiments, an exemplary configuration like the following is described. Namely, a compressor 10, a four-way valve (first refrigerant flow switching device) 11, a heat source side heat exchanger 12, an expansion device 14*a,* an expansion device 14*b,* an opening and closing device 24, and a backflow prevention device 20 are housed in an outdoor unit 1. Also, the use side heat exchangers 26 are housed in the indoor units 2, while the intermediate heat exchangers 15 and the expansion devices 16 are housed in the heat medium relay unit 3. Furthermore, the outdoor unit 1 and the heat medium relay unit 3 are interconnected by a pair of pipes, with refrigerant circulated between the outdoor unit 1 and the heat medium relay unit 3, while the indoor units 2 and the heat medium relay unit 3 are interconnected by respective pairs of pipes, with heat medium circulated between the indoor units 2 and the heat medium relay unit 3. Heat is exchanged between the refrigerant and the heat medium at the intermediate heat exchangers 15. However, the air-conditioning apparatus according to Embodiments 1 to 4 is not limited thereto.

For example, it is also possible to apply the present invention to, and exhibit similar advantageous effects with, a direct expansion system in which the compressor 10, the four-way valve (first refrigerant flow switching device) 11, the heat source side heat exchanger 12, the expansion device 14*a,* the expansion device 14*b,* the opening and closing device 24, and the backflow prevention device 20 are housed in the outdoor unit 1, while load side heat exchangers, which exchange heat between the air of the air-conditioned space and the refrigerant, and the expansion devices 16 are housed in the indoor units 2. A relay unit formed separately from the outdoor unit 1 and the indoor units 2 is provided, with the outdoor unit 1 and the relay unit interconnected by a pair of pipes, and with the indoor units 2 and the relay unit interconnected by respective pairs of pipes. Refrigerant is circulated between the outdoor unit 1 and the indoor units 2 via the relay unit, enabling the cooling only operation, the heating only operation, the cooling main operation, and the heating main operation to be conducted.

Also, in the present embodiments, an exemplary configuration like the following is described. Namely, a compressor 10, a four-way valve (first refrigerant flow switching device) 11, a heat source side heat exchanger 12, an expansion device 14*a,* and an expansion device 14*b* are housed in an outdoor unit 1. Also, use side heat exchangers 26 are housed in indoor units 2. Furthermore, intermediate heat exchangers 15 and expansion devices 16 are housed in a heat medium relay unit 3, and the outdoor unit 1 and the heat medium relay unit 3 are interconnected by a pair of pipes, with refrigerant circulated between the outdoor unit 1 and the heat medium relay unit 3, while the indoor units 2 and the heat medium relay unit 3 are interconnected by respective pairs of pipes, with heat medium circulated between the indoor units 2 and the heat medium relay unit 3. Heat is exchanged between the refrigerant and the heat medium at the intermediate heat exchangers 15. However, the air-conditioning apparatus according to Embodiments 1 to 4 is not limited thereto.

For example, it is also possible to apply the present invention to, and exhibit similar advantageous effects with, a direct expansion system in which the compressor 10, the four-way valve (first refrigerant flow switching device) 11, the heat source side heat exchanger 12, the expansion device 14*a,* and the expansion device 14*b* are housed in the outdoor unit 1, while load side heat exchangers, which exchange heat between the air of the air-conditioned space and the refrigerant, and the expansion devices 16 are housed in the indoor units 2. Multiple indoor units are connected to the outdoor unit 1 by pairs of pipes, and refrigerant is circulated between the outdoor unit 1 and the indoor units 2, enabling the cooling operation and the heating operation to be conducted.

Also, although an air-conditioning apparatus capable of the cooling and heating mixed operation, such as the cooling main operation and the heating main operation, is described as an example herein, the configuration is not limited thereto. The present invention may also be applied to, and similar advantageous effects exhibited with, an air-conditioning apparatus unable to conduct the cooling and heating mixed operation that switches between the cooling only operation and the heating only operation. Also, devices provided with just one intermediate heat exchanger are included among devices that are unable to conduct the cooling and heating mixed operation.

The invention claimed is:

1. An air-conditioning apparatus, including a compressor, a refrigerant flow switching device, a heat source side heat exchanger, a first expansion device, and an intermediate heat exchanger connected via refrigerant pipes, that constitutes a refrigerant circuit circulating a refrigerant, a pump, the intermediate heat exchanger, and a use side heat exchanger connected via heat medium pipes, that constitutes a heat medium circuit, the air-conditioning apparatus comprising: a second expansion device provided on an upstream side of the heat source side heat exchanger with respect to flow of the refrigerant during a heating operation, the second expansion device is disposed between the heat source side heat exchanger and the intermediate heat exchanger; an accumulator configured to accumulate excess refrigerant provided on an upstream side of the compressor with respect to the flow of the refrigerant, the accumulator is disposed between the compressor and the heat source side heat exchanger; a suction injection pipe, having one end connected on an upstream side of the second expansion device with respect to the flow of the refrigerant during the heating operation, and another end connected to a flow channel between a suction side of the compressor and the accumulator; a third expansion device provided on the suction injection pipe; a medium pressure detector configured to detect one of a refrigerant pressure and a refrigerant saturation temperature on an upstream side of the second expansion device with respect to the flow of the refrigerant during the heating operation, to detect pressure of the refrigerant that was depressurized by the first expansion device as medium pressure refrigerant which has a medium pressure, the medium pressure being lower than a pressure of the refrigerant supplied to the intermediate heat exchanger serving as a condenser, and being higher than a pressure of the refrigerant flowing out from the heat source side heat exchanger serving as an evaporator; a discharge refrigerant temperature detector configured to detect a discharge refrigerant temperature of the refrigerant which is discharged from the compressor; and a controller configured to control an opening degree of the second expansion device and the third expansion device based on a detection result from the medium pressure detector and the discharge refrigerant temperature detector; wherein, inside the refrigerant pipes, the refrigerant has a higher discharge refrigerant temperature than R410A, and the controller performs medium pressure control that controls the opening degree of the second expansion device based on a deviation between a target value of medium pressure and one of a detection result of the medium pressure detector and a predicted value, determines whether the discharge refrigerant temperature transiently rises and determines whether the discharge refrigerant temperature is in a steady state, responsive to the discharge refrigerant temperature of the compressor being determined to transiently rise and after starting the medium pressure control, performs activation control, and responsive to the discharge refrigerant temperature of the compressor being determined to be in the steady state and after starting the medium pressure control, performs steady-state control, regulates a flow rate of the refrigerant to supply to the suction side of the compressor via the suction injection pipe, closes the third expansion device until one of the activation control and the steady-state control is started, in the activation control, controls the opening degree of the third expansion device based on a detection result of the discharge refrigerant temperature detector and a first discharge refrigerant temperature target value, and, in the steady-state control, controls the opening degree of the third expansion device based on the detection result of the discharge refrigerant temperature detector and a second discharge refrigerant temperature target value that differs from the first discharge refrigerant temperature target value.

2. The air-conditioning apparatus of claim 1, wherein R32 or a refrigerant mixture with an R32 mass ratio of 62% or greater is circulated as the refrigerant.

3. The air-conditioning apparatus of claim 1, further comprising a high pressure detector configured to detect a pressure of refrigerant discharged from the compressor;

wherein the controller calculates a degree of superheat of refrigerant discharged from the compressor based on the detection result of the discharge refrigerant temperature detector and the high pressure detector, and controls the opening degree of the third expansion device such that the degree of superheat falls within a range of a target value related to the discharge refrigerant temperature.

4. The air-conditioning apparatus of claim 1, wherein the controller sets the opening degree of the second expansion device to a fixed opening degree during a cooling operation.

5. The air-conditioning apparatus of claim 1, wherein the controller sets the opening degree of the third expansion device during the activation control to be larger than the opening degree during the steady-state control.

6. The air-conditioning apparatus of claim 1, wherein the controller sets the opening degree of the second expansion device during the activation control to be larger than the opening degree during the steady-state control.

7. The air-conditioning apparatus of claim 1, wherein the controller sets the second discharge refrigerant temperature target value to a higher value than the first discharge refrigerant temperature target value, during the activation control, controls the opening degree of the third expansion device based on a deviation between the first discharge refrigerant temperature target value and the detection result of the discharge refrigerant temperature detector, and during the steady-state control, controls the opening degree of the third expansion device based on a deviation between the second discharge refrigerant temperature target value and the detection result of the discharge refrigerant temperature detector.

8. The air-conditioning apparatus of claim 1, wherein the controller starts the activation control when the discharge refrigerant temperature of the compressor exceeds a predetermined activation control start temperature, calculates a discharge temperature endpoint predicted value to be reached by the discharge refrigerant temperature after the activation control start temperature is exceeded, based on the detection result of the discharge refrigerant temperature detector before the activation control start temperature is exceeded, and controls the opening degree of the third expansion device based on a deviation between the discharge temperature endpoint predicted value and the first discharge refrigerant temperature target value.

9. The air-conditioning apparatus of claim 1, further comprising a first refrigerant branching unit that, during a cooling operation, diverts the refrigerant from a refrigerant flow path when the refrigerant is flowing from the heat source side heat exchanger to the first expansion device;

a second refrigerant branching unit that, during the heating operation, diverts the refrigerant from a refrigerant flow path when the refrigerant is flowing from the first expansion device to the heat source side heat exchanger;

a branch pipe that connects the first refrigerant branching unit and the second refrigerant branching unit, with the suction injection pipe connected thereto;

a first conducting device installed between the first refrigerant branching unit and a joint between the branch pipe and the suction injection pipe; and a second conducting device installed between the second refrigerant branching unit and the joint.

10. The air-conditioning apparatus of claim 8, wherein the controller incrementally controls the opening degree of the third expansion device a plurality of times, and sets the opening degree of the third expansion device calculated based on the deviation between the discharge temperature endpoint predicted value and the first discharge refrigerant temperature target value.

11. The air-conditioning apparatus of claim 8, wherein the controller further calculates the discharge temperature endpoint predicted value each time the detection result of the discharge refrigerant temperature detector exceeds the activation control start temperature, and controls the opening degree of the third expansion device based on the calculated result.

12. The air-conditioning apparatus of claim 8, wherein the controller assumes that the discharge refrigerant temperature of the compressor varies according to first-order lag characteristics, and calculates the discharge temperature endpoint predicted value based on detection results of the discharge refrigerant temperature detector detected at three different times.

13. The air-conditioning apparatus of claim 9, wherein action of the refrigerant flow switching device enables the cooling operation causing high pressure refrigerant to flow into the heat source side heat exchanger serving as a condenser, and causing low pressure refrigerant to flow into the intermediate heat exchanger serving as an evaporator, and during the cooling operation, the refrigerant circulates through the refrigerant circuit without going through the second expansion device, enabling the high pressure refrigerant to be introduced on a suction side of the compressor via the first conducting device, the third expansion device, and the suction injection pipe.

14. The air-conditioning apparatus of claim 9, wherein the first refrigerant branching unit is disposed at a position where the refrigerant flows in from respectively different directions such that in the heating operation the refrigerant flows into the first refrigerant branching unit from a direction opposite to a direction in which the refrigerant flows into the first refrigerant branching unit during the cooling operation, the second refrigerant branching unit is disposed at a position where the refrigerant flows in from a same direction during the cooling operation and the heating operation, the first conducting device is a backflow prevention device that conducts the refrigerant only in a direction flowing from the first refrigerant branching unit to the suction injection pipe, and the second conducting device is a backflow prevention device that conducts the refrigerant only in a direction flowing from the second refrigerant branching unit to the suction injection pipe.

* * * * *